United States Patent [19]

Crane et al.

[11] 4,040,012
[45] Aug. 2, 1977

[54] HANDWRITING VERIFICATION SYSTEM

[75] Inventors: Hewitt David Crane, Portola Valley; Daniel Errol Wolf, Menlo Park; Samuel Lindenberg, Pacific Palisades, all of Calif.

[73] Assignee: Stanford Research Institute, Menlo Park, Calif.

[21] Appl. No.: 681,118

[22] Filed: Apr. 28, 1976

[51] Int. Cl.² .............................................. G06K 9/00
[52] U.S. Cl. ......................................... 340/146.3 SY
[58] Field of Search .............. 340/146.3 SY, 146.3 Q, 340/146.3 R, 146.3 SG; 235/181

[56] References Cited

U.S. PATENT DOCUMENTS

| | | |
|---|---|---|
| 3,579,186 | 5/1971 | Johnson et al. ............... 340/146.3 SY |
| 3,699,517 | 10/1972 | Dyche ......................... 340/146.3 SY |
| 3,767,907 | 10/1973 | Radcliffe, Jr. ............... 340/146.3 SY |
| 3,818,443 | 6/1974 | Radcliffe, Jr. ............... 340/146.3 SY |

Primary Examiner—Leo H. Boudreau
Attorney, Agent, or Firm—Lindenberg, Freilich

[57] ABSTRACT

Identification of a specimen signature is provided by comparing the specimen with a previously recorded template signature. The comparison is performed by recording, for both specimen and template signatures, signals representing forces in three directions while generating these signatures. For handwritten signatures these forces are called pressure, for the force perpendicular to the plane of the paper, X for the left-right force in the plane of the paper, and Y for the near-far force in the plane of the paper.

The recorded specimen signals are divided into equal parts, for example halves, and successive comparisons are made of the equal parts, first without any displacement, then with relative displacements, then by expanding the length of parts relative to one another, then by reducing the length of parts relative to one another, to find the highest correlation values for all of these comparisons. These are combined and compared with a reference.

21 Claims, 15 Drawing Figures

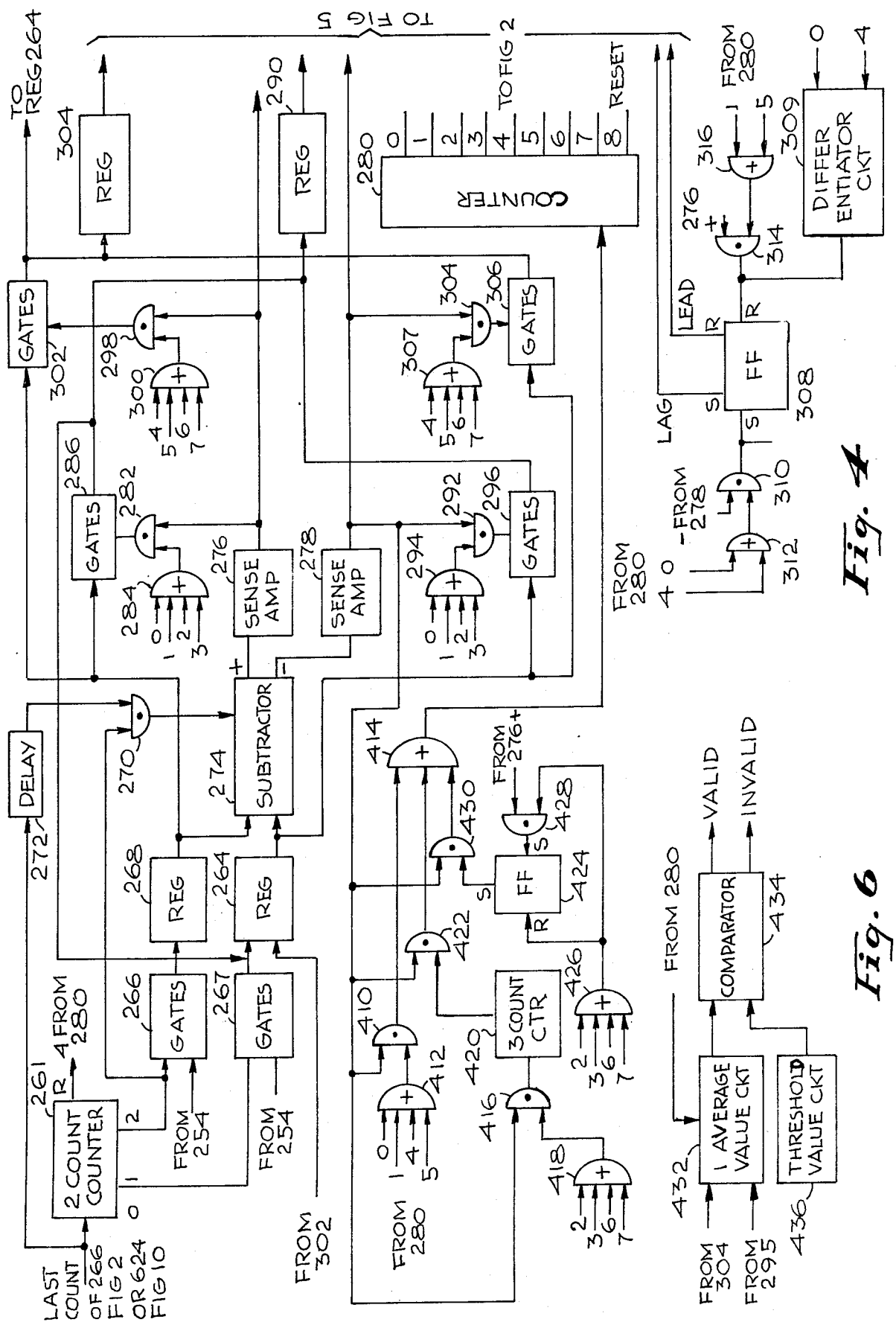

HANDWRITING VERIFICATION SYSTEM

BACKGROUND OF THE INVENTION

This invention relates to systems used for signature verification and more particularly to improvements therein.

Human action patterns, in contrast to machine generated patterns, have a relatively large degree of variability. Thus although various patterns such as heart patterns, walking patterns or signatures, may be considered as characteristic of an individual, they do vary from one performance to another. A human examining signatures for verification can consciously allow for small variations in a person's signature. However, for a machine-based verification system, a method is required which, although automatic, can similarly allow for some specifiable range of variability.

Correlation is a well-known analytic technique for comparing the likeness of two signals. The presently favored technique for handwriting verification is to correlate a handwritten signature against a stored template signature. The problem arises however, as to how best to correlate, for example, a more rapidly-written signature against a more slowly-written signature or vice versa. Correlation in these instances is not very good. Another problem arises when, for example, a person writes two words, such as his first and last name, at different speeds. Some correlation technique should be provided to allow for these "human" variations, and yet which is sufficiently accurate to separate a valid signature from a forgery.

OBJECTS AND SUMMARY OF THE INVENTION

An object of this invention is the provision of a novel and useful signature verification system.

Yet another object of this invention is the provision of a signature verification system which takes into consideration variations in a person's signature.

Still another object of this invention is to provide a novel and useful processing technique that can be used for comparing any two sets of signals that vary with respct to a common reference, usually time.

These and other objects of the invention may be achieved in a system wherein for each signature requiring future verification, a template signature is written with a pen which provides signals such as the pressure, and forces in the $x$ and $y$ directions which are made while writing the signature. This is stored. Subsequently, a person whose signature is to be verified, by any suitable means retrieves the stored template and then writes his signature with a similar type of pen. The same signals are derived from the pen and they are recorded for this test signature.

Thereafter, correlation of the signatures is performed, using a part of the signature, such as one-half, at a time. It has been found that correlation is significantly improved if a signature is divided into parts, such as halves, or thirds, depending upon the length of the signature, and the correlation is made using the parts of the signatures. Experience with this kind of testing has indicated that for most signatures, division into halves is a great improvement over no division at all. Division into thirds is not significantly better. Division into fourths may begin to decrease performance. It should be mentioned that performance (of the system) is measured by the separation between true signatures and forgery signatures. Correlation is a measure of how similar two signatures are. Thus, ideally, two true signatures would have a large correlation (1.0) while a true and a forgery would have a small correlation (0.0).

One part of a template signature is first compared with the corresponding part of the template signature by passing, for example, both first halves past a reading station and generating digital values corresponding to the amplitudes of the $x$, $y$ and $p$ signals which are read. These digital values are combined to provide a correlation value.

The two halves are then passed by the reading station with one-half being delayed or displaced an increment in one direction relative to the other. The correlation value derived as a result, is compared with the first correlation value and if it is greater, then the operation is performed again with an increased delay or increment displacement between the two signatures. This operation is repeated with increasing incremental delays or displacements as long as the correlation value derived is greater than the preceding one. The maximum correlation value thus obtained is stored and then, instead of one-half of the signature being delayed with respect to the other, one-half of the signature is advanced or displaced an increment in the opposite direction with respect to the other. The increments are increased as long as the correlation values obtained thereby keep increasing. As soon as they increase no further, then this operation is stopped. The largest correlation value obtained from the foregoing is stored.

The next procedure to be followed with the first halves of template and specimen signature signals is to successively expand one of the halves relative to the other half and then to successively contract one of the halves relative to the other while taking samples and computing correlation values from these. Successive expansions or successive contractions occur so long as increasing correlation values are obtained. The expansion is made to occur by moving one signature at a slower speed relative to the other while passing by the reading station. The contraction occurs by moving one signature at a relatively higher speed with respect to the other while passing by the reading station. During this test the relative position of the half signature parameters at the start of each expansion or contraction is that which gave the best correlation value as a result of the lag/lead test operations. Further correlation values are obtained for each expansion or contraction using increasing delays or leads as previously described until a maximum correlation is obtained for the particular expansion or contraction.

The maximum correlation value for the lead/lag displacements and expand/contract operational modes on the first halves of the signatures is determined and stored. The same operational mode are then followed for the second halves of the signatures.

The maximum correlation values achieved for both halves of the signatures are then processed to provide a single value. For example, they are averaged and the final value obtained is compared with a previously determined reference value and if greater, the signature is valid, otherwise the signature is invalid.

The foregoing embodiments of the invention are described as being performed, first in what may be termed an analogue mode, by comparing specimen and parameter signals which have been recorded on tape. In a second embodiment of the invention, a digital embodiment digitized samples of the template and specimen signatures are extracted from storage for lead/lag and expansion/contraction comparisons of the type described. It should be noted that the word "signature" need not be the name of the signatory but can be any set of words or characters or characteristics of an individual capable of being converted to signals which are assigned to that individual for the purpose of enabling his or her identification. Also, while the description which follows calls for the signatures to be recorded on tape for the purpose of affording comparison between the signatures, this should be considered as exemplary, since other well known storage sytems such as delay lines or circulating memories may also be used to practice the techniques to be described. Also, from a description of the techniques to be described, those skilled in the art will be able to program a general purpose computer to perform these techniques. Thus, the description of the specific hardware employed, which follows, should be considered as exemplary and not restrictive.

BRIEF DESCRIPTION OF THE DRAWINGS

FIGS. 4 and 5 are block schematic diagrams of arrangements for comparing the correlation values derived from the circuitry shown in FIGS. 2 and 3.

FIG. 6 is a block schematic diagram for comparing the maximum correlation with a reference value to give a true/forgery indication.

DESCRIPTION OF THE PREFERRED EMBODIMENTS

A pen of the type suitable for use with this invention together with the associated circuitry, which will generate the X, Y and P signals, is described and claimed in the U.S. Pat. No. 3,915,015. The circuitry shown in FIG. 1 may be used for recording a template signature on tape and also for recording a sample signature which is to be compared with the template for verification.

Figure 1:
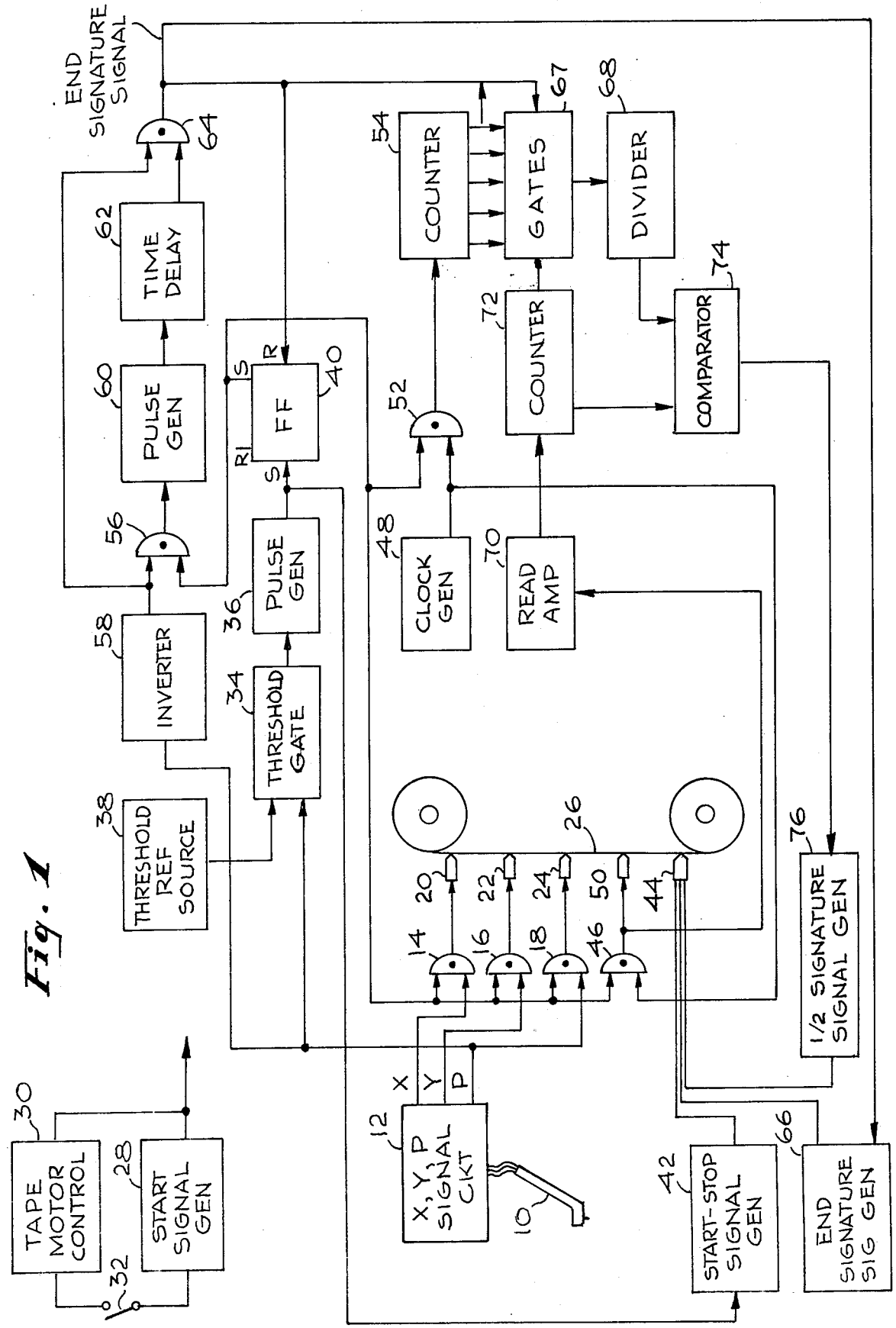
FIG. 1 is a block schematic diagram of a system for generating, X, Y and P signals from a signature being written, determining the beginning, middle and end of the signature and storing signals representative of these.

Referring now to FIG. 1, a pen 10, and signal generating circuits 12, which are associated therewith are of the type which are shown and described in the U.S. Patent previously mentioned. When the pen is used for writing, it provides signals which are converted by the X, Y and P circuits into X, Y and P signals respectively representative of motion in the left/right direction, motion in the far/near direction, and the pressure with which the pen is applied to the paper. These 3 signals are respectively applied to three And gates, 14, 16, 18, which will not be enabled until the pressure signal P, exceeds a pre-determined threshold. The 3 And gates apply their outputs to 3 tape recording heads, respectively 20, 22, and 24, which are positioned over three separate tracks on a magnetic tape 26, for recording the three separate signals separately thereon. The tape is started by a signal from a start signal generator 28, which is enabled to be applied to the tape motor control 30, when a switch 32 is actuated. The signal output from the start signal generator also resets all circuits which require resetting. This will become more clear as this description proceeds.

When the person whose signature is either being recorded for template purposes or for identification purposes, commences writing with the pen and when the pressure applied to the writing surface, as evidenced by the P signal, exceeds a predetermined threshold, a threshold gate 34 is enabled to apply a signal to a pulse generator 36. The reference which must be exceeded by the signal P is established by the voltage output of a threshold reference source 38, which is connected to the threshold gate 34. The pulse generator 36 applies a pulse output to a flip flop 40, to drive it to its set state, and also enables a start signal generator 42, to apply a code symbol to a special track on the tape 26, indicative of the location where the signal for the signature being written is being recorded. The start signal generator 42 has its output applied to a tape recording head 44. The start signal can be any signal, such as two binary bits.

The set output of flip flop 40 is applied to And gates 14, 16, 18 and 46. And gates 14, 16 and 18 are thus enabled to permit the X, Y and P signals to be passed therethrough so that they may be recorded by the recording heads respectively 20, 22 and 24 on the tape 26, on three separate tracks. An And gate 46 is also enabled, whereby recording head 50 may pass clock signals for recordation on a separate track, from a clock generator 48.

The set output of flip flop 40 also enables an And gate 52, whereby clock signals from clock generator 48 may be counted by a counter 54.

The writer may lift the pen 10 up for dotting i's, or crossing t's, or writing middle initials, or periods. This circuitry provides for "pen-up" intervals not exceeding a predetermined amount of time, by maintaining the circuitry operative until the end of the signature has occurred. This is taken care of by applying the set output of flip flop 40 to an And gate 56, which is maintained inoperative by the output of an inverter 58, while a P signal is applied to its input. As soon as the P signal drops, And gate 56 is enabled to apply a signal to a pulse generator 60. The pulse output of the pulse generator is applied to a time delay circuit 62. The output of the time delay circuit is applied to another And gate 64. And gate 64 is maintained inoperative by the output of inverter 58 as long as there is a P signal being applied to the input to the inverter. If the P signal is no longer being applied at the time an output from the time delay circuit is applied to And gate 64, the And gate provides an output. Otherwise, should the pen be reapplied to the paper, thus bringing up the P signal again, before the time delay signal arrives at the And gate 64, no output will be obtained from And gate 64. Therefore, it is not until the writing of the signature has terminated for the interval determined by the time delay circuit 62, that And gate 64 can pass a signal.

The output of And gate 64 resets flip flop 40 and also enables an end signature generator 66, to apply a code signal representative of the fact that the signature is terminated, to the recording head 44, whereby it is recorded on the special track on the tape. The counter 54 has counted the number of clock pulses occurring over the interval that the signature is being written. If it is desired to limit this interval, then the last count of the counter 54 which will measure the largest permitted writing interval is used to reset the flip flop 40 whereby the writing heads 14, 16, 18 and 46 are disenabled. The count of the counter 54 is applied to gates 66, which are only enabled either upon the occurence of the output of And gate 64 or by the highest count of counter 54. When this occurs, the count output of counter 54 is applied to a divider 68, which divides its input by 2. This can be done in any suitable manner by, for example, shifting all of the output bits of counter 54 one place to the right and omitting the least significant bit.

At this time, the tape 26 is wound back and started up again. This time, the reading head 50 will read the clock track pulses, and these will be applied by a read amplifier 70 to a counter 72. The output of the counter 72 and the divider 68 are applied to a comparator 74. When the comparator senses that the count from the counter 72 equals the count in the divider 68, it applies an output to a "half signal signature generator" 76 enabling it to apply an identifying code signal to the write head 44, whereby the tape is marked at the location where one-half of the signature which has been recorded thereon occurs.

As previously indicated, the circuitry which is shown may be used for recording a template signature on tape and also for recording a specimen signature, the validity of which it is desired to verify. Template signatures which have been recorded may be stored either on individual tapes, in cassettes, on disc memory or a large number of them may be stored on a single tape and identified by some suitable arrangement so that they can be retrieved when required. They can if desired then be recorded on tape which is subsequently used for the verification process.

FIGS. 2A & 2B SAMPLE DERIVATION

Figure 2A:
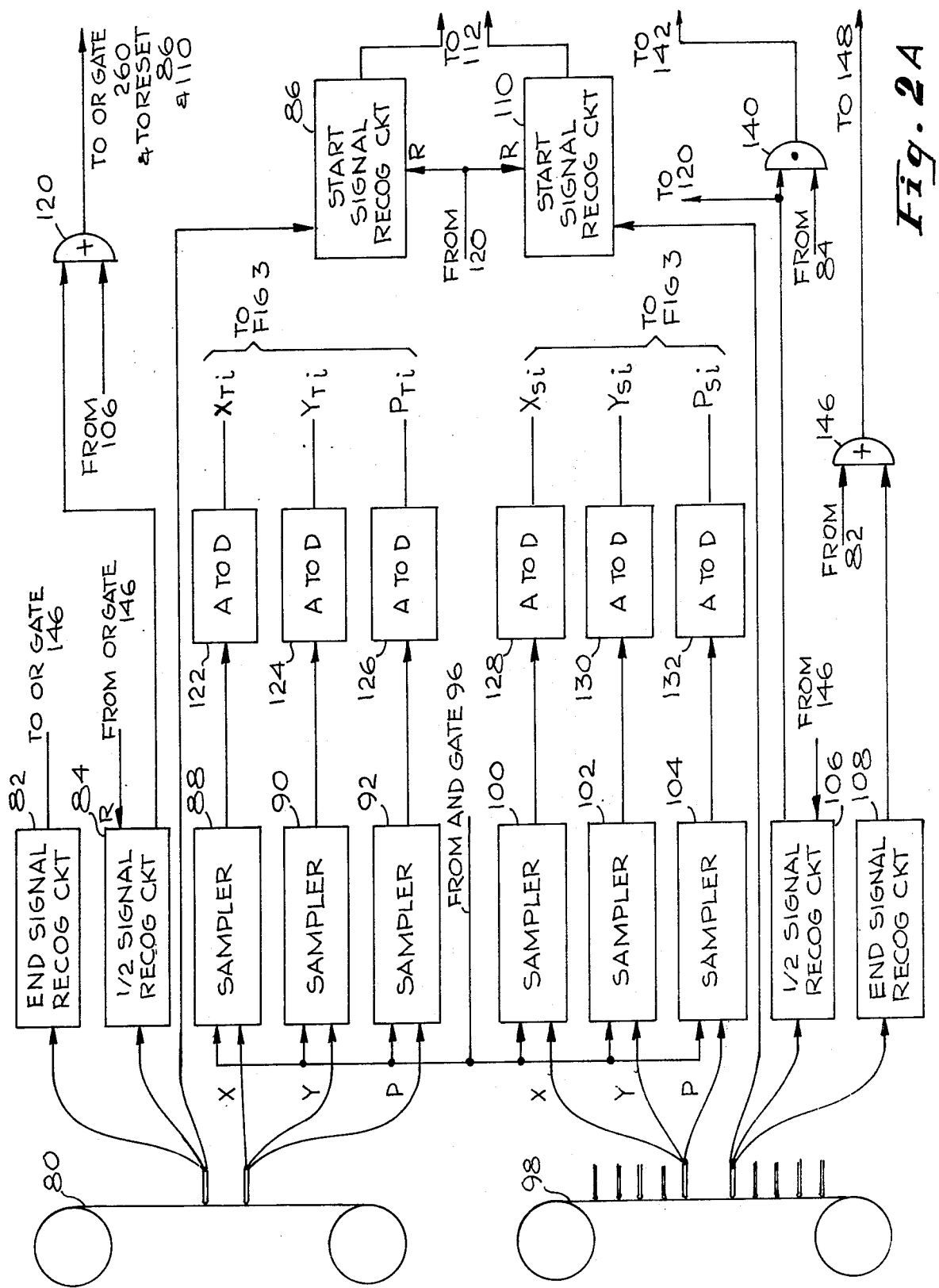
FIGS. 2A and 2B are block schematics of an arrangement for sampling the specimen and template signature in both the lead-delay mode and the expansion and contraction mode of comparison and providing digital values representative of the samples.
Figure 2B:
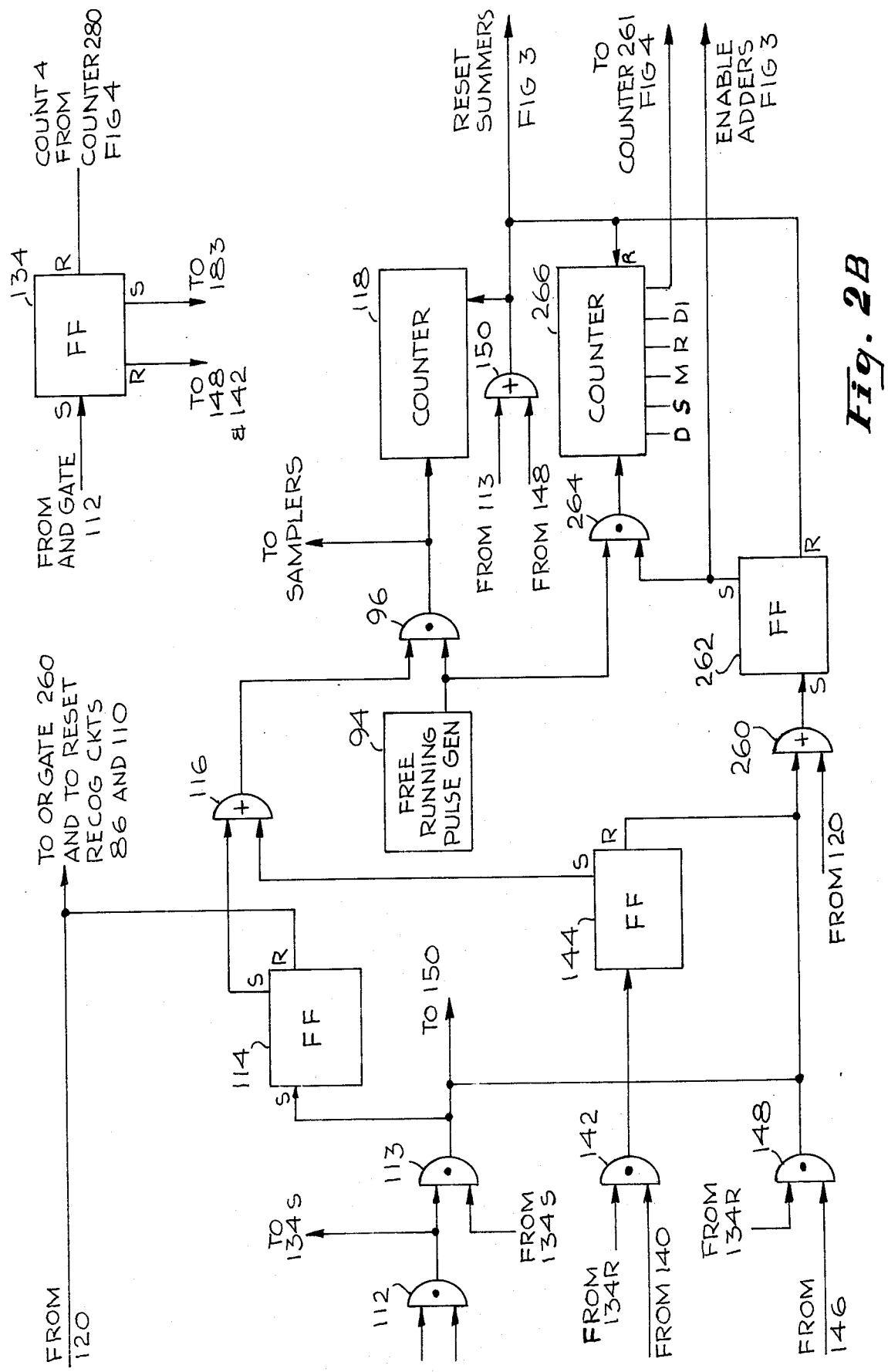

FIGS. 2A and 2B are block schematics of arrangements for deriving the data from the recorded template and specimen signature signals which is required for correlating purposes. A template tape 80, is selected from storage, or a tape is recorded from stored template signals to make a template tape. The reading head which is over the coded recognition track on the template tape is connected to an "end signal" recognition circuit 82 to "a one-half signal" recognition circuit 84, and to a "start signal" recognition circuit 86. The heads over the X, Y and P tracks are connected to sampler circuits respectively 88, 90, and 92. These sampler circuits are enabled to sample the signals applied to their inputs in response to pulses from a free-running pulse generator 94, when an And gate 96 is enabled. The tape 98, on which the specimen signals have been recorded, has the heads over the X, Y and P tracks connected to the respective samplers 100, 102, and 104. There is also a head positioned over the coded recognition track, which is connected to a one-half signal recognition circuit 106, an end signal recognition circuit 108, and a start signal recognition circuit 110.

The correlation process to be described uses a technique wherein the specimen tape is made to lead the template tape by successive increments and also is made to lag the template by successive increments. A number of different techniques may be employed to accomplish this. One technique is to use a signal head over each X, Y and P track and to start the reading of the specimen tape at successive intervals ahead of the reading of the template tape for lead purposes, and to start reading the specimen tape at successive intervals behind the template tape signals for lag purposes.

Another technique is to use multiple heads on the specimen tape, for example, over the X, Y and P tracks, which are successively spaced behind a main reading head and other reading heads which are successively spaced ahead of the main reading head, in the direction of motion of the tape. By successively enabling output to be read from the reading heads behind the main reading head, successive delays in reading the specimen signature signals may be achieved with respect to the reading of the template signature signals. By successively enabling the read-out from the heads placed ahead of the main reading head, read-out at successive lead intervals may be achieved from the specimen tape with respect to the template tape. An alternative arrangement may be to duplicate the sampling circuits and the following circuits which will be described, whereby instead of rewinding the tape and starting it forward for each different head from which the read-out is to be obtained, the read-outs may be obtained in one pass of the tape, which can be stored and then called up for use as required. In the interests of simplicity in the circuitry to be described, the description that follows will be of the arrangement where the read-out is obtained from one set of X, Y and P heads at a time and the specimen signature tape is rewound after each pass.

Both tapes are started together and at the same speed. When the start signal recognition circuits 86 or 110, recognize a start signal on either the template or specimen tapes, they apply their outputs to an And gate 112. And gate 112 output is applied to an And gate 113 and sets a flip flop 134. And gate 113 is enabled by the set output of flip flop 134. Thus, And gate 113 can apply its output to set a flip flop 114. The set output of flip flop 114 is applied to an Or gate 116 whose output constitutes an enabling input to the And gate 96, whereby it may pass pulses from the free-running pulse generator 94. These pulses are applied to the sampler circuits 88, 90, 92 and 100, 102 and 104. These pulses are also applied to a counter 118 to be counted. The count of this counter is designated as n. When either of the tapes has moved to the extent that the one-half signal is under the reading head over the coded track, either one-half signal recognition circuit 84 or 106 generates an output which is applied to an Or gate 120. The output of the Or gate 120 resets flip flop 114 whereby And gate 96 stops passing pulses and the samplers stop sampling the X, Y and P circuit signals from the respective tapes 80 and 98. The output of Or gate 120 also resets start signal recognition circuits 86 and 110.

The successive samples of the X, Y and P signals on the tapes 80 and 98, are applied to the respective analog to digital (A to D) converters respectively 122, 124, 126, 128, 130, and 132. The inputs to these respective A to D converters are the outputs of the samplers 88 through 104. The outputs of these respective A to D converters, which constitute digitized samples of the X, Y and P signals from their respective tapes 80 and 98, are applied to the computing circuitry shown in FIG. 3. These signals are respectively designated as Xti, Yti, Pti and Xsi, Ysi and Psi. The letter t stands for template and the letter s stands for specimen.

When the operation of deriving samples from the first one-half of the template and specimen signature signals is terminated, it is necessary to start deriving specimen samples from the second half of these signature signals. The flip flop 134 is assigned the task of providing outputs, indicative of this fact. The set output of this flip flop is provided during the interval when the first half of the signalture signals on the tapes are being compared, and the reset output is being provided by this flip flop during the intervals when the second halves of the signature on the tape are being compared. Flip flop 134 is set by the output of And gate 112 which occurs when an output is received from both of the start signal recognition circuits 86, 110. The signal which resets flip flop 134 is received from circuitry shown in FIG. 4 indicating the fact that second halves of the recorded signals should be processed.

In the next sequence of operations, the one-half signals on the respective template and specimen tapes are recognized in the same manner as the start signals, and the end signals on these tapes are recognized as terminating signals. Accordingly, the tapes are started together and when the one-half signal recognition circuits detect the one-half signal code marker on either of the tapes, their outputs are applied to an And gate 140. The output of And gate 140 constitutes an input to an And gate 142, which is enabled by the reset output of the flip flop 134. The output of the And gate 142 sets a flip flop 144. The set output of flip flop 144, constitutes a second input to the Or gate 116, whose output enables the And gate 96 to pass pulses from the pulse generator 94 to the counter 118, and to the samplers respectively 88 through 104. Upon the recognition of an end signal by either of the recognition circuits 82 or 108, their outputs are applied to an Or gate 146. Or gate 146 output resets both half signal recognition circuits and also constitutes one input to an And gate 148. The And gate 148 is enabled to provide an output, in response to the reset signal from the flip flop 134, which occurs when the second halves of the template and specimen signatures are being compared.

The output from And gate 148 resets flip flop 144 whereupon the And gate 96 is disenabled.

It is necessary to reset the counter 118 just before a new pass at the tapes is to occur. This is achieved by applying the output from the And gate 113 and the output from And gate 148 to an Or gate 150. The output of Or gate 150 resets counter 118 each time the tapes have been started for a new pass.

FIGS. 3A–3B — CORRELATION CO-EFFICIENT CALCULATING CIRCUITS

Figure 3A:
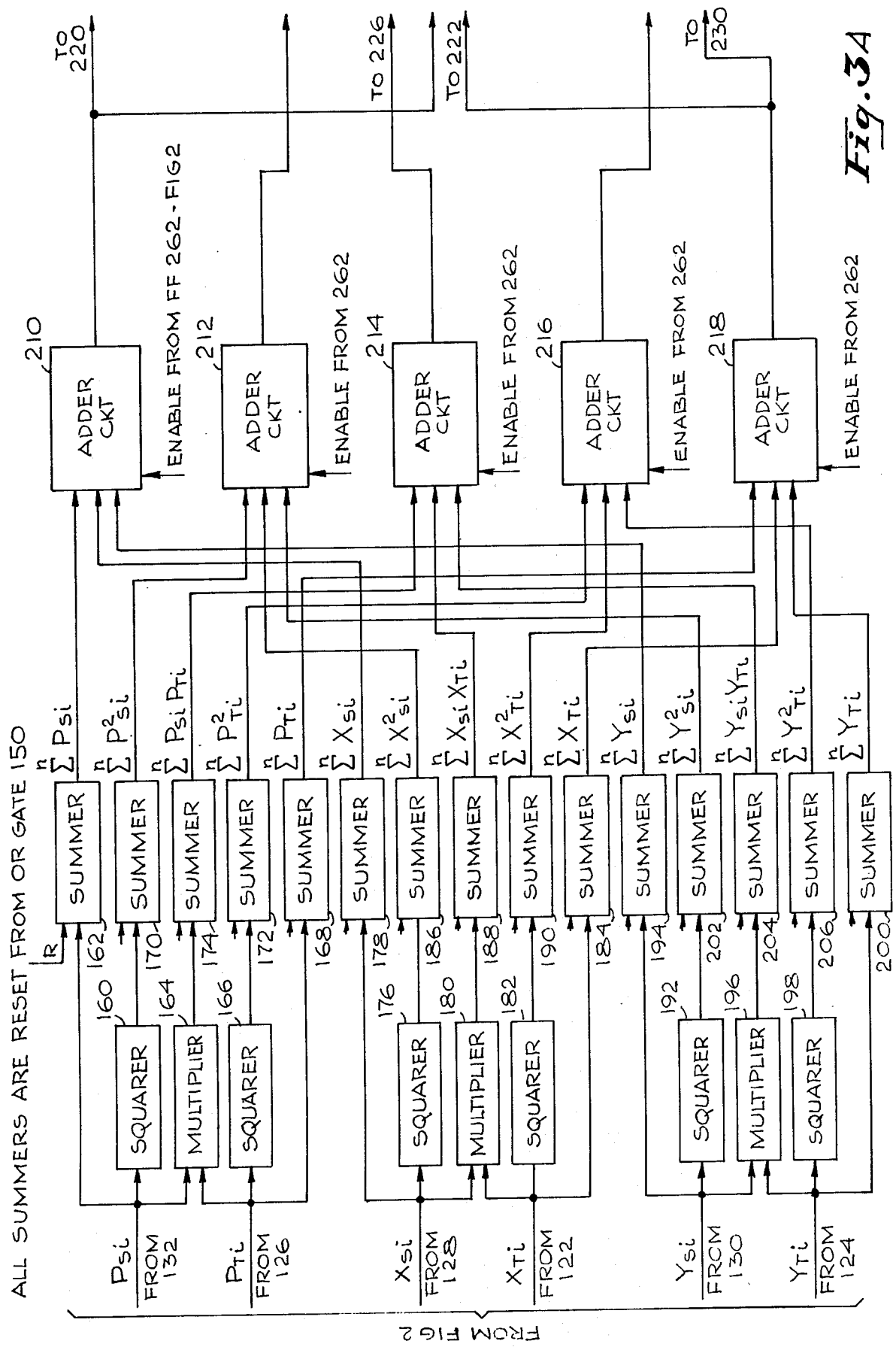
FIGS. 3A and 3B are block schematics of an arrangement for calculating correlation values from the values generated by the circuitry shown in FIG. 2.
Figure 3B:
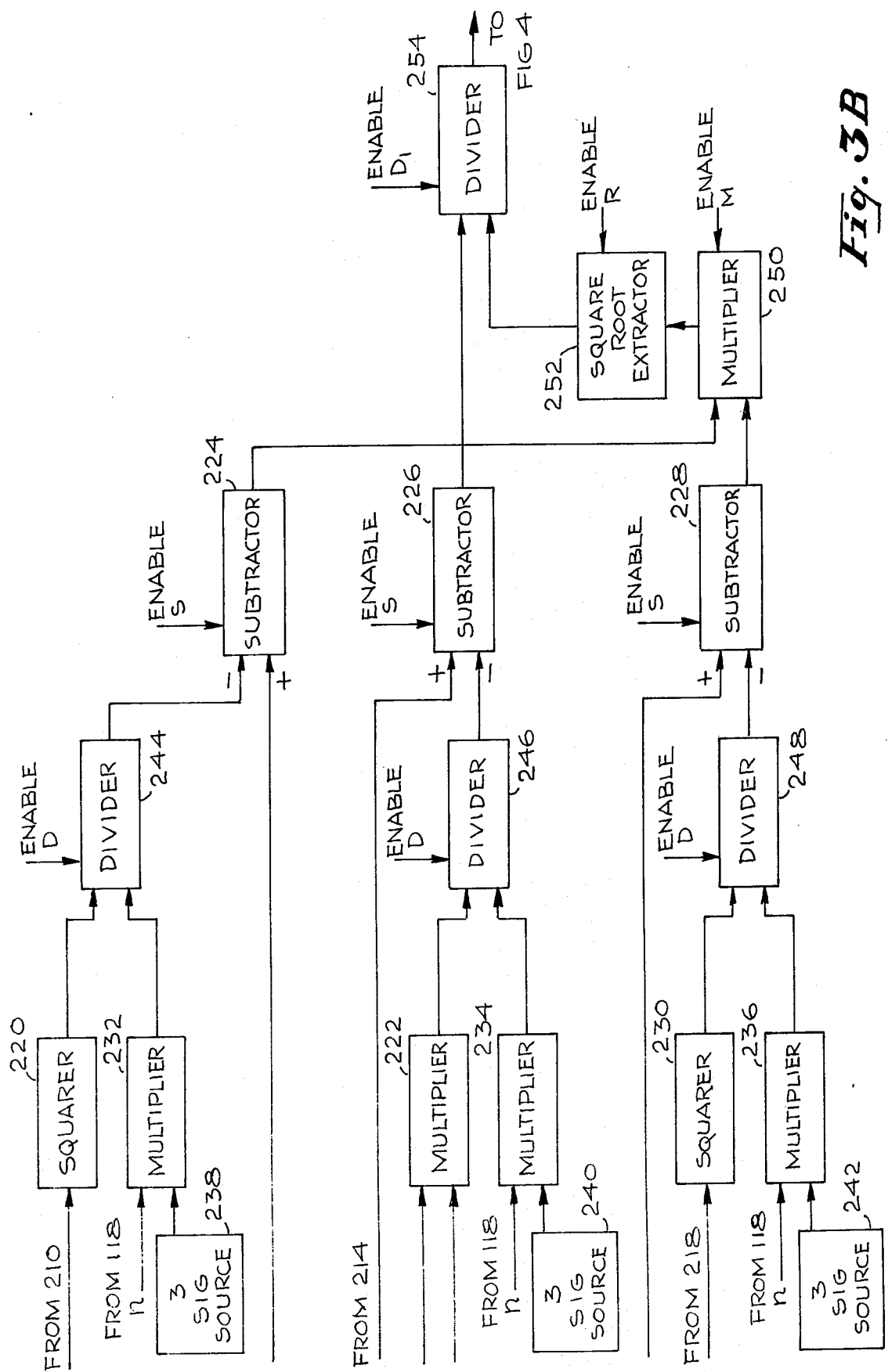

The circuits shown in FIGS. 3A and 3B form a "Pearson Product Moment Correlation Co-efficient" over the three channels of data. This is computed using the following equation implemented by FIG. 3.

$$C_l = \frac{(\Sigma Psi Pti + \Sigma Xsi Xti + \Sigma Ysi Yti)}{\sqrt{(\Sigma Psi^2 + \Sigma Xsi^2 + \Sigma Ysi^2) - \frac{1}{3n}(\Sigma Psi + \Sigma Xsi + \Sigma Ysi)^2}}$$

-continued
$$\frac{-\frac{1}{3n}(\Sigma Psi + \Sigma Xsi + \Sigma Ysi)(\Sigma Pti \Sigma Xti + \Sigma Yti)}{\sqrt{(\Sigma Pti^2 + \Sigma Xti^2 + \Sigma Yti^2) - \frac{1}{3n}(\Sigma Pti + \Sigma Xti + \Sigma Yti)^2}}$$

The Psi output from the A to D converter 132 is applied to a squarer circuit 160, to a summer circuit 162, and to a multiplier circuit 164. The Pti output of A to D converter 126 is applied to the multiplier circuit 164, the squarer circuit 166, and to a summer circuit 168. The summer circuits effectively integrate or add the digital samples which are reserved thereto, the squarer circuits respectively 160 and 166 square their inputs and apply them to summer circuit 170, 172, respectively. The output of the multiplier 164, which is the product Psi × Pti, is applied to the summer circuit 174.

The Xsi output from A to D converter 128 is applied to a squarer circuit 176, to a summer circuit 178, and to a multiplier circuit 180. The Xti output from A to D converter 122 is applied to the multiplier circuit 180, to another squarer circuit 182, and to another summer circuit 184. The output of the square circuit 176 is applied to a summer circuit 186, the output of the multiplier circuit 180 is applied to a summer circuit 188, and the output of the squarer 182 is applied to a summer circuit 190.

The Ysi output from A to D converter 130 is applied respectively to the squarer circuit 192, the summer circuit 194, and the multiplier circuit 196. The Yti output from the A to D converter 124 is respectively applied to the multiplier circuit 196, a squarer circuit 198, and to another summer circuit 200. The output from the squarer circuit 192 is applied to a summer circuit 202. The output from the multiplier circuit 196 is applied to a summer circuit 204, and the output of the squarer circuit 198 is applied to a summer circuit 206.

The same signal that resets the counter 118, in FIG. 2, namely the output of Or gate 150, is also used to reset all of the summers shown in FIG. 3, just before a new tape pass.

An adder circuit 210 adds the outputs from the summers 162, 178, and 194, when it is enabled. An adder circuit 212, adds the outputs from summer circuits 170, 186, and 202 when it is enabled. An adder circuit 214, adds the outputs of summer circuits 174, 188, and 204, when it is enabled. An adder circuit 216 adds the outputs of summer circuits 172, 190 and 206, when it is enabled. An adder circuit 218 adds the outputs from summers 168, 184 and 200 when it is enabled.

The output from the adder circuit 210 is applied to a squarer circuit 220 and also to a multiplier circuit 222. The output of the adder circuit 212 is applied to a subtractor circuit 224. The output of the adder circuit 214 is applied to a subtractor circuit 226. The output of the adder circuit 216 is applied to a subtractor circuit 228. The output of the adder circuit 218 is applied to a squarer circuit 230, as well as to the multiplier circuit 222.

The respective multiplier circuits 232, 234, and 236, have applied thereto the count of counter 118, which has been designated as $n$. Also applied to the multipliers 232, 234 and 236 is the digital value 3 from the respective 3 signal sources, 238, 240 and 242. Thus each one of these multipliers will provide as its output, the product of the digital number 3 and digital value $n$, received from the counter, to the respective dividers 244, 246 and 248. The dividers, when enabled, will divide the inputs, which in the case of the divider 244, is the output of the squarer circuit 220 by 3n. The divider 246 will divide the output of the multiplier 222 by 3n. The divider 248 will divide the output of the squarer 230 by 3n. These dividers are enabled after counter 118 has reached its n count.

Subtractor 224 when enabled will subtract the output of the adder 212 from the output of the divider 224. Subtractor 226, when enabled, will subtract the output of the divider 246 from the adder 214. The subtractor 228, when enabled, will subtract the output of the adder 216 from the divider 248. The outputs of subtractors 224 and 228 are applied to a multiplier 250 which, when enabled, will multiply its inputs and apply them to a square root extractor circuit 252. This circuit, when enabled, extracts the square root of its input and applies this to a divider circuit 254. This divider circuit, when enabled, divides the output of the subtractor 226 by the output of the square root extractor 252. The output of the divider 254 is the value $C_l$ or the correlation value, for the set of inputs received during the preceding interval.

The circuitry for the successive enabling of the circuits in FIG. 3 is as shown in FIG. 2. The output from Or gate 120, which occurs when a one-half signal is sensed by either of the recognition circuits 84 or 106, during a first one-half pass at the signatures is applied to an Or gate 260. The other input to the Or gate 260 is the output of And gate 148, which occurs when an end signal is sensed by the recognition circuits 82 and 108 during the passes at the second halves of the signatures. Or gate 260 output sets a flip flop 262. The set output of the flip flop 262 enables the adder circuits 210 through 218, shown in FIG. 3. The set output of the flip flop 262 also enables an And gate 264 to let pulses from the free-running pulse generator 94 be applied to a counter 266. The first count output of the counter, designated by D, enables the dividers 244, 246 and 248. The second count output of the counter, designated by the letter S, enables the subtractors 224, 226 and 228. The third count output from the counter, designated by the letter M, enables the multiplier 250. The fourth count output of the counter, designated by the letter R enables, the square root extractor. The fifth count output of the counter, designated by the letter D1 enables the divider 254. The last count of the counter goes to another counter 270, shown in FIG. 4. It is used to advance the count of that counter. The counter 266 and the flip flop 262 are reset by the output of Or gate 150. This occurs at the start-up of each new correlation sequence.

FIG. 4 COMPARING CORRELATION VALUES

The last count output of counter 266 in FIG. 2, which occurs at the end of the computation of the correlation value by the circuitry shown in FIG. 3, is applied to a two-count counter 261 driving it to its first count. This enables gates 262 to transfer the correlation value Cl from divider 254 into a register 264. Upon the conclusion of the next calculation of a correlation value by the circuitry shown in FIG. 3, the two-count counter 261 is driven to its second count state, thereby enabling gates 267 whereby the contents of the divider 254 are entered into a register 268. The two-count of the counter 261 is also used to enable an And gate 270 whereby it can apply the last count signal received from counter 266 delayed, by a delay circuit 272, to a subtractor 274. This enables the subtractor to subtract the contents of register 264 from the contents of register 268.

If the contents of register 268 exceed the contents of register 264, then the subtractor will apply a positive indicating signal to a sense amplifier 276. If the result of this subtraction is negative, this is applied to a negative sense amplifier 278. If the result of the subtraction is negative, then the output of the sense amplifier 278 as will be later described is applied to a state counter 280, causing it to go from its zero to its one count state. If the signal sensed by the positive sense amplifier 276 is positive, then its output is applied to an And gate 282. And gate 282 is enabled by the output from an Or gate 284. Or gate 284 produces an output in response to any one of the 0, 1, 2 or 3 count outputs from counter 280.

The output of the And gate 282 is applied to a set of gates 286 whereby these gates enable the transfer, into a register 290 and a register 264, of the number found in register 268. In summary, when the subtractor provides an output indicative of the fact that the contents of register 268 exceed the contents of register 264, the contents of register 268 are transferred to registers 264 and 290.

When the subtractor indicates that the contents of register 264 are greater than the contents of register 268, as evidenced by a negative output, sense amplifier 278, besides advancing the count of counter 280 by one count, applies its output to an And gate 292. The enabling input to And gate 292 is provided by the output of an Or gate 294, which receives as its input the 0, 1, 2 and 3 counts of counter 280. The output of And gate 292 is applied to a set of gates 296, to enable it to enter the contents of register 264 into register 290.

The manner in which the output of negative sense amplifier 276, during 0, 1, 4 and 5 counts of counter 280, advances the count of counter 280 is as follows. Its output is applied to an And gate 410. And gate 410, enabled by the output of Or gate 412 to applies its input to an Or gate 414, whose output advances counter 280. Or gate 412 produces an enabling output to And gate 410 only in the presence of 0, 1, 4 and 5 counts of counter 280.

The output of sense amplifier 276 is also applied to another And gate 298, which is enabled by the output of an Or gate 300. Or gate 300 provides the enabling output to And gate 298 in the presence of inputs from the fourth through the seventh counts of the outputs of counter 280. The output of And gate 298 is applied to gates 302 which are enabled to enter the contents of register 268 into a register 304 and also to enter the contents of register 268 into register 264.

The output of the negative sense amplifier 278, is applied to an And gate 304, which is enabled in response to output from an Or gate 307. Or gate 306 is enabled by the fourth through the seventh outputs of counter 280. the output of And gate 304 is applied to a set of gates 306, which when thereby enabled transfer into register 304 the same number as is in register 264.

In operation, the circuit shown in FIG. 4 receives each one of the correlation values and enters them into the respective registers 264 and 268. For the first two correlation values, register 264 receives the first and register 268 receives the second. Thereafter, if the difference between the first two correlation values as indicated by the output of subtractor 274 is positive, each succeeding new correlation value will be entered into register 268 and register 264 will receive the preceding correlation value. As soon as the output of subtractor is negative, this is sensed, and used to cause counter 280 to advance its count. In the first mode of operation of the system, or the lag mode, the tape on which specimen parameters are recorded is displaced, by successive increments in one direction relative to the template tape, while both tapes are run at the same speed. This continues until the first negative output of the subtractor occurs whereupon thr counter 280 is set into its one output count state. At this time the system will go into its lead mode wherein the specimen parameter tape is advanced or displaced in the opposite direction, from the lag mode in successive increments until the next negative output of subtractor 274 is sensed. At that time counter 280 is advanced to its second count state and the mode of operation will be one in which the specimen parameter tape is run in successively slower increments with respect to the template parameter tape.

It should be noted that registers 264 and 290 will always carry the largest correlation value, as determined by the subtractor 274 for the first half of the signature comparisons, and registers 264 and 304 will provide the largest correlation value determined by the subtractor 274 for the second half of the signature comparisons.

Upon the occurrence of the first negative output of subtractor 274 during the lead mode of operation, the counter 280 is advanced to its third count state at which time the specimen parameter tape is run at successively higher speed increments with respect to the template tape until the next negative output of the subtractor 274 is sensed. At that time the counter 280 is advanced to its fourth count output state. The system then repeats the four operation modes just described for the second halves of the specimen and template tapes. With the second halves of the tapes the only difference in the operation of the system from operation for the first halves is that gates 302 and 306, together with register 304 will be called into play for the purpose of saving the highest correlation value detected. This is held in register 304. The correlation value in register 268 is transferred into register 264 as long as a positive output from the subtractor is obtained.

It is necessary to remember whether the highest correlation value held in register 290 and 304 has occurred during the lag or lead modes of operation since, as will be subsequently described in detail, the next two modes of operation take place using the lag or lead reading head at which the maximum correlation is detected. This information is stored by a flip flop 308. Flip flop 308 is driven to its set state by the output of an And gate 310. And gate 310 receives as an enabling input the output of an Or gate 312. Or gate 312 receives inputs from the 0 and 4 counts of the counter 280. And gate 310, when enabled in response to the output of the Or gate 312, will pass the first negative output of the sense amplifier 278 which occurs during 0 and 4 counts whereby flip flop 308 is driven to its set state. This negative output of the subtractor 274 occurs when the system is in its lag mode of operation.

Flip flop 308 is reset by the output of an And gate 314, which is enabled by the output of an Or gate 316. Or gate 316 receives the one and five outputs from counter 280. And gate 314 is enabled to pass the positive output of subtractor 274 in the presence of the output of the Or gate 316, whereby flip flop 308 is reset.

The operation of this flip flop is as follows. When counter 280 goes into a 0 or 4 count state, its output is applied to a differentiating circuit 309, the output from which resets flip flop 308. The system goes into its lag mode of operation during count 0 of state counter 280.

Upon the occurrence of the first negative output of subtractor 274, the flip flop 308 is set. The system then goes into its lead mode of operation. Upon the occurrence of the first negative output of subtractor 274, flip flop will be reset. If no negative output occurs during the lead mode of operation, this means that the greatest correlation value occurred during the lag mode of operation. If the flip flop is reset then the greatest correlation value will occur during the lead mode of operation.

Should it occur that the lag mode of operation is run through until the end with the last correlation value being greater than any others, and then, the lead mode of operation takes place, wherein the last obtained correlation value is greater than any found in the lag mode of operation, the flip flop will remain in its reset state and thus indicate that the maximum correlation value occurred during the lead mode of operation.

FIG. 5 — MAGNETIC TAPE HEAD CONTROL SYSTEM

Figure 5:
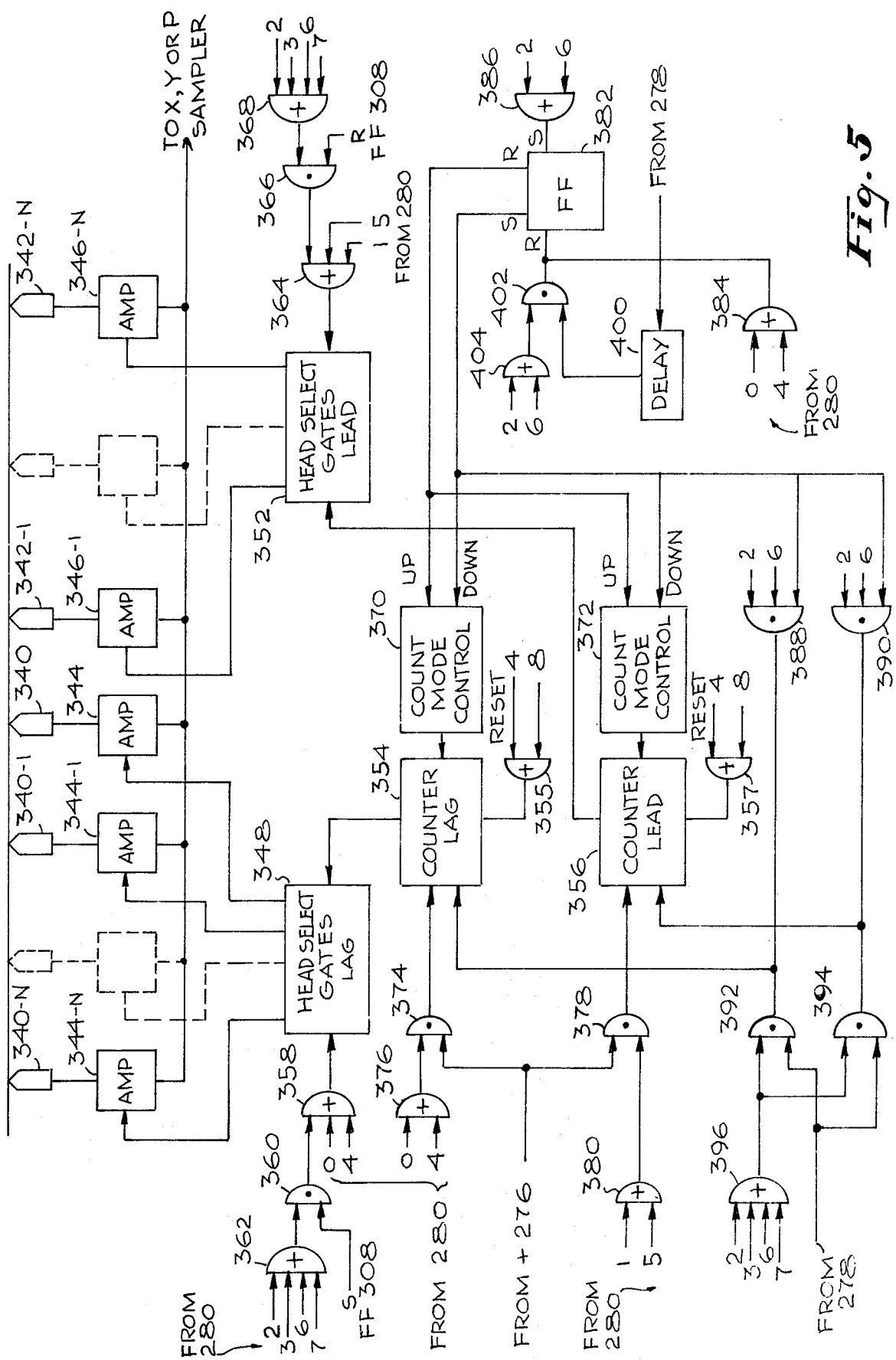

FIG. 5 is a block schematic diagram illustrating how the magnetic tape heads which are used and which are over the various tracks of the specimen parameter tape are actuated. The template tape need have only four heads, one over each of the X, Y and P tracks and one over the start, one-half and end signal track. Thus no selection of heads is necessary. However, as will be seen from the following description, a plurality of heads are used with the specimen tape and a control system for these is required.

As previously described, there are three tape tracks one for pressure signals P, one for X signals and one for Y signals. Each magnetic head and amplifier shown in FIG. 5 actually represents three heads and amplifiers, one over each of these tracks. Three adjacent heads are controlled at a time. By this is meant one head is over the P track, the adjacent head is over the X track and the adjacent head is over the Y track. There is also one head over the track on which the start signal, one-half signal and end signal are recorded. This is not shown, it may be aligned with head 340.

There is a central position at which reading head 340 is located. Reading heads used in the lagging mode of operation are designated as 340-1 . . . 340-n. Reading heads in the leading mode of operation are designated as 342-1 . . . 342-n. There is a gated reading amplifier which is driven by each head. The gated amplifier associated with head 340 is designated by reference numeral 344. The gated amplifiers associated with the delay mode heads respectively 340-1 . . . 340-n have reference numerals 344-1 . . . 344-n applied thereto. The gated amplifier associated with the leading readings heads 342-1 . . . 342-n, bear reference numerals 346-1 . . . 346-n. The outputs of all these amplifiers are applied to an X, or a Y or a P sampler circuit respectively 100, 102, 104 shown in FIG. 2. All of the amplifiers used in the lagging or delay mode have their actuating inputs connected to head select gates 348. All of the leading mode gated amplifiers have their gating inputs connected to head select gates 350. The head which is selected by the gates 348 is determined by the count in a lag counter 354. The determination of which head is selected by the gates 352 is made by the count in a lead counter 356. Head select gates 348 are enabled to select heads in response to the output of an Or gate 358. This Or gate will receive the 0 and 4 count outputs from counter 280 as well as the output of an And gate 360. This And gate is enabled in response to the set or lag output of flip flop 308 as well as the output of an Or gate 362. The input to this Or gate is one of the 2, 3, 6 or 7 counts from the counter 280.

Head select gates 352 are enabled to select a head in response to the output of an Or gate 364. This Or gate receives as inputs either the one or five count output of counter 280 or the output of an And gate 366. This And gate is enabled by the reset or lead output of flip flop 308 and also requires an output from an Or gate 368. The input to this Or gate constitutes any one of the 2, 3, 6 and 7 counts of the counter 208.

Counters 354 and 356 are reversible counters in their mode of operation, that is whether they count up or down, is determined by count mode control circuits respectively 370, 372. The count mode control circuits are initially set so that the counters will count up. Counter 354 has its count advanced in response to the output of an And gate 374. This And gate is enabled by the output of a Or gate 376. This Or gate produces an output in the presence of either the 0 or 4 count from counter 280. The input to And gate 374, which advances the count of the counter 354 is a positive output from sense amplifier 276 in FIG. 4. Each positive output during 0 and 4 counts of counter 280 advances the counter 354 one count and thus activates the next lag head in the series. It will be recalled that the positive output of the amplifier 276 occurs when the latest correlation value exceeds the preceding correlation value.

Counter 356 is actuated in response to the output of an And gate 378. This And gate is enabled in response to the output of an Or gate 380. The Or gate produces outputs when either the one or five count of counter 280 is applied thereto. Positive outputs from sense amplifier 276 which occur during these counts are applied by And gate 378 to the lead counter 356 to advance its count.

It should be noted that both lead and lag counters are reset in response to the output of respective Or gates 355 and 357 which happens upon the occurrence of the fourth and eighth counts of counter 280.

From the description thus far, it will be seen that the lag counter 354 commences actuation of the head sensing amplifiers, in response to the zero count output of counter 280 and will increase its count so long as the successive correlation values are increasing. As soon as a correlation value is determined, which is less than the preceding one, then counter 280 advances to its one count state and lead counter 356 takes over control. Here again, in response to increasing correlation values, counter 356 advances its count and keeps selecting successive lead read amplifiers until a smaller correlation value is reached at which point the counters stops counting. It will be noted that when the counters 354 and 356 stop counting, the end of a zero and one count interval respectively or at the end of the four and five count of counter 280, the counters retain their counts, which in either case is one count higher than the count at which the maximum correlation value was determined. Whether the maximum correlation value occurred during the lead or lag interval is indicated by the output of flip flop 308 in FIG. 4.

The next mode of operation, after lead and lag modes for the first half of the tape have been performed is the mode wherein the specimen tape speed is decremented incrementally. Here the operation desired is to use the head at which the optimum correlation value were calculated as the reading head for the first pass during which the specimen tape runs at 99% of tape speed while the template tape runs at 100% of tape speed. If the correlation value obtained at this time is greater than the maximum correlation value previously determined, then the tapes are rewound and again rerun, this time, using the same head as before, the specimen tape is run at 98% of template tape speed. This decrementing will continue until such time as the correlation value which has been obtained is less than the preceding correlation value, at which time the counter 280 is advanced to its next count state and the fast or expansion mode of operation is entered into.

Should the first pass during the decrementing speed mode of operation produce a correlation value which is less than that obtained during the lagging and leading modes of operation then it is desired to test the correlation values on either side of the head under which this negative value has been obtained to see if a correlation value greater than the last one obtained is present. If it is, then the run will continue with decrementing speeds using the last named head. Thereafter, as soon as the first negative signal is derived from the subtractor circuit 274, the system passes to the next mode of operation.

The control of the "count mode control" circuits 370 and 372 is performed by a flip flop 382. This flip flop is set in its reset state by the output of an Or gate 384, upon the occurrence of a zero or a 4 count output from the counter 280. This leaves the count mode operation circuits in their "up count" control states. Upon the occurrence of a two or a four count output from counter 280, an Or gate 386 is enabled to set flip flop 382. The two or the six count state occurs at the end of the lead/lag mode of operation. Flip flop 382, when set, established the count mode control circuits in their down count control states.

It will be recalled from the previous discussion that the count, in either the counter 354 or 356, at the time that the optimum correlation value is obtained in either the lead or lag mode is one count higher than it had at the time the optimum correlation value was computed. The counters are set back one count to this correct value by means of two And gates respectively 388 and 390. Both of these And gates are enabled, upon the occurrence of the two or the six count state output of the counter 280, and the set output from flip flop 382 which occurs after either the two or the six count state signal is received. The output of the And gate 388 is applied to counter 354 causing it to count down one. The output of the And gate 390 is applied to the counter 356 causing it to count down one.

Should the next correlation value which is calculated, exceed the correlation value thus far obtained, when the speed of the specimen parameter tape is run at 99% of the template tape speed, the counter, whether lag or lead, does not have its count changed. As will be shown in FIG. 8, the next tape speed is selected and the tapes are started again until a first negative output from the subtraction 274 is encountered at which time the system passes to the next mode of operation. However, should the correlation value calculated be smaller than the highest correlation value obtained during the lead or lag mode, as the case may be, then the subtractor circuit negative output, as detected by the negative sense amplifier 278, changes the count of the counter 354 or 356, making it less by one count. This is achieved by circuitry comprising two And gates, respectively 392 and 394. The And gate 392 applies its output to the counter 354 and causes it to increase or decrease as determined by the count mode control circuit 370. The And gate 394 applies its output to counter 356, likewise causing it to increment or decrement its count, as determined by the count mode control circuit 372. An enabling input to the And gates 392 and 394 constitutes the output of an Or gate 396.

Or gate 396 produces an output when it receives either the 2, 3, 6 or 7 output of the counter 280. The other input to the And gates 392 and 394 constitutes the output from negative sense amplifier 278. The output from amplifier 278 is also applied, through a delay circuit 400 to an And gate 402. The enabling input to this And gate is the output of the Or gate 404, which occurs in response to either the two or the six count output from the counter 280. The output of the And gate 402 resets flip flop 382, as a result of which the count mode control circuits 370 and 372 are now in their up count modes.

Since it is desired to now test the correlation value while preventing counter 280 from changing its count and while using the head two heads away from the one from which the test was just made, or, stated in another way, to make the test from the head on the other side of the first head used for this particular test mode, it is necessary to delay the operation of the counter 280 so that its count will not increase until after that test has been made. This requires holding up the advance of counter 280 until three negative outputs have been obtained from subtractor 274. This will become clearer if one designates the head from which the initial reading was taken ss head 0, the head below it is −1, and the head above it is +1. Thus, when head 0 is used and a first negative read out occurs, a transfer is made from head 0 to head −1. If upon using head −1 a second negative read out occurs a transfer from head −1 back to head 0 is made. A third negative readout occurs using head 0, as a result of which a transfer occurs to head −1. A read out then is taken from head +1. If this read out is negative, then the counter 280 is transferred to its next mode of operation. If this readout is positive, then further decrements of tape speed are used.

Since flip flop 382 has been reset upon the occurrence of the first negative read out, the successive negative readouts will not cause the flip flop 382 to shift.

However, to maintain the count in counter 280 until the fourth negative output from the subtractor is obtained, the circuity shown in FIG. 4 is employed. The output of sense amplifier 278 is applied to an And gate 410. This And gate is enabled by the output of an Or gate 412. The Or gate output is received during the 1, 1, 4 and 5 count outputs of counter 280. The And gate output is applied to an Or gate 414. The output from Or gate 414 advances the count in counter 280. The output of the sense amplifier 278 is also applied to an And gate 416. This And gate is enabled in response to the output of an Or gate 418. This Or gate is enabled in response to the 2, or 3, or 6, or 7 count outputs from the counter 280. This And gate output is applied to a 3 count counter 420. As a result, the negative outputs of subtractor 274, are applied by the sense amplifier 278 which through And gate 416 to advance the count of the 3 count counter 420. When the 3 count counter attains its third count, an And gate 422 is enabled to pass the next negative output, sensed by amplifier 278, through Or gate 414 to counter 280 to cause it to advance its count.

To take care of the situation where the first correlation value obtained during this run is higher than the correlation value obtained from the lead/lag mode of operation, and thus obviating the need for head shifting, a flop flop 424 is employed to store the fact that a first positive output has occurred. This flip flop is reset upon the occurrence of a 2, 3, 6 or 7 count output from counter 280, which is applied to an Or gate 426. The output of the Or gate resets the flip flop 424. The output of the Or gate 424 is also one input to an And gate 428. It enables the And gate which, upon the occurrence of an output from positive sense amplifier 276, the And gate 428 sets flip flop 424. The set output of this flip flop enables an And gate 430 to apply the next negative output from subtractor 274 to the Or gate 414 whereby counter 280 will advance its count to the next state.

At the end of the "signature contraction" mode, counter 280 assumes its third count state signaling the beginning of the "signature expansion" mode. The procedure is the same as previously described except for the specimen parameter tape speed being increased an increment each time the calculated correlation value exceeds the previous correlation value. The tape head that is used for reading the specimen signature parameters is the one that has provided the optimum correlation value in the preceding runs. Here again, should the first run in this mode cause a correlation value which is less than the one obtained previously, then it is desired to test the correlation value obtainable from the head adjacent to the one from which the reading was taken in a lagging mode, and if this provides a more positive correlation value then speed increments are increased until the first negative value occurs.

Should the last correlation value obtained as a result of the second run in the signature expansion mode still be less than the one obtained from the previous runs, then it is desired to obtain a correlation value using a reading head which leads by two increments the head from which the latest correlation value has been taken. If this provides a larger correlation value, then speed increments are increased until the first negative value occurs at which time the run is terminated. If this last correlation value still does not provide a positive output from the subractor, then the run is terminated.

In essence, the modus operandi for this mode of operation is the same as for the signature contraction mode of operation and the circuitry which has just been described will operate to effectuate this.

When the first half of the specimen signature has been compared with the first half of the template signature, then register 290 in FIG. 4 will contain the largest correlation value obtained during the test on the first half. Thereafter the second half of the specimen signature is compared with the second half of the template signature. The operations described for the first half of the signature comparison are the same for the second half of the signature comparisons, with the counter 280 providing the counts for sequencing these second half operations. The fourth through the seventh counts of counter 180 sequence the second half operations with the eighth count signalling the termination of the verification procedure.

The eighth count of counter 280 is used for resetting, where required, throughout the system. Counter 280 is reset to its zero count at the commencement of the next verification operation.

FIG. 6 — Final Verification Circuit

FIG. 6 shows the arrangement for the final verification of the sample signature. The register 290 in FIG. 4 contains the highest correlation value obtained as a result of the comparisons of the first signature halves, and register 304 contains the results of the comparisons as a result of the second signature halves. These register contents are applied to an average value circuit 432, shown in FIG. 6, which is enabled, in response to the eighth count from counter 280 to add these two values and divide by two to obtain an average. The average value is applied to a comparator 434. A threshold value circuit 436 applies a value signal to the comparator 434 representing the level which the correlation value signal must either equal or exceed in order to provide a valid indication. Comparator 434 accordingly compares the average value circuit output with the threshold circuit output and provides an indication as to whether or not the sample signature is valid or invalid.

The foregoing represents one way of combining the correlation values obtained to determine validity or invalidity. There are other ways of performing this operation well known to those skilled in the art. For example, the maximum correlation values from each mode of operation described may be saved and corresponding correlation values may be combined and compared with value signals to provide a composite correlation. Therefore, what is shown and described here should be considered as exemplary, but not limiting.

Figure 7:
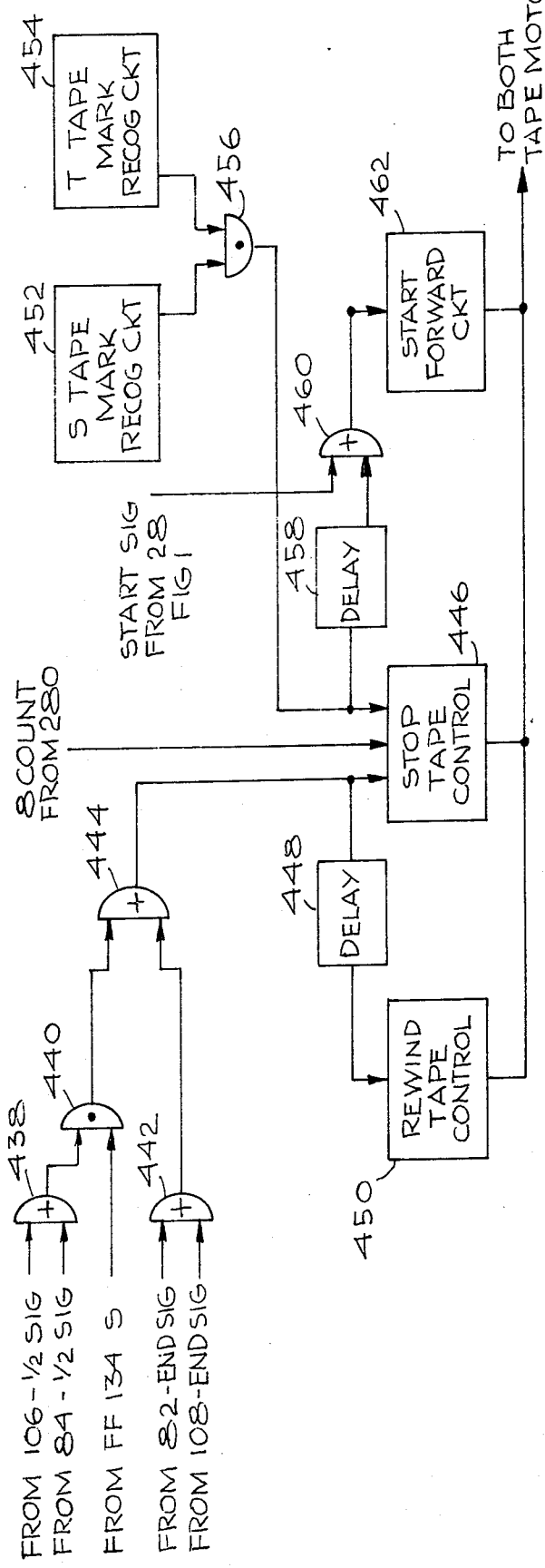
FIG. 7 is a block schematic diagram for controlling magnetic tape motion for the lead/lag mode of operation of this system.

FIG. 7 — Tape Motion Control Circuit

Both tapes have to be instructed as to when to start, when to stop, and to rewind. Both tapes will initially be started in response to a start signal of the type shown in FIG. 1, provided by the start signal generator 28. An Or gate 438 provides an output in response to an input from either one of the half signal recognition circuits 84 or 106, shown in FIG. 2. The Or gate output is applied to an And gate 440. This And gate is not enabled to pass either one of these signals unless it is enabled by the set output from flip flop 134, shown in FIG. 2, which occurs only while the first one-half of the specimen signature and template signature processing operation, whenever the half signal code is recognized on either of the tapes, the tape will be made to stop.

The tape should also be stopped upon the recognition of the end signal on either specimen or template tape. These signals, which are the outputs of the circuits 82 and 108 are applied to an Or gate 442. The ouputs from the And gate 440 and the Or gate 446 are applied to an Or gate 444. This Or gate applies its output to the stop tape control circuit 446 which orders the motor control circuit to stop moving both tapes. The stop tape control signal is also applied to a delay circuit 448. This circuit delays the signal long enough to enable the tapes to fully come to a stop. It then applies the signal to a rewind tape control circuit 450. This tape control instructs both tape motors to rewind to an initial or starting position. The starting position for the tapes can be any desired marking such as a hole on the tape. It also can be the start signature mark on the tape. The mark on the specimen tape is recognized by an S tape mark recognition circuit 452. The mark on the template tape is recognized by a T tape mark recognition circuit 454. These circuits apply their outputs to an And gate 456. The output of the And gate is applied to the stop tape control circuit to cause the tapes to stop their rewind operation. The output of the And gate 456 is also applied to a delay circuit 458. The delay circuit, delays the application of the signal to a following Or gate 460, for the time required for the tape to come to a full stop.

Then, the output of the delay circuit is applied through the Or gate 460 to a start forward circuit 462. Another input to the Or gate 460 is a start signal from the start signal generator shown in FIG. 1. Thus, both tapes are started forward together. Both tapes are stopped and rewound together. The 8 count output of counter 280 stops the tape operation.

Figure 8:
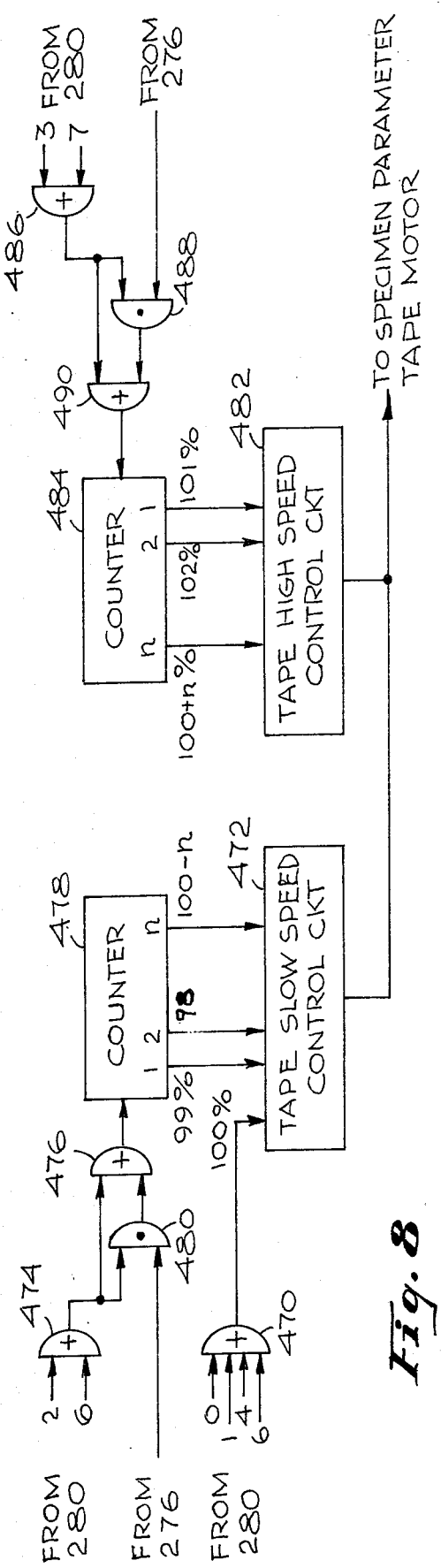
FIG. 8 is a block schematic diagram of an arrangement for controlling tape speed for the expand/contract mode of operation of the system.

FIG. 8 — Tape Speed Control Schematic Diagram

FIG. 8 shows how the tape speeds are controlled for the contraction and expansion modes of operation of the parameter signal tape. An Or gate 470 has applied thereto, from counter 280, the O, 1, 4 and 5 count outputs. In response to any one of these count outputs, a tape slow speed control circuit 472, instructs the specimen parameter tape to operate at 100% normal speed. This is the same speed as the one at which the template tape will be run. Upon the occurrence of a two or a six count output of counter 280, an Or gate 474 is enabled to apply an output to another Or gate 476, the output from which is applied to a counter 478. This causes the counter 478 to assume its first count condition. This causes a one count output to be applied to the tape slow speed control circuit 472 enabling it to cause the tape to be run at 99% of its normal speed. The output of the Or gate 474 is also applied to an And gate 480. The other input to the And gate 480 is a positive output from the subtractor circuit 274 by way of positive sense amplifier 276. And gate 480 has its output connected to the Or gate 476 whereby, when a positive output is obtained, the counter 487 advances its count by one thereby decrementing the tape speed for the subsequent run.

For advancing or incrementing the speed of the tape, for the expansion mode, a tape high speed control circuit 482 is employed. This circuit increments the tape speed in response to the output of a counter 484. The first count output causes the tape speed to be incremented to 101% of normal. The second count output of 102% of normal, etc. The counter advances to its first count state upon the application of either a 3 or a 7 count output from counter 280, both of which are applied to an Or gate 486. The output of the Or gate 486 is used to enable an And gate 488, and is also applied to an Or gate 490. The output of Or gate 490 advances counter 484. And gate 488, when enabled, passes positive signal from plus amplifier 276 to Or gate 490.

ALL DIGITAL EMBODIMENT OF THE INVENTION

FIGS. 9, 10, 11 and 12, taken together with FIGS. 3, 4 and 6 of the drawing, can provide another embodiment of the invention which uses all digital techniques and wherein magnetic tapes are not used.

FIG. 9 — INPUT TO DIGITAL EMBODIMENT OF INVENTION

Figure 9:
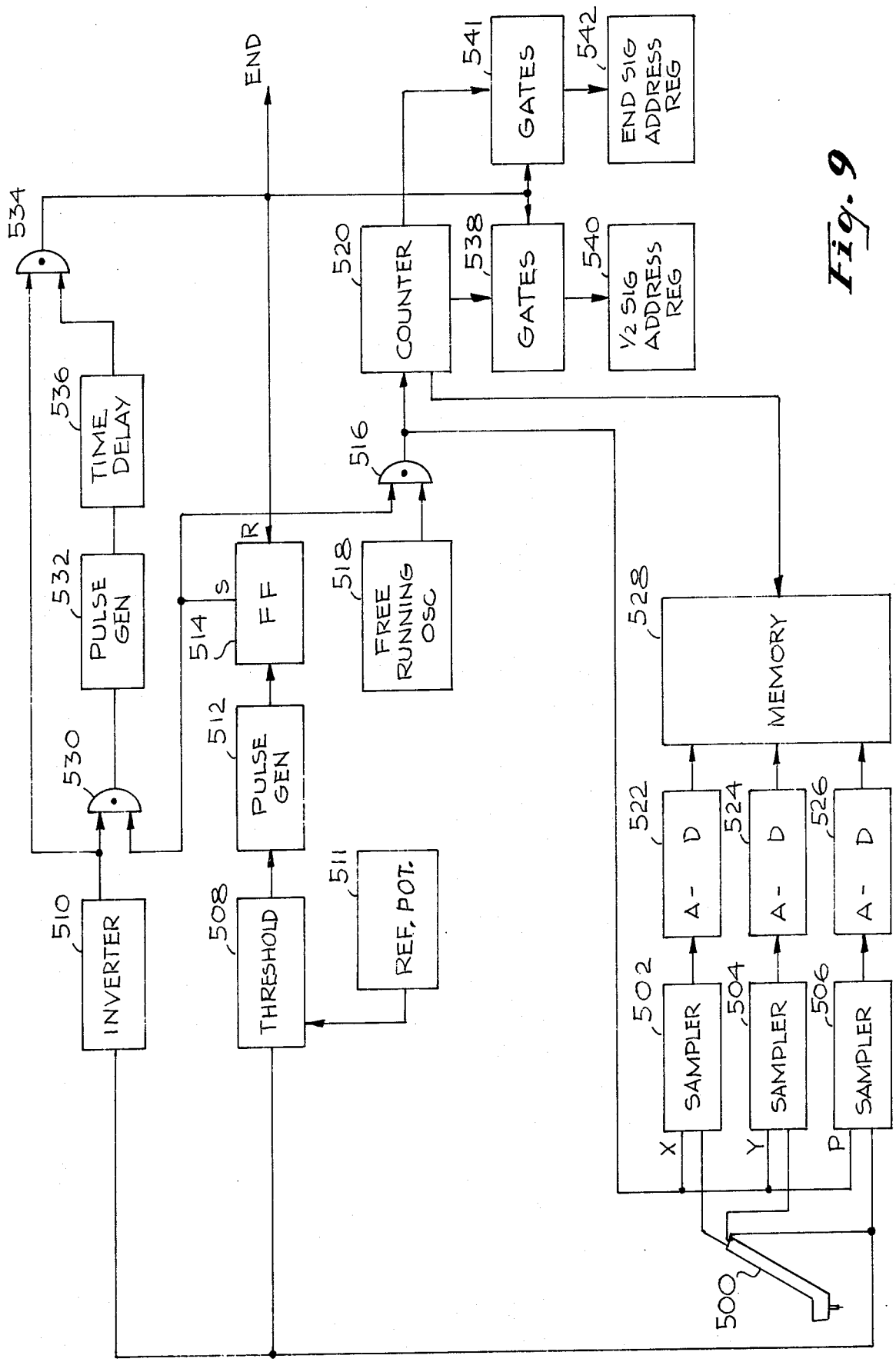
FIG. 9 is a block schematic diagram for a digital embodiment to sample the pen and store digital samples in a memory.

Referring now to FIG. 9, there may be seen a block schematic diagram of the input circuitry required. This comprises a pen 500 which may be used for the signing of the template signatures, as well as for the signing of the sample signatures. The pen 500 generates signals representative or pressure and forces of the pen in the X and Y directions, which are made when the pen is used by a person.

The three signals, namely, X, Y and P, are applied to sampler circuits respectively 502, 504, and 506. It should be noted that the pressure signal P is also applied to a threshold circuit 508, and to an inverter 510. When the amplitude of the pressure signal exceeds a reference level, provided by a reference circuit 511 (Po), the threshold circuit applies an output to a pulse generator 512. The pulse generator generates a pulse which sets a flip flop 514. The set output of the flip flop enables an And gate 516 whereby it can pass pulses provided by a free-running generator 518. The And gate 516 output, consisting of pulses from the oscillator 518, is applied to a counter 520 enabling it to count the number of pulses which are being provided. The output of the And gate 516 is also applied to the three samplers 502, 504 and 506, enabling them to simultaneously sample the three signals being provided by the pen 500. The respective outputs of the samplers 002, 504, and 506 are applied to analog to digital converters (A to D), respectively 522, 524, and 526. The outputs from these A to D converters are stored in a memory 528, at address locations which may be provided by the output of counter 520.

It is known that a person in the course of signing a signature, or writing a few words will move the pen off the paper to cross t's, dot i's or commence a new word. In order to insure that the processing of the signature being written is not terminated too soon, the output of the inverter 510 is applied to an And gate 530. This And gate 530 is maintained inoperative except in the presence of the set output of flip flop 514. When the P signal applied to the inverter is no longer present, due to a lifting of the pen, the inverter output signal can pass through Andgate 530 to a pulse generator 532, enabling it to generate a pulse output. The inverter output is also applied to an And gate 534. The pulse generator output is applied to a time delay circuit 536. If the inverter output is still present at And gate 534 by the time the output of pulse generator 532 passes through the time delay circuit 536 and is applied to the And gate 534, then And gate 534 can apply its output to the flip flop 514 causing it to be reset. This occurs when the pen has been lifted from the paper long enough to indicate that the signature has been terminated.

The end of signature signal, which is actually what is represented by the output of And gate 534, is also applied to two gates respectively 538, and 541. These gates are enabled, in the presence of the "end of signature signal" to transfer the contents of counter 520 to following registers. Gates 538 transfer the count output of the counter 520 to a half-signal address register 540. The transfer is made in a manner to drop the least significant bit of the output of counter 520 whereby the count in half-signal address register 540 will be one-half of the value of the counter 520 output, which is effectively the midpoint of the signature which has just been signed. Gates 540 transfer the full count of counter 520 into an "end signal address register 542."

Figure 10A:
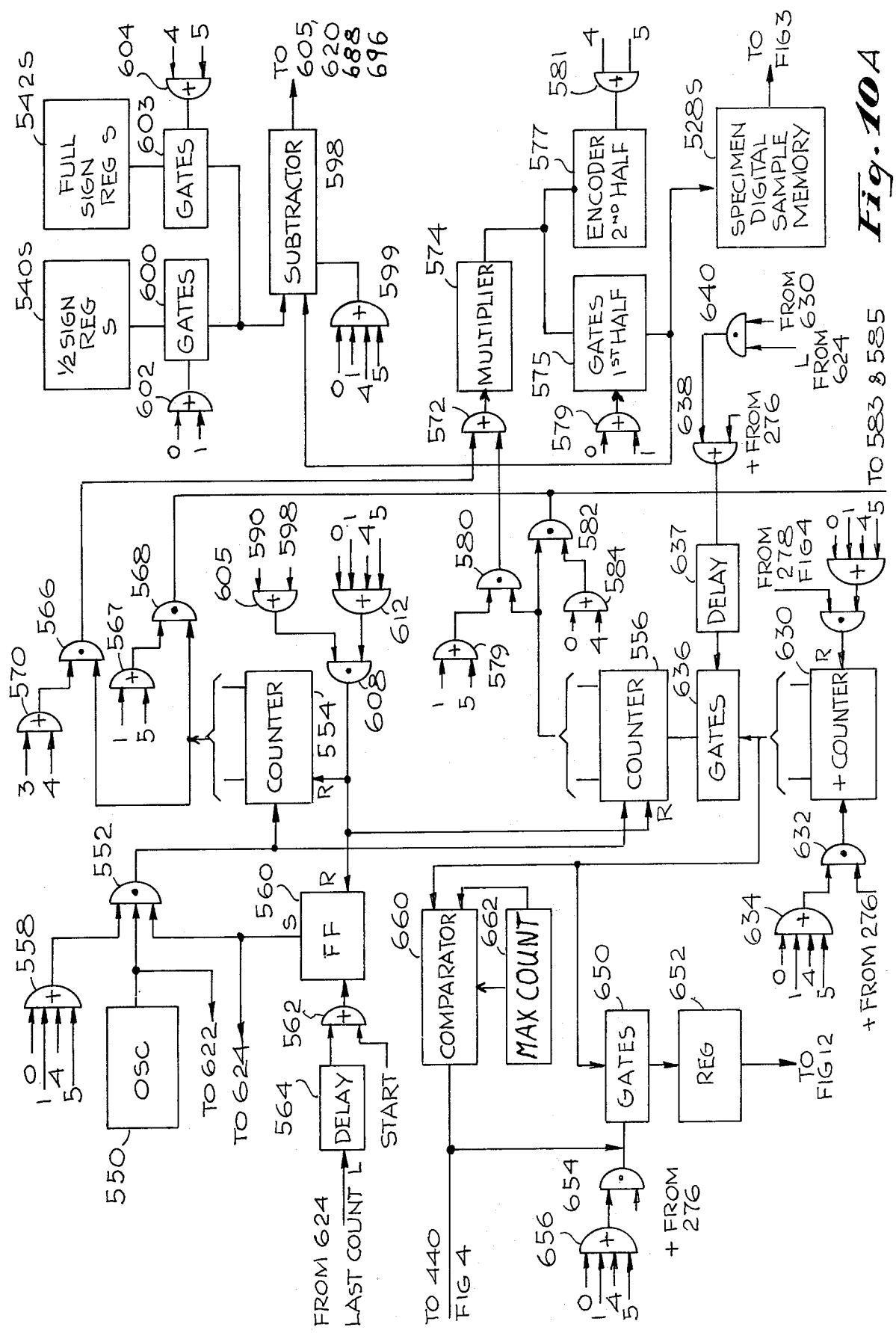
FIGS. 10A and 10B are block schematics illustrating a digital system for the lead/lag mode of operation.
Figure 10B:
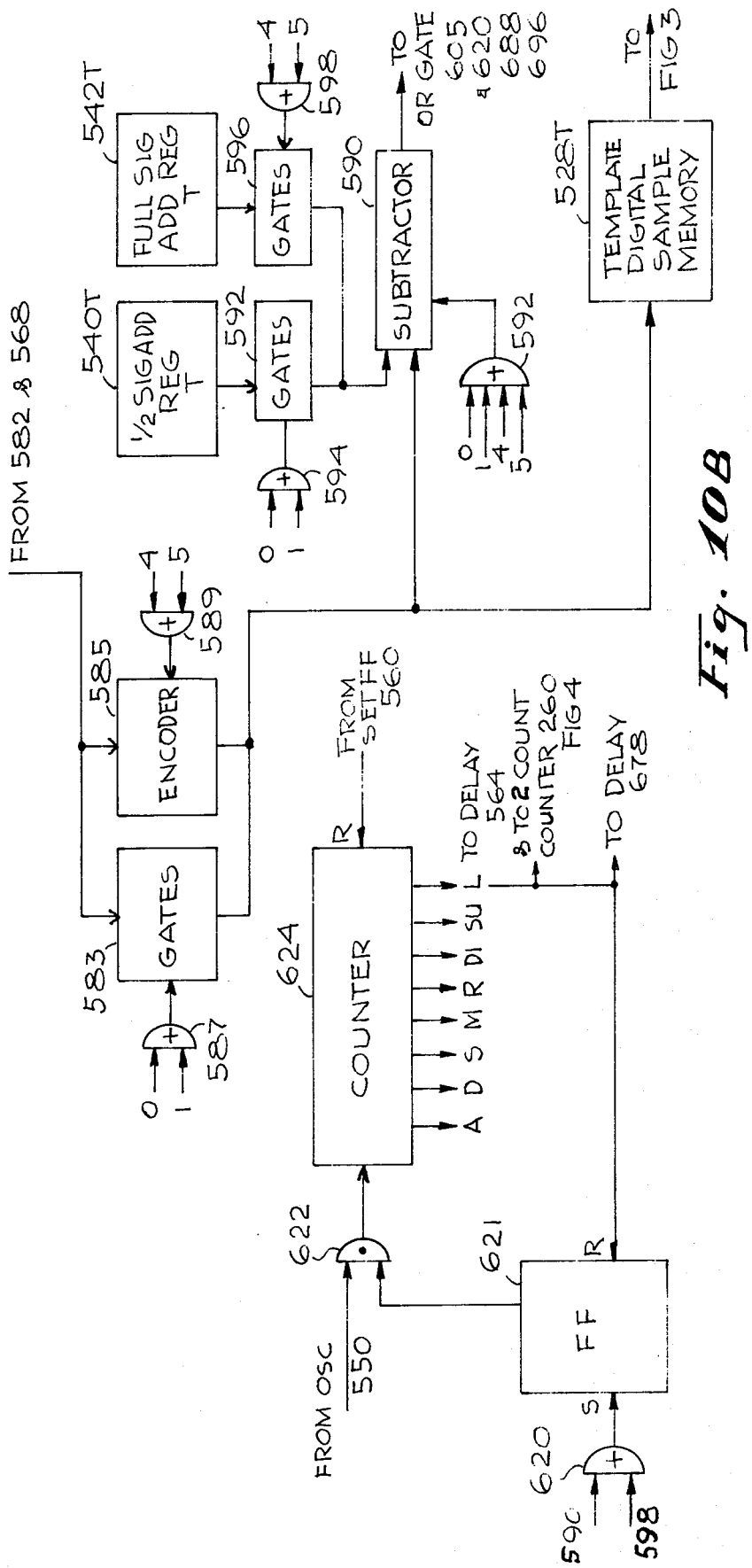

FIGS. 10A AND 10B — BLOCK SCHEMATIC DIAGRAM ILLUSTRATING, THE LEAD/LAG MODE OF OPERATION

FIGS. 10A and 10B show arrangements for retrieving from memory the template signature and specimen signature samples that have been stored in memory, for the purpose of generating the correlation values.

It should be recalled that when tapes are used for respectively storing template and specimen signals, at the outset, with counter 280 indicating a zero count, the tapes are running at the same speed, samples are first derived with tape heads for specimen and template tapes at reference locations. Thereafter, samples are derived with the specimen tape displaced in a lagging direction in successive increments. When this is completed, as indicated by the counter 280 in FIG. 4 being advanced from a zero to a one state, the next operational mode occurs. In this mode the specimen tape is displaced by successive lead increments of time until the highest correlation value has been obtained. The arrangement shown in FIG. 10 simulates these operations digitally without using tapes.

Considering the first operation to be simulated is that of deriving samples from the template and digital tapes when they are neither delayed nor advanced with reference to one another.

An oscillator 550 has its output applied to an And gate 552. The output of the And gate, when enabled, can drive two counters respectively 554 and 556. And gate 552 is enabled in the presence of an output from an Or gate 558, and the set output of a flip flop 560. Or gate 558 produces an output in the presence of a zero, one, four or five output from the counter 280 in FIG. 4. An Or gate 562 receives the output of a delay circuit 564, and also a start signal. Considering now only the start signal, this is derived from any suitable source such as 28 in FIG. 1. The start signal sets flip flop 560, whereby And gate 552 can apply pulses to counters 554 and 556 so that they can start counting. The counter 554 has its output count applied to two sets of And gates, respectively designated by reference numerals 566 and 568. And gates 566 are enabled in response to an output from an Or gate 570. Or gate 570 provides an output during the zero or four count states of counter 280. The output of And gates 566 are applied to Or gates 572. The output of the Or gates 572 are applied to a multiplier 574. The multiplier will multiply the count output of counter 554 by a number equal to the multiple of template samples taken required to make them equal to the number of specimen samples taken. Thus, if 100 template samples were taken and 500 specimen samples were taken, then the multiplier 574 would multiply the count applied to its input by 5, providing a digital output representative of 5 times the count output of counter 554. The output of the multiplier 574 is used to address the specimen memory 528 S, in which the specimen digital samples are stored. The multiplier 5 is used for illustrative purposes here, a more typical value is 100.

In order to indicate whether the count output of counter 554 is to be used as an address for retrieving sample from the first half or second half of the specimen signature stored in memory 528 S, the multiplier output is applied to a set of gates 575 and to an encoder 577. The gates 575 are enabled by the output of Or gate 579, to apply the muliplier output directly to memory 528 S. This occurs when a 0 or 1 count of counter 280 is applied to Or gate 579. Encoder 577, is enabled in response to an output from Or gate 581, occurring in the presence of a 4 or 5 count output from counter 280. The encoder 577 adds a digit or a sign to the output of multiplier 574 whereby it becomes a "second half" address in response to which the memory 528 S output samples derived from the second half of the specimen signature. In response to the applied addresses the specimen digital memory 528 S will read out every digital sample from every fifth location. These digital samples are applied to the respective squarers 160, 176 and 192 shown in FIG. 3.

Counter 556 commences to count simultaneously with counter 554. Its output is applied to two And gates respectively 580 and 582. And gates 582 are enabled by the output of an Or gate 584. The two inputs to Or gate 584 are the 0 and 4 count outputs of counter 280. The output of And gates 582 constitute the addresses in the template digital sample memory 528 T, of the template digital samples.

Here again, in order to make the same outputs of counter 556 distinguishable between first half and second half addresses, the output of And gates 582 are applied to gates 583 and to encoder 585. Gates 583, are enabled by an Or gate 587, output which occurs in the presence of a 0 to 1 count output of counter 280. The output of gates 583 are applied directly to the template memory 528 T as "first half" addresses. An Or gate 589 enables the encoder 585, in the presence of a 4, 5 output from counter 280, to encode the counts received into "second half" addresses. The outputs from gates 583 and encoder 585 are used to address the template memory 528 T. The template memory digital samples which are emitted are applied to squarers 166, 182 and 198 as well as to multipliers 164, 180 and 196 shown in FIG. 3.

It will be recalled that during the zero and one modes of operation only one-half of the signatures are being compared. The half signature addresses and full signature addresses were derived in the manner shown in FIG. 9 and stored in registers 540 and 542. These two registers will store the respective half signature and full or end of signature addresses for the template signature. The contents of these registers are transferred in well-known manner to half signal address register 540 T and to full signal address register 542 T. For the specimen signature, the respective half and full signature addresses are transferred to half signal register 540 S and the full address is transferred to register 542 S. The template half and half signature addresses may be stored in memory and transferred into the respective registers 540 T and 542 T when needed at the start of a correlation operation, in manner well-known to those skilled in the art. Accordingly, the details of such transfers will not be described herein.

The addresses being applied to the template memory 528 T are also applied to a subtractor circuit 590. The subtractor circuit is enabled by the output of an Or gate 592, which occurs in the presence of a zero, one, four and five count output from counter 280. The half signal address register 540 T applies its output to a set of gates 592. These gates are enabled by the output of an Or gate 594, which occurs in response to the zero, and one count outputs of counter 280. The output of the gates 592 constitute a second input to subtractor 590 from which the address being applied to the template memory 528 T is subtracted.

The full signature address register 542 T applies its output to gates 596. These gates are enabled by the output of an Or gate 598. This Or gate provides an output in the presence of a four or five count output from the counter 280. The output of the gates 596 are subtracted from the address being applied to the template memory.

The subtractor 590 will provide an output when the address being applied to the template memory equals or is exceeded by the address being received from the gates 592 or 596. This output is used to reset counters 554 and 556 as well as flip flop 560 in a manner which will be described shortly herein. At this point in the description, it should be borne in mind that when one-half of the digital samples of the template signature have been read, the output of the subtractor 590 is used to stop counters 554 and 556. Thereby the template memory will only provide digital samples derived from the first half of the template signature.

In similar fashion, a subtractor 598 is employed to reset the counters and only provide the digital samples for the first half of the specimen signature by the specimen sample memory 528 S. The half signature address register 540 S applies its output to gates 600. These gates are enabled in response to output from an Or gate 602. The Or gate output is received in response to the zero and one outputs of the counter 280. The outputs from the gates 600 are applied to the subtractor 598 and subtracted therefrom is the address being applied to the specimen sample memory 528 S.

It should be noted that subtractor 598 is enabled only in response to the output of the Or gate 599, which occurs in the presence of a zero, one, four or five count output from counter 280.

An alternative input to the subtractor 598 is received from a set of gates 603. These receive the output from the full signature address register 542 S. Gates 603 are enabled in response to output from an Or gate 604. The Or gate 604 produces an output in the presence of 4 or 5 count output from counter 280.

The output of subtractor 598 also performs the function of stopping the further flow of digital samples when digital samples from the first half of the specimen digital sample memory have been provided and in signaling no more digital samples when the full signature address is reached.

The outputs from subtractors 590 and 598 are applied to an Or gate 605. This Or gate output is applied to an And gate 608. And gate 608 is enabled in response to an output from an Or gate 612. Or gate 612 provides an enabling output in the presence of a zero, one, four or five count output of counter 280. And gate 608 resets counters 554, 556 and flip flop 570. Thus when a half or full address is reached, the counters are reset and pulses from the pulse counter are blocked until a correlation calculation and comparison can take place.

The output from subtractors 590 and 598 are also applied to an Or gate 620. The output of the Or gate 620 sets a flip flop 621. The set output of flip flop 621 enables an And gate 622 to apply pulses from the counter 624 respectively designated as A, D, S, M, R, D1, SU, and L, are used in the same manner as the outputs from the counter 266 in FIG. 2, the first count A, enables the adders 210 through 218 in FIG. 3. The next count D, from the counter enables the dividers 244, 246 and 248. The next count output S, enables the respective subtractors 224, 226 and 228. The next count output M, enables the multiplier 250. The following count output R, enables the square root extractor 252. The next count output D1, enables the divider 254. The next count output SU, resets all the summers shown in FIG. 3. The last count output is L.

The L output from counter 624 is used to reset flip flop 621 and is applied to delay circuit 564 and is also applied to two count counter 260 in FIG. 4. The delay circuit 564 serves to delay the application of this signal through the Or gate 562 to set flip flop 560, for an interval long enough for the circuitry shown in FIG. 4, to function, whereby either the count of counter 280 is advanced whereby the circuits shown in FIG. 10 are signaled to operate in the next mode or, if the counter 280 is not advanced, he circuits shown in FIG. 10 will continue to operate in the same mode. Counter 624 is reset by the set output of flip flop 560.

The last count L of counter 624 is also applied to the two-count counter 260 in FIG. 4. It will be recalled that the function of this two-count counter is to enable the gates 262 or 266 with its outputs so that in the first instance, the first correlation value which is derived will be entered into register 264 and the second correlation value to be computed will be entered into register 268. Thereafter, when the next correlation value is calculated, the two-count counter is advanced to its second count, where it rests thereafter. Any further calculated correlation values are entered into register 268. The purpose of this exercise is to subtract the second calculated correlation value from the first and to thereafter subtract from the newly calculated correlation value, the precedingly calculated correlation value.

The L count of counter 624 is also applied to a delay circuit 272, (in place of the last count of counter 266, FIG. 4). The delay circuit output is used to enable subtractor 274 through And gate 270. And gate 270 is enabled by the two-count output of counter 260.

Upon the completion of the calculation of the first correlation value, wherein by analogy, both tapes have run at the same speed without any displacement therebetween, it is desired to then cause a first incremental lag between the two tapes, and then calculate a correlation value for that situation. This is accomplished as well as further incremental displacements, by using a plus counter, 630. This counter has its count incremented each time there is a positive output from subtractor 274, (FIG. 4) as provided by the output of the sense amplifier 276. Accordingly an And gate 632, has, as one enabling input, the output of an Or gate 634. This occurs in the presence of a zero, one, four or five count output from counter 280. When And gate 632 is enabled, it can apply a plus output from sense amplifier 276 to the counter 630 to advance its count by one.

In view of the fact that the circuitry shown in FIG. 4 will not produce any output from the subtractor 274 until at least two correlation values have been calculated, and in view of the fact that it is necessary to provide a displacement of counter 556 relative to counter 554 at the end of the first calculation, counter 630 starts with a one-count therein and is reset to its one count state. A set of gates 636, are used to transfer the count of counter 630 into the counter 556, when these gates are enabled. These gates are first enabled by circuits which provide an enabling output after the first correlation value has been calculated whereby the count of one is entered into the delay counter, and thereafter each time the subtractor 264 in FIG. 4 provides a plus output as detected by the sense amplifier 276. These operations are achieved by enabling gates 636 with the output of a delay circuit 637. The delay 637 receives an input from an Or gate 638. Or gate 638 receives as one input the plus output from sense amplifier 276 and as a second input the output of an And gate 640. And gate 640 has two inputs. One of these is the one count of counter 630 and the other is the L count from counter 624.

The delay 637 is required to permit counter 630 to have its count incremented prior to enabling a transfer of its count, by way of gates 636, which are in essence enabled in response to the same plus output from sense amplifier 276. In the manner described, the starting count of counter 556 is incremented by one after each correlation value comparison resulting in an indication that the latest correlation value is greater than the preceding correlation value.

As described thus far, counters 554 and 636 have provided addresses to the respective template and specimen memories whereby they have produced the digital samples stored at those addresses up until the first half of the signatures. Both specimen and template signatures samples which are used are the ones which occurred at evenly spaced intervals from one another. In response to these samples, the circuitry shown in FIG. 3 calculates a first correlation value which is entered into register 264, shown in FIG. 4. Thus, the system has simulated in digital fashion, what occurs when the two tapes are run at the same speed and a reference location on both tapes is used for reading the samples. An incremental displacement of the specimen tape in the lagging direction is simulated by incrementing the count in the counter, used to provide template memory addresses, relative to the count in the counter used to provide specimen memory addresses.

From the previous description it should be appreciated that at the end of the calculation of the initial correlation value, delay counter 556 has had entered into it the one count of counter 630. When both counters 554 and 556 are started up, the count of counter 556 will be higher than the count in counter 554 by one count. Using the outputs of these counters as addresses, for read out from the memory, simulates deriving samples from the template and specimen tapes by a one increment displacement. If the incremental displacement is upstream of the template head reference location, then the specimen tape may be considered as lagging the template tape. If the incremental displacement is upstream of the specimen tape head reference location then the specimen tape may be said to be leading the template head. The lagging mode is here simulated by having the counter 556, whose count has been incremented above the count of counter 554, provide the read out addresses from the template memory. This is accomplished by an And gate 582, which is enabled in response to the zero or four count of counter 280, applied through an Or gate 584, to apply the count output of the counter 556 to the Template memory through gates 583 or encoder 585, as address information. The output of counter 554 is applied through an And gate 566, which is enabled in response to the zero or four output of the counter 280, to the five times multiplier 574 and thereafter through either gates 579 or encoder 581 to the Sample memory 528 S as address information.

Counters 554 and 556 will continue to count until the subtractors 598 and 590 indicate that the first half of the respective specimen and template signatures has been reached. The new correlation value is then calculated by the circuitry shown in FIG. 3 and is entered into the register 268 in FIG. 4. A subtraction takes place and if the result is positive, then plus counters 630 increments its count by one. Thus count is then entered into the delay counter 556. Flip flop 560 is set again, and the next set of digital samples is read from memory for calculation of the next correlation value.

The system will continue to function in the manner described until the highest correlation value for the first half of the signatures has been obtained.

As soon as the subtractor 274, in FIG. 4 indicates that the latest correlation value which has been obtained is lower than a preceding value, then the negative output of sense amplifier 278 advances counter 280 to its one count state, which is the leading mode of operation. Each count output of counter 630 has been entered successively, by means of gate 650 into a register 652 displacing any previous value. Gates 650 are enabled in response to the output of an And gate 654, which has as one input, the output from positive sense amplifier 276 and as the other input an output from an Or gate 656. Or gate 656 provides an output in the presence of a zero, one, four or five count output from the counter 280. Thus the count of counters 630, at which the highest correlation value occurred is stored in register 652.

Should it occur that in the lag or lead mode, every comparison results in a positive output from the subtractor 274, then, there is no minus output which is required to activate the circuitry shown to the next mode or leading mode of operation. This is accomplished by a comparator 600, which compares the plus counter 630 output with a predetermined maximum count 662. When the two are alike, comparator 660 provides an output which serves both to enable gate 650 to enter the count of counter 630 into the register 652, and which is also applied to the counter 280 through Or gate 414 in FIG. 4, to advance its count to the next count state. The maximum count of counter 630 can be readily determined as the one which is attained when a predetermined number of correlation values have been compared. This is effectively the maximum allowable lead/lag, a typical number, for example is 10.

Now that the delay mode of operation has finished, it is necessary to operate the system in the lead mode. This is accomplished by switching the outputs of the counters 554 and 556, so that the counter 556 output is now applied to the template memory as an address and counter 554 output is applied to the specimen memory as an address. When counter 280 in FIG. 4 is in its one or five count state, Or gates 567 and 579, respectively connected to And gates 568 and 580, enable these And gates. And gate 568 applies the output of counter 554, through gates 583 or encoder 585 to the Template memory. Counter 556 output is applied via And gate 580, Or gate 572, multiplier 574, and through either gates 579 or encoder 572 to the Specimen Memory. Thus the read out from the Specimen memory is from an address greater than or ahead of the read out from the Template memory.

The operation of the system is the same as was described heretofore. As long as successive correlation values are greater than the preceding correlation values, counter 630 will be incremented and its count will be applied to counter 556 to increment the read out from the Specimen memory relative to the read out from the Template memory. If either, the predetermined amount of correlation values has been derived from the memories, or a first negative from subtractor 274 is sensed, then the count in counter 630 is entered into the register 652 and the system is advanced to the next mode of operation as determined by the two count state of counter 280.

The two count output of counter 280 signals the mode wherein the sample tape speed is decremented by successive increments relative to the template tape speed. What effectively occurs, is that on the assumption that each sample location is spaced along the tape at a given distance from another sample, and if the location of the samples on the specimen tape are given numbers for example, 1S, 2S, 3S, 4S, 5S, etc. and the sample locations on the template tape are given the numbers 1T, 2T, 3T, 4T, 5T, etc. then, if the specimen tape is running at, for example, a speed half of the Template tape speed, then the distance the specimen tape travels is half of the distance the template tape travels over a given interval. Then, if the length of the tape moved by the reading head over that interval has had 10T samples derived therefrom, and if samples are taken from the specimen tape at the same rate, as they are taken from the template tape, while 10 specimen samples will also be derived, these will be derived from 5S sample locations.

In accordance with this invention, the samples derived from the specimen signature are a multiple of the samples derived from the template signature, so that effectively there are provided enough digital sample values between the 1S and 5S samples. As a result, in place of, for example, five specimen samples occupying the addresses 1S through 5S on tape, there are now available 25 specimen samples, in which every fifth specimen sample corresponds to samples 1S through 5S, and the other values may be said to provide interpolation values therebetween.

Designate the specimen samples between 1S and 2S as 1A, 1B, and 1C, and designate the specimen samples between 2S and 3S as 2A, 2B, and 2C and so on. Accordingly, to simulate the slow speed mode, when 1T is read out of memory, then 1A is read out of memory. When 2T is read out of memory, then 1E is read out of memory. When the 3T is read out of memory then 2D is read out of memory, etc. For the next slower increment, when 2T is read out of memory, then 1D is read out of memory. When 3T is read out of memory then 2C is read out of memory. When 4T is read out of memory, then 3B is read out of memory, etc.

To simulate specimen tape speed being successively incremented to higher speeds, while template speed remains constant, when 2T is read out of memory, then 2A is read out of memory. When 3T is read out of memory, then 3B is read out of memory. When 4T is read out of memory, then 5C is read out of memory, etc. For the next speed increment, when 2T is read out of memory, then 2B will be read out of memory. When 3T is read out of memory then 4A will be read out of memory, etc.

Figure 11:
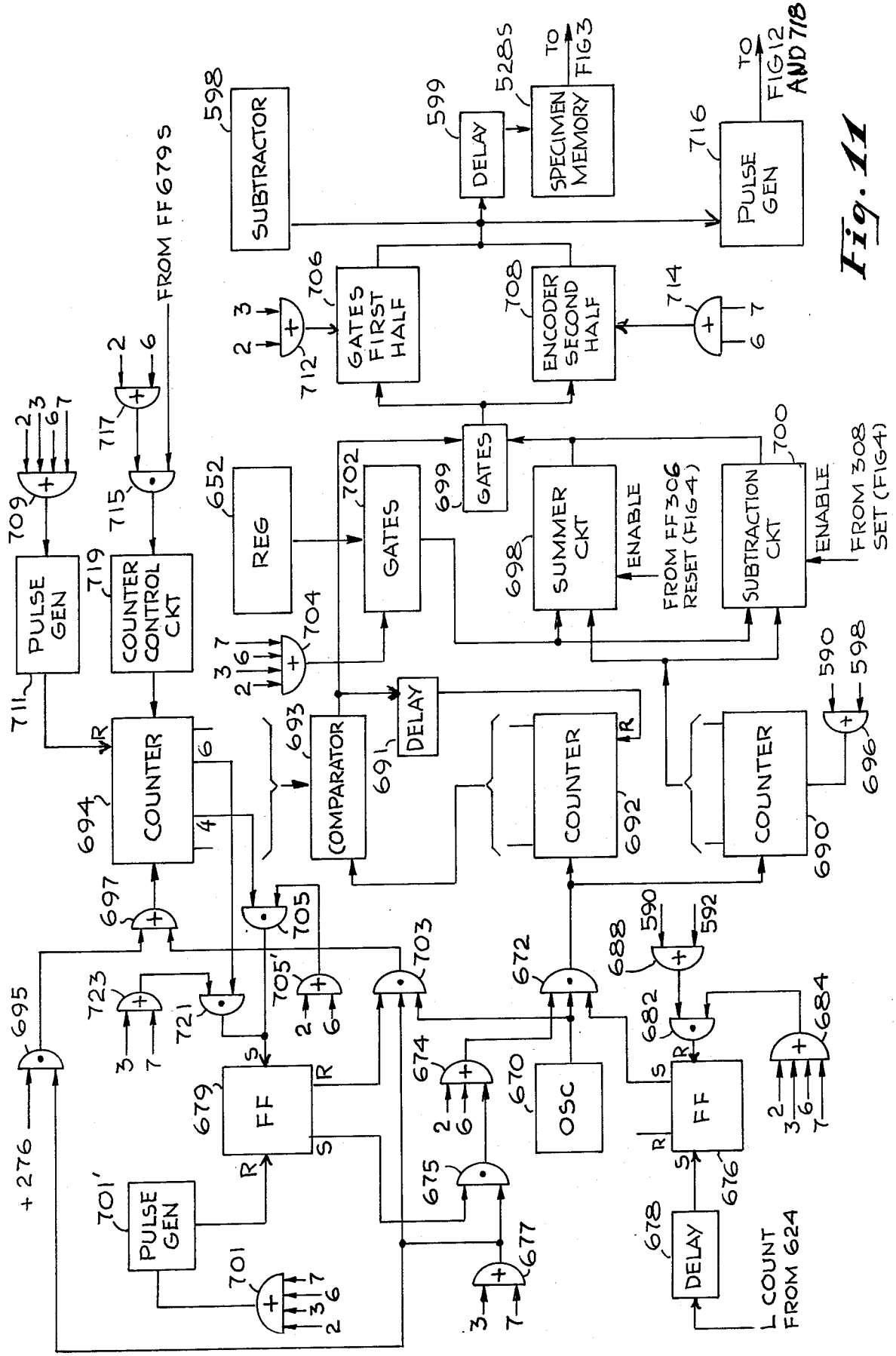
FIGS. 11 and 12 are block schematic diagrams of the circuitry for performing the slow and speed mode of operation digitally.
Figure 12:
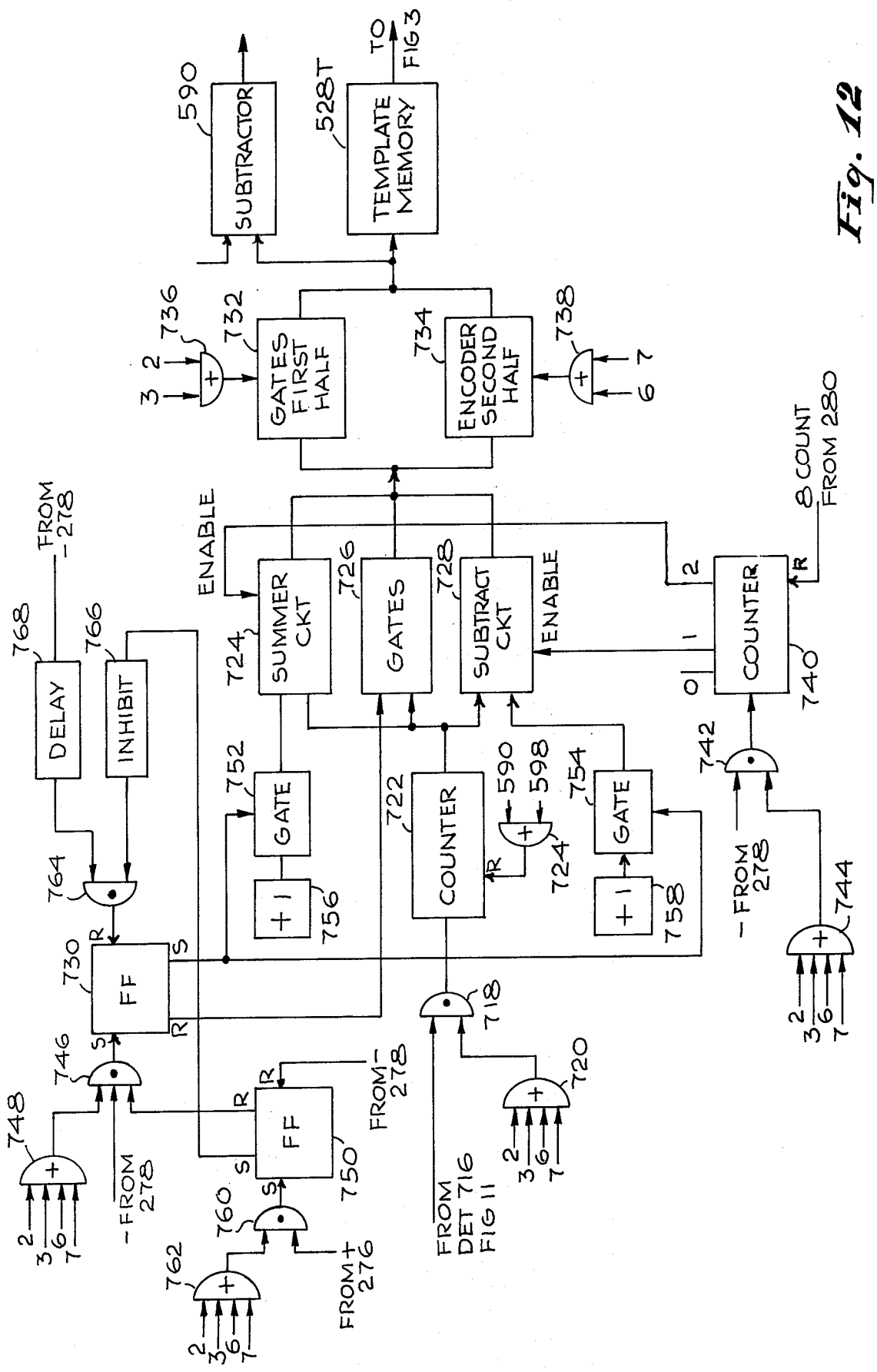

FIGS. 11 AND 12 ARE BLOCK SCHEMATIC DIAGRAMS OF THE CIRCUITRY EMPLOYED FOR PERFORMING THE SLOW AND SPEED MODE OF OPERATION DIGITALLY.

In FIG. 11, an oscillator 670, applies its output to an And gate 672. One enabling input to the And gate is the output of an Or gate 674. Or gate 674 provides an output in the presence of a two or six count signal from the counter 280 and the output of an And gate 675. The And gate provides an output in response to an Or gate 677 output and the set output of a flip flop 679. The Or gate provides an output in the presence of 3 and 7 count outputs of counter 280.

Another required input to the And gate 672 is provided by the set output of a flip flop 676. This flip flop is driven to its set state initially by the output of a delay circuit 678. The delay circuit receives as its input the last count, L, from counter 624. This has already occurred in the previous operations. Flip flop 676 is reset by the output of an And gate 682. An Or gate 684 provides an enabling input to the And gate 682, so long as it receives the 2, 3, 6, or 7 count outputs of counter 280. Or gate 688 provides a second required input to And gate 688 when it receives an output from either subtractor 590 or 598.

It should be recalled that these subtractors provide an output whenever either the first half address or end address of the signature specimens stored in the template and sample memories have been applied to these memories. The first half address output is detected during the zero, one, four and five counts of counter 280 and the end address is detected during the two, three, six and seven counts of the counter 280.

And gate 672 provides an output which advances the count of the counter 690. This counter is reset by the output of an Or gate 696. The Or gate provides an output whenever it receives an output from either the subtractor 590 or 598.

And gate 672, when enabled provides an output which simultaneously advances the count of counters 690 and 692. The count in counter 692 is compared by a comparator 693 with the count of a counter 694. As will become more clear with further explanation, the address outputs of counter 690 are only permitted to be used when the count in counter 692 equals the count in counter 694. Counter 694 is used to determine the increments between addresses of samples in the specimen memory and thus enables the slow and speed modes of operation to be simulated.

For the slow simulation it is first necessary to set counter 694 at a count such that the addresses derived from counter 694 are one increment less than each of the addresses which will be derived from the counter which addresses the template memory. Thereafter, for each positive output from sense amplifier 276 the count in counter 694 should be decremented to decrement the addresses to be derived from counter 690. Since 5 times as many specimen signature samples have been stored in specimen memory as in template memory the first address applied to the specimen memory should be address 1C when the template address is 1T, the next respective addresses are 2C and 2T, etc. The next slower increment would call for the respective addresses to 1B and 1T, 2B and 2T, etc. To do this it is necessary to decrement the count in counter 694 by one, each time the just calculated correlation value exceeds the previous correlation value.

To accomplish the foregoing, upon the occurence of a 2, 3, 6 or 7 count of counter 280, an Or gate 701 activates a pulse generator 701 to reset flip-flop 679. The reset state of the flip flop enables And gate 703 whereby it can apply pulses from oscillator 670 to counter 694, which causes the counter 694 to count up to its 4 count at which time its output is applied to an And gate 705. And gate 705 is enabled in response to an output from an Or gate 705', which occurs in the presence of a 2 or 6 count. The output of And gate 705 sets flip flop 679.

The set output of flip flop 679 is applied to an And gate 715. This And gate is enabled in response to the output of an Or gate 717 which occurs when counter 280 is in its 2 or 6 count. And gate 715 output causes a counter control circuit 719 to establish counter 694 in its down count mode. As a result each positive output from sense amplifier 276 which is used to actuate counter 694 will cause it to count down. Upon the removal of the 2 or 6 inputs to Or gate 717 counter 694 is restored to its upcount mode of operation.

And gate 695 applies the plus outputs of sense amplifier 276 to Or gate 697, when the And gate is enabled. And gate 695 is enabled in response to the output of Or gate 677.

As thus far described, counter 694 has its count decremented by one, after each correlation value calculation, during the 2, 6 counts of counter 280 or slow modes. The address outputs of counter 690, which are used, are those spaced apart by counts established in counter 694. This occurs by reason of a set of gates 699 not being operated except in response to the output of comparator 693. How this works may be illustrated by the following. Assume counter 694 has a four count. Counter 692 and counter 690 count to four. Comparator 693 opens gates 699 and then resets counter 692 through delay circuit. Counter 692 and 690 then have to count through four more counts before comparator 693 enables gates 699 again. At this time, counter 690 has an eight count. In the manner described, only every fourth count of counter 690 will be used for address purposes. At the end of each correlation value calculation the count in counter 694 is decremented by one thus decreasing the spacing between addresses applied to the specimen memory. If the read out from the template memory is maintained constant the result achieved is analogous to that achieved by an incremental slowing of template tape speed.

For simulating an incremental increase in successive speeds, counter 694 is initially set to a high count such as six, which is incrementally increased thereafter. This acts to first select every sixth address output of counter 690, then every twelfth address, etc. Again, all of the template memory storage locations are addressed consecutively.

Again, to secure an initial count insertion into counter 694, the three or seven count output of counter 280 is applied to an Or gate 701, the output from which actuates pulse generator 701', which resets flip flop 679. The flip flop reset output is applied to And gate 703. The 3 or 7 count of counter 280 causes an output from Or gate 677 which enables And gate 703 to apply pulses from oscillator 670 to enables And gate 703 to apply pulses from oscillator 670 to counter 694 through Or gate 697. When counter 694 reaches a predetermined count, such as six, its output is applied to an And gate 721. This And gate is enabled by the output of Or gate 723, which occurs in response to the three or seven count of counter 280, and thus sets flip flop 679. When flip flop 679 is set, its output enables And gate 675 whereby And gate 672 is enabled to pass pulses to counters 690 and 692.

Counter 694 is reset by the output of a pulse generator 711 upon the occurrence of a 2, 3, 6 or 7 count output of counter 280. An Or gate 709 causes the pulse generator 711 to generate a pulse which is used to reset counter 694.

Counter 690 applies its count output to a summer circuit 698 and to a subtractor circuit 700. The summer circuit is enabled to add its inputs, in the presence of a reset signal from the lag-lead flip flop 308, shown in FIG. 4. The subtractor circuit 700 is enabled to subtract its inputs in the presence of a set output from flip flop 308. It should be recalled that flip flop 308 provides a reset output when the maximum correlation value was detected with the system in a lead mode, and provides a set output when the maximum correlation value was detected with the system in a lag mode.

Register 652, shown in FIG. 10, is shown again for convenience. It should be recalled that this register stored a digital value indicative of either the incremental lead or lag which provides the maximum correlation value derived while comparing both the first half or the second half of the specimens stored for the signatures. It is desired to run the slow-speed modes of operation using the same lag or lead. Thus, gates 702 are enabled to apply the contents of the register 652, as an input to both the summer and subtractor circuits, respectively 698, 700. The gates are enabled in the presence of an output from an Or gate 704, which occurs when counter 280 provides a two, three, six or seven count output. Thus, the amount of the lead at which the maximum correlation value was obtained is added to each count of counter 694 by the summer 698. If the maximum correlation value occurred during lag, then the amount of lag is subtracted by subtractor circuit 700 from each count of counter 690.

The output of the summer and subtractor circuits 698 and 700 are applied to gates 699 which are only enabled to pass these outputs in the presence of an output from the comparator 693. The gates 699 have their output connected to a set of gates 706 and to an encoder circuit 708. The gates 706 are enabled in the presence of an output from an Or gate 712, to pass the output of either the summer circuit or the subtractor circuit, depending upon which one has been enabled, to the specimen memory 528S. The Or gate 712 provides an output in the presence of a two or a three count output of counter 280. The encoder 708 provides an output in the presence of an input from an Or gate 714. This Or gate is enabled to provide an output in the presence of a six or seven count output of the counter 280.

The address outputs of either gates 706 or encoder 708 are applied to the specimen memory 528 through a delay circuit 599. The delay is required to provide time for the template memory address generating apparatus, shown in FIG. 12 to operate to address the template memory at substantially the same time as the specimen memory is being addressed. Each address output of encoder 708 or gates 712 enables a pulse generator 708 to generate a pulse.

It was described previously in connection with the magnetic tape embodiment of the invention that at the outset of a slow-mode or speed-mode of operation, the take-off location for deriving specimen values is the one at which the maximum correlation value was obtained. The description of FIG. 10 describes the manner in which the register 652 is made to store the amount of lead or lag at which the maximum correlation value is obtained. This value is used to displace the starting address by being either added to or subtracted from each count of one of the addressing counters. It should be pointed out at this time that since the counter starts out with counts 1, 2, 3 . . . , and if the subtractor circuit of 700, for example, has a value of five therein, the output of subtractor circuit 700 is negative. This negative output will not be passed through either gates 706 or encoder 708 until a positive value is obtained. In this manner the amount of lag is simulated.

FIG. 12 shows structure for addressing the template memory and for handling the situation wherein the correlation value derived during the lag-lead mode exceeds the first correlation value derived during the speed-slow mode, then the lag or lead is incremented to see whether or not a higher correlation value will be obtained.

In order to insure that the sample values derived from the template memory occur at the same time that the values are derived from the specimen memory, each time the specimen memory 528S in FIG. 11 is addressed, the pulse generator 716 provides an output pulse, which is applied to the And gate 718 in FIG. 12. This And gate is enabled by the output of an Or gate 720, which occurs in the presence of a two, three, six or seven output of counter 280. Thus, a counter 722 is enabled to advance its count each time the specimen memory is addressed. Counter 722 is reset by the output of an Or gate 724, which occurs whenever there is an output from either subtraction circuit 590 or 598.

The output of the counter 722 is applied to a summer circuit 724, a set of gates 726, and the subtract circuit 728. When neither the summer circuit nor the subtract circuits are enabled, the gates 726 are enabled by the reset output of a flip flop circuit 730. The gates will apply the output of the counter 722 to both the set of gates 732, and an encoder 724. Gates 732 and encoder 734 have the same function as was described previously for gates 706 and encoder 708. In the presence of the output of an Or gate 736, which occurs during the two and three outputs of counter 280, the count output of counter 722 addresses the locations and memory of the samples derived from the first half of the template signature. Encoder 734, which is enabled in response to the output of an Or gate 738, which occurs during the sixth and seventh count outputs of counter 280, provides the count of the counter with an extra digit thereby the output of the encoder will constitute the addresses of the specimens in the template memory which have been derived from the second half of the template signature.

The system described thus far, upon the ocurrence of counts 2, 3, 6 or 7, will provide a read out from template and specimen memories for which correlation values are determined and then compared with the previously obtained maximum correlation value. If this first correlation value, obtained during the 2, 3 and 6, 7 count outputs of counter 280 are less than the previous correlation value, then, as explained in connection with the tape embodiment of this invention, it is desired to first increment the lag by one and then try the first slow speed increment to see if the higher correlation is obtained. If it is, then further slow increments are applied until a maximum correlation value is obtained. If the first test is not successful, then it is desired to increment the lead by one and then increment the slowing to see if that operation provides an increase in the correlation value. If it doesn't, then counter 280, as previously described, is shifted to the next count state.

To accomplish the foregoing, the summer and subtract circuits respectively 724 and 728 are provided. A two-count counter, 740, is used to count the negative outputs sensed by sense amplifier 278. An And gate 742, has the minus output of sense amplifiers 278 applied thereto and is enabled in the presence of the output of an Or gate 744, which occurs in response to a two, three, six or seven count of the counter 280. Accordingly, should sense amplifier 278 provide an output after the first correlation value has been obtained, with gates 726 enabled, counter 740 is advanced to its first count state whereby the subtract circuit 728 is enabled. Upon the occurrence of the output from sense amplifier 278, gates 726 are disenabled. This occurs because flip flop 730 is transferred from its reset to its set state. Flip flop 730 is set by the output of an And gate 746. And gate 746 requires, as its enabling inputs, thee output of an Or gate 748, which occurs in the presence of the two, three, six or seven outputs from counter 280. Another enabling input to And gate 746 is the reset output of flip flop 750. Flip flop 750 is reset in response to the negative output from sense amplifier 278. Flip flop 730 is set in response to the negative output from sense amplifier 278 also.

The set output of flip flop 730 enables gates 752 and 754 to be enabled. Gates 752 applies a plus one from a plus one signal source 756 to the summer circuit 724.

Gates 754, when enables applies a plus from the plus one signal source 758 is to be applied to the subtract circuit 728. If the subtract circuit is enabled, as has just been described, then each count of counter 722 is decremented by one count. This is analogous to reading from the template tape at a location downstream of the normal reading point whereby the specimen tape may be said to be leading the template tape. If the summer circuit is enabled by the two count of counter 740, then each count of counter 722 is incremented by one count, which is analagous to reading from the template tape at a location upstream of the normal reading point, whereby the specimen tape may be said to be lagging the template tape.

If the new correlation values are greater than the preceding ones, no change is made in the count of counter 740 and the lag or lead setting is maintained until a negative output from sense amplifier 278 is obtained whereupon flip flops 730 and 750 as well as counter 740 are reset and the next mode of operation occurs.

It should be noted that a plus output from sense amplifier 276 sets flip flop 750 through an And gate 760. This And gate is enabled by an output from an Or gate 762 in response to 2, 3, 6 and 7 outputs by counter 280. Flip flop 730 cannot be reset if sense amplifier 726 senses a positive output from subtractor 724 before a negative output from sense amplifier 726 can occur. This is taken care of by applying the set output of flip flop 750 to an And gate 764 through an inhibit circuit 766. The output of And gate 764 is used to reset flip flop 730. However, this is prevented by the inhibit circuit 766 in the presence of the set output of flip flop 750.

Upon the occurrence of a negative output, sensed by amplifier 278, flip flop 750 is reset. A delay circuit 768 is used to delay the resetting of flip flop 730 in response to the output of amplifier 278 until flip flop 750 is reset and the inhibit signal being applied to And gate 764 is removed.

The circuits shown in FIG. 6 will operate in response to the correlation values received from FIG. 4 in the manner previously described.

While the foregoing description illustrates hardwire computer arrangements for performing the correlation and thereby verification of a template signature with a specimen signature, it will be appreciated that a general purpose computer can be programmed to perform these operations also. Accordingly, it is intended that the foregoing description be considered as exemplary and that the scope and spirit of the claims herein are intended to include both the program for a general purpose computer as well as a hardwired computer.

In the operation of a computer, because of its high speed and storage capabilities, it is programmed to compute correlation values from 0 through maximum delay and then from one to maximum lead. These values are stored. It then is further instructed to compute the correlation values for incremental speeds, first decrementing and then incrementing. Since the template and sample signature are not being run on tape by the computer, it simulates decrementing by taking say 10 samples within what can be considered as a half inch length of signature, and simulates incrementing by taking 10 samples within what can be considered as a ¾ inch length of signature. The decrementing and incrementing runs are made by displacing the 2 signatures relative to one another in increments thereby simulating the lead/lag displacement. This is the technique described in the digital embodiment of the invention.

Thereafter, a search is made of the stored values to obtain the highest value obtained as a result of the lead/lag correlation computations. The "head" location, or displacement distance between the 2 signatures which provides the maximum correlation value is noted. Then a search is made of the correlation values obtained with the speed decrement and increment modes at this displacement value to determine whether a higher correlation value has been obtained. If it is, then that value is taken as the correlation value for the ½ signature. If it isn't, then the highest correlation value obtained by the previously indicated search is taken.

In this manner, the highest correlation value for the 2 signature halves is obtained, combined and compared to a reference for the purpose of determining validity or invalidity of the signature.

The indicated validity determining technique or "Rubbery Correlation" may also be used for recognition or identification of an individual, not only for verification of an individual's signature. As a matter of fact, this technique is a general signal processing technique which can be used for processing two signal trains such as speech data, i.e., voice pattern identification, EEG data, EMG data, etc.

By way of example, there follows an appendix which contains a description of software which can direct a general purpose computer, such as PDP-11/20, to perform the "Rubbery Correlation" technique.

APPENDIX

BRIEF DESCRIPTION OF THE SUBROUTINES USED FOR RUBBERY CORRELATION PROGRAM, FLOW CHARTS & COMPUTER PROGRAM PRINTOUT.

SIG 11 — Main-program that allows an operator to select several options, one of which is rubbery correlation. Thus this program reads data specified by the operator from a disk file. By typing CH, the operator gets a rubbery correlation computed between the data and the current template, arbitrarily done by halves. There is also a command to sample pen signals generated while writing storing the data on a disk file. Note that this program runs on a PDP-11/20 using DOS/-BATCH Operating System*. A similar program can be run on a CDC 6400, which computes rubbery correlation between all combinations of templates and data, for the entire signal, halves, thirds, fourths, for channel 1 alone, channels 2 and 3 and channels 1, 2, and 3. For both computer facilities, the subroutines used to compute rubbery correlation are basically the same. Only the PDP-11/20 versions will be documented here.

\* - THE DOS/BATCH HANDBOOK, for the DOS/BATCH Operating System, Monison Version V09, Apr. 1974, Digital Equipment Corp., Maynard, Massachusetts 01754.

SEARCH This is the main subroutine that controls the rubbery correlation computations. It contains the logic that determines the stretching or shrinking of a signal, calls a subroutine NORMAL to form a new (derived) stretched or shrunk signal of the proper length, then calls a subroutine JUST to compute the correlation for this stretched or shrunk signal.

JUST — The JUST subroutine makes the computations at all desired lead/lag positions for a pair of signals, determining the best position by that computation yielding the best correlation.

NORMAL — This subroutine forms a new (derived) set of samples values from an existing set of sample values. Linear interpolation is used where necessary.

The following Library Functions and Subroutines are used. A brief description of each is given here.
INITRL — Initialize a real array.
MOVERL — Array Transfer Routine.
CORREL — Compute a correlation value, given the necessary sums.
IABS — Integer Absolute Value.
FLOAT — Convert Integer value to floating point.
MINO. — Minimum Value.
MAXO. — Maximum Value.
TSOVER — Time series plot routine.
MϕVBM — Move the beam on the display.
CHARS — Display some text.

SETIND — Blank a portion of the display. SUBROUTINE SEARCH (JT, JX, IL, NT, SAVE, NC, MN, STAT)

Calculate the stretch and the lead necessary to make the signal, JX best match the template JT, where
II is the starting point (time of JX and JT
NT is the number of points in JT
NC is the number of channels
MN is the maximum number of samples per channel
ML is the maximum lead to be allowed
SAVE is an array of sums, the maximum correlation, lead and stretch
STAT(I,J) statistic J for channel I, used in plotting JX. As these statistics are not used in the computations, they will not be mentioned further.

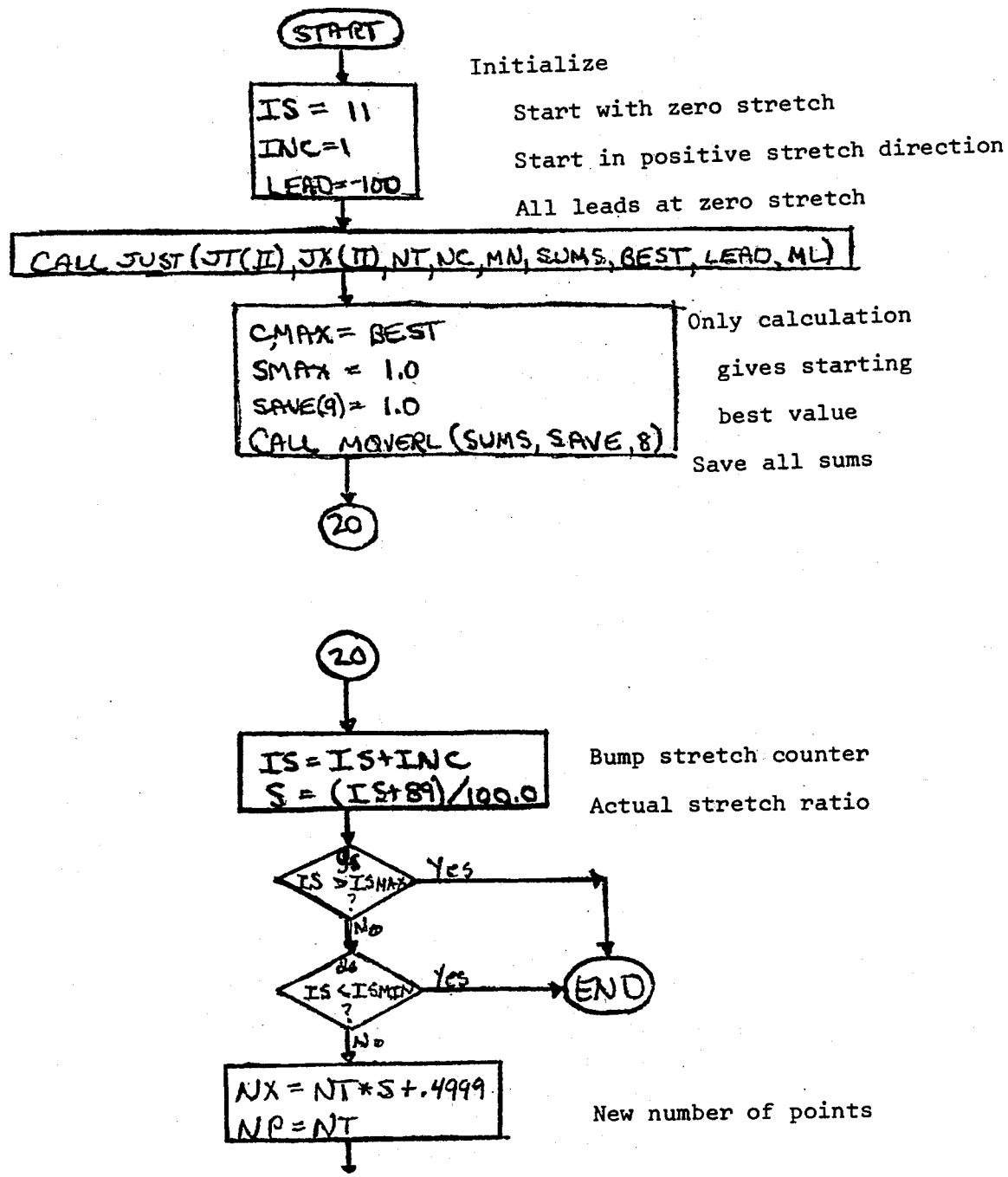

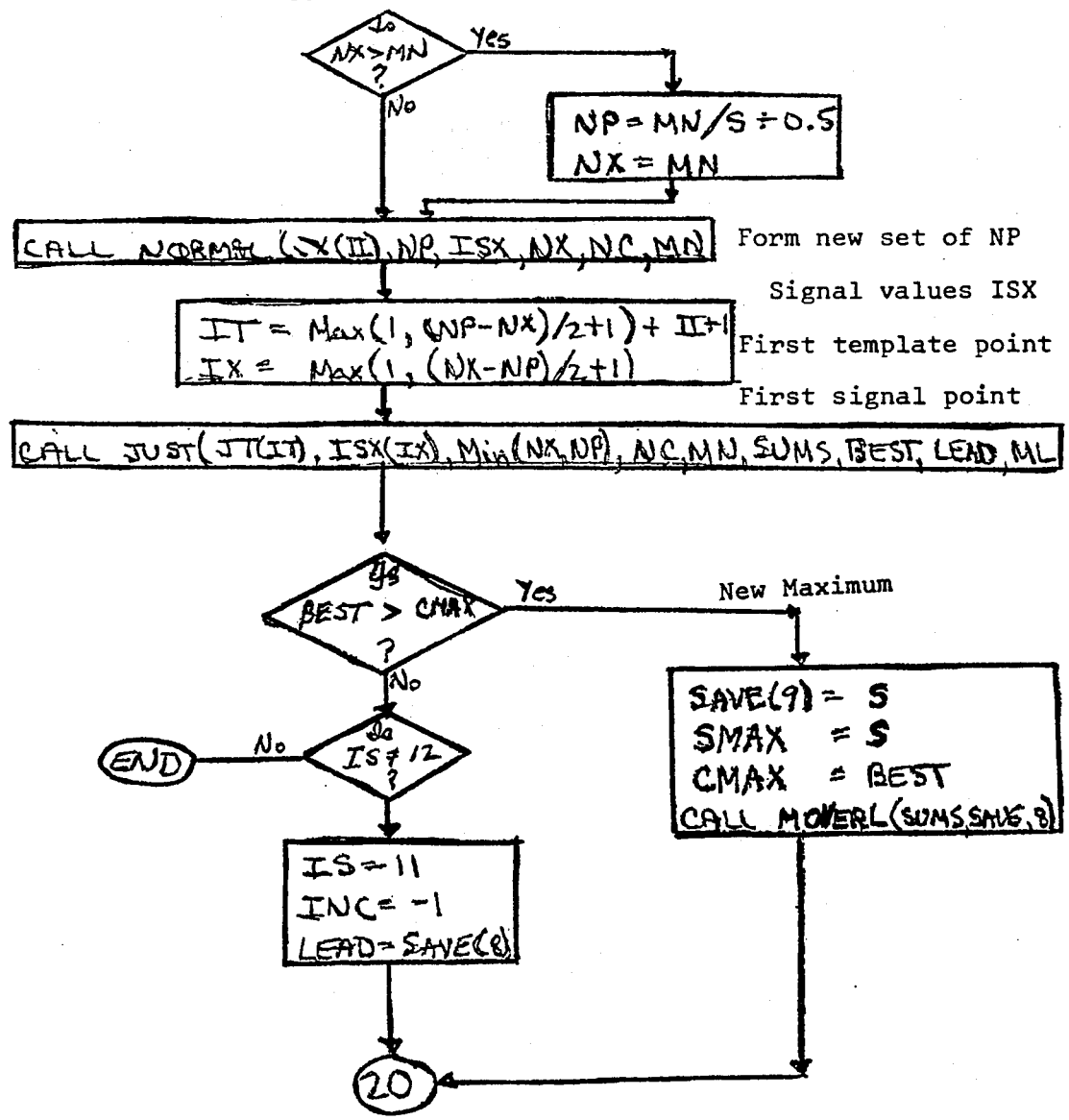

SUBROUTINE JUST (IT,IX,NN,NC,MN,SUMS,BEST,LEAD,ML)

Time justify the signal IX with the template IT, with NN samples in each for each of NC channels. The maximum number of samples per channel is MN.

The maximum correlation occurs at LEAD, and is BEST, where SUMS is an array of 9 values, containing the 6 sums used to calculate the correlation, the maximum correlation, and the lead at the maximum correlation.

If, on entry, LEAD=-100, make computations at all leads between -ML and +ML, otherwise start search at LEAD.

Note that LEAD<0 for a lag.

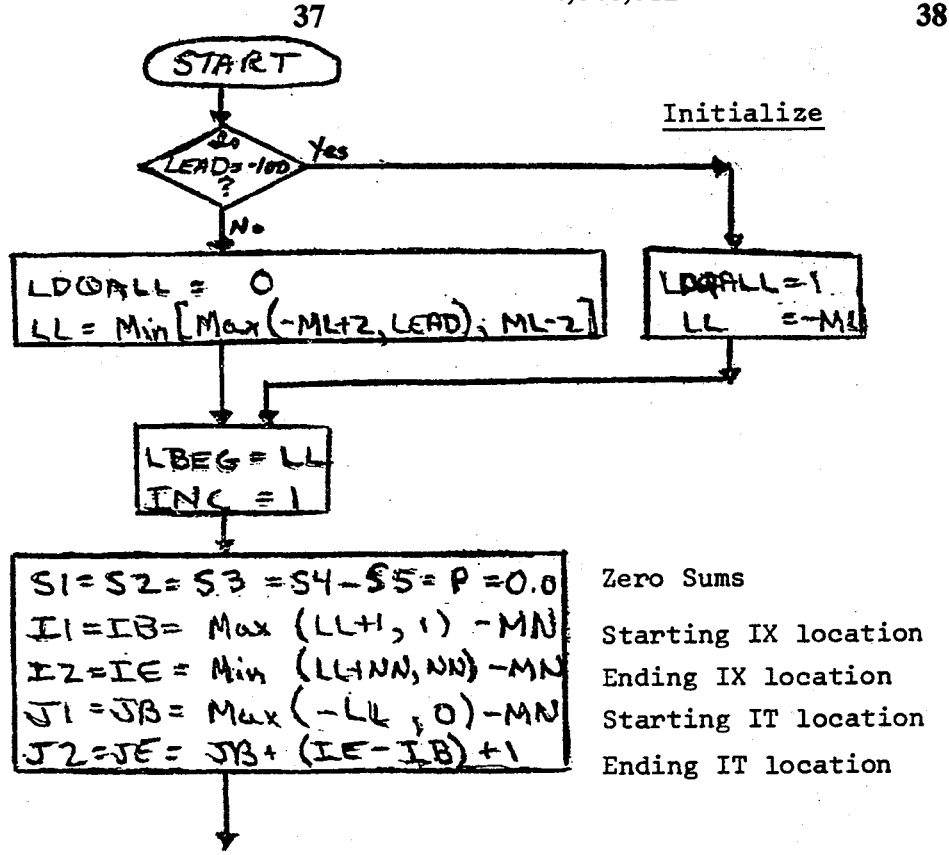
Initialize
Zero Sums
Starting IX location
Ending IX location
Starting IT location
Ending IT location
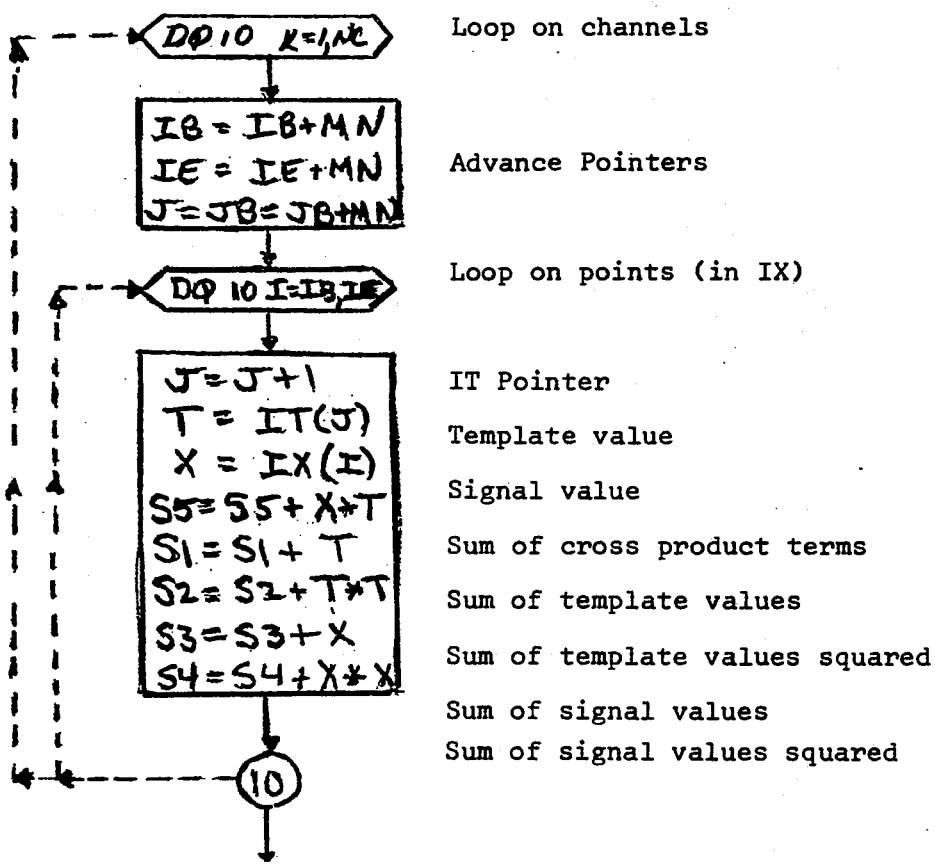
Loop on channels
Advance Pointers
Loop on points (in IX)
IT Pointer
Template value
Signal value
Sum of cross product terms
Sum of template values
Sum of template values squared
Sum of signal values
Sum of signal values squared

```
P = (IE-IB+1)*NC
BEST = (S5 - S1*S3/P) / √((S2- S1*S1/P)(S4-S3*S3/P))
LEAD = LL
SUMS(7) = BEST
SUMS(8) = LEAD
SUMS(6) = P  ;  SUMS(5) = S5
SUMS(1) = S1 ;  SUMS(2) = S2
SUMS(3) = S3 ;  SUMS(4) = S4
```

Number of points

Compute correlation:
  this is first computation,
  hence it must be "best"

```
SO(1) = S1  ;  SO(2) = S2
SO(3) = S3  ;  SO(4) = S4
SO(5) = S5  ;  SO(6) = P
```

Save sums

Save beginning sums so
  search can go in opposite
  direction (20)

LL = LL + INC

LL > ML ? — Yes → END

Loop on the leads

Select next lead

LL ≤ -ML ? — Yes → END

This subroutine
has finished its
task

IGO = 1

IB:I1 — IB<I1 → (33) ; IB>I1 → (31)

IB=I1

(21)

IGO = 2

Most sums for this new
lead can be computed
from previous sums by
just adding or subtract-
ing a point

IE:I2 — IE<I2 → (31) ; IE>I2 → (33)

IE=I2

(22)

IGO = 3

JB:J1 — JB<J1 → (37) ; JB>J1 → (35)

JB=J1

(23)

IGO = 4

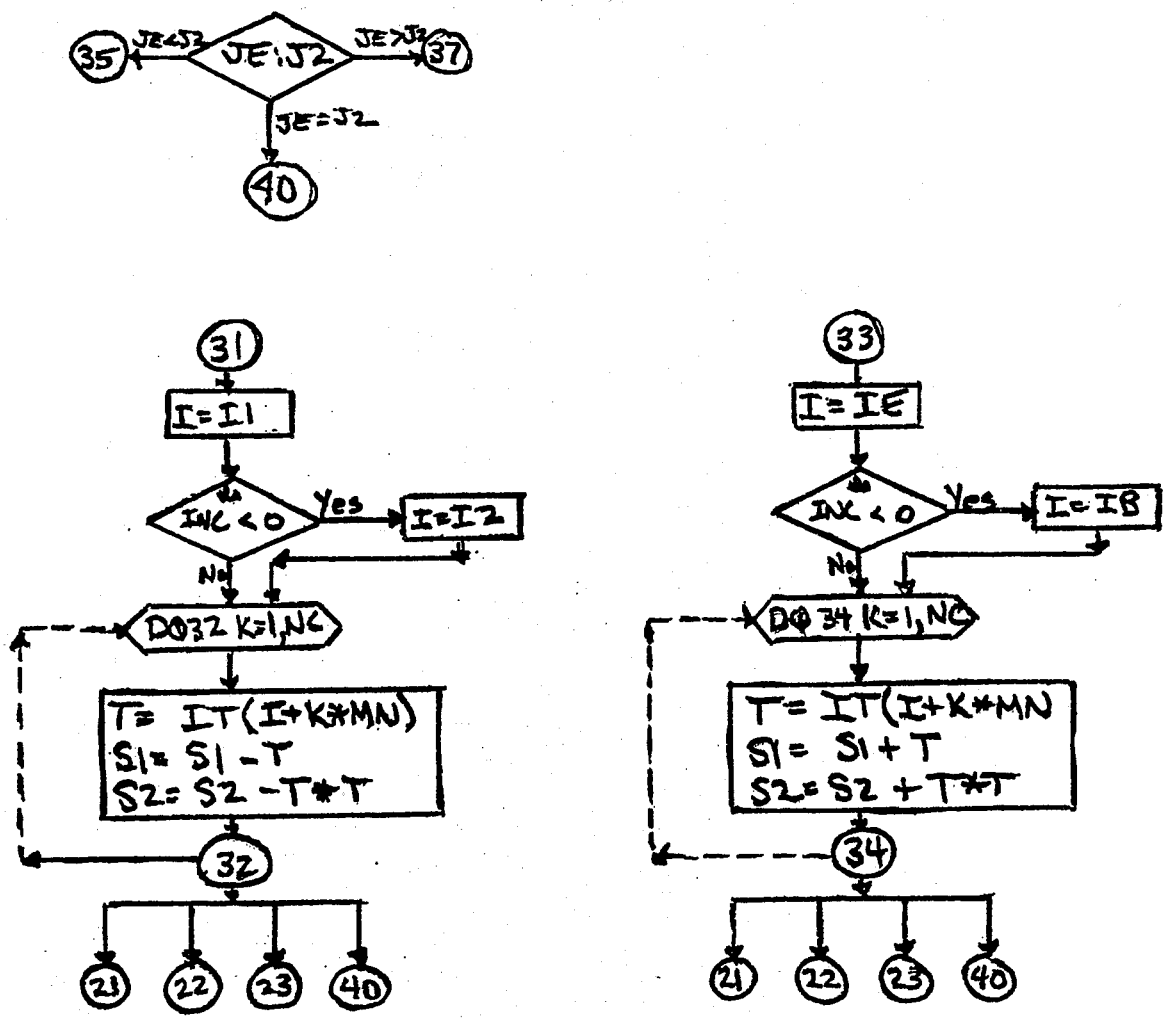
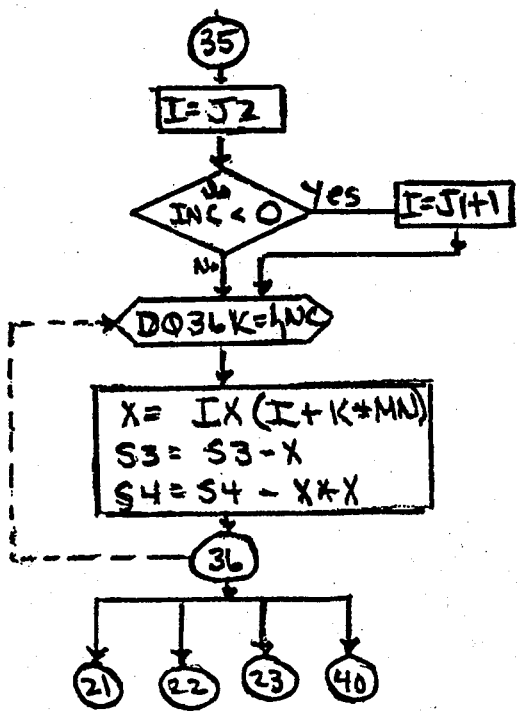
Subtract point from signal sums
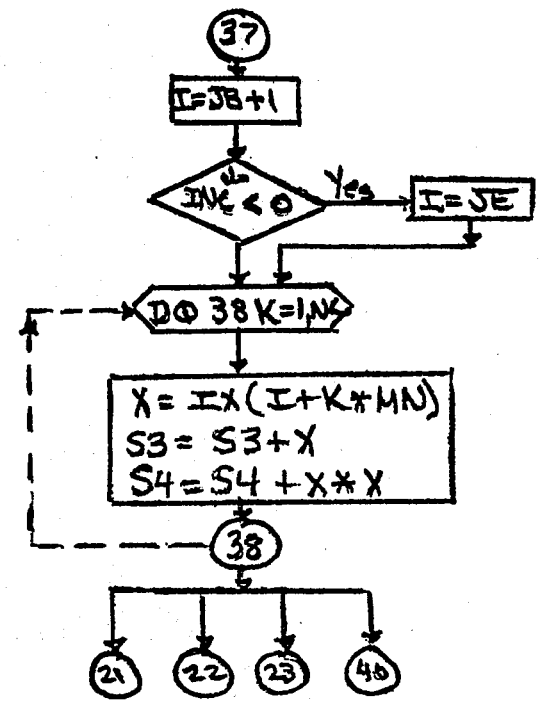
Add point to signal sums

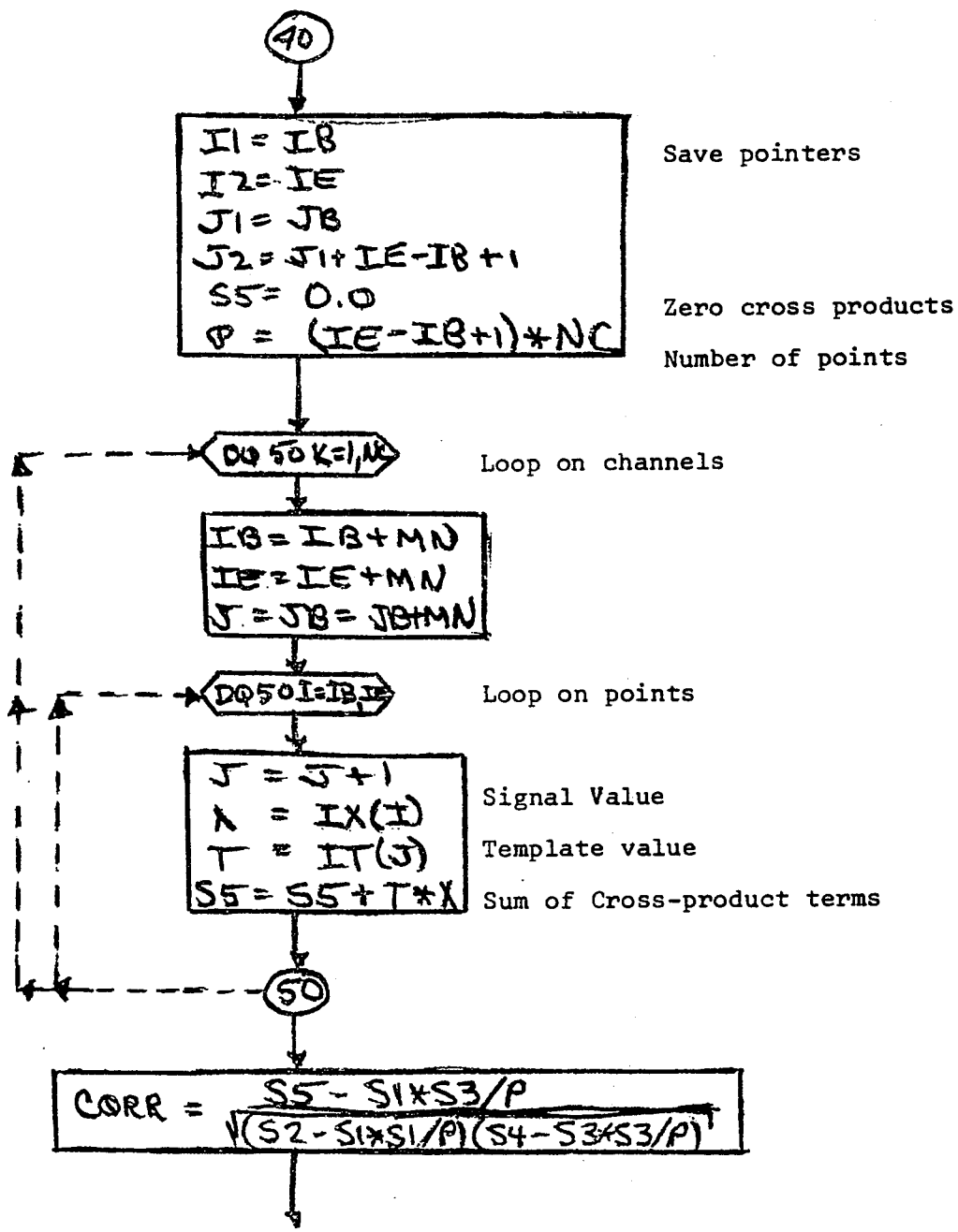
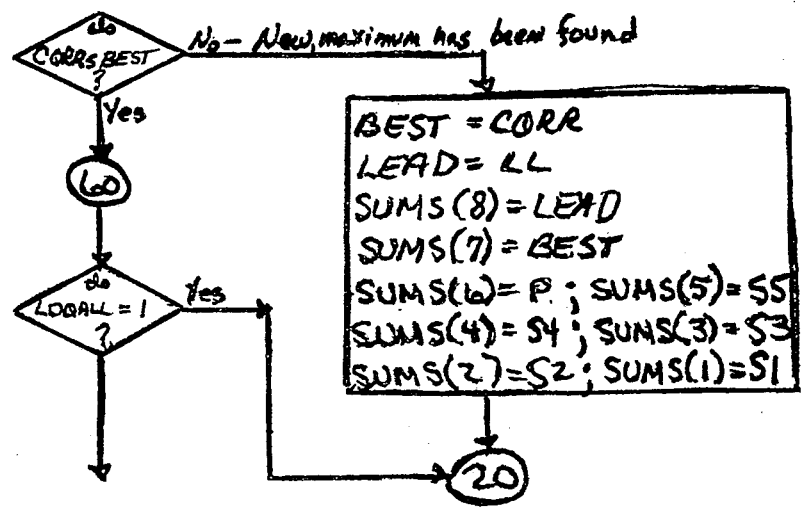

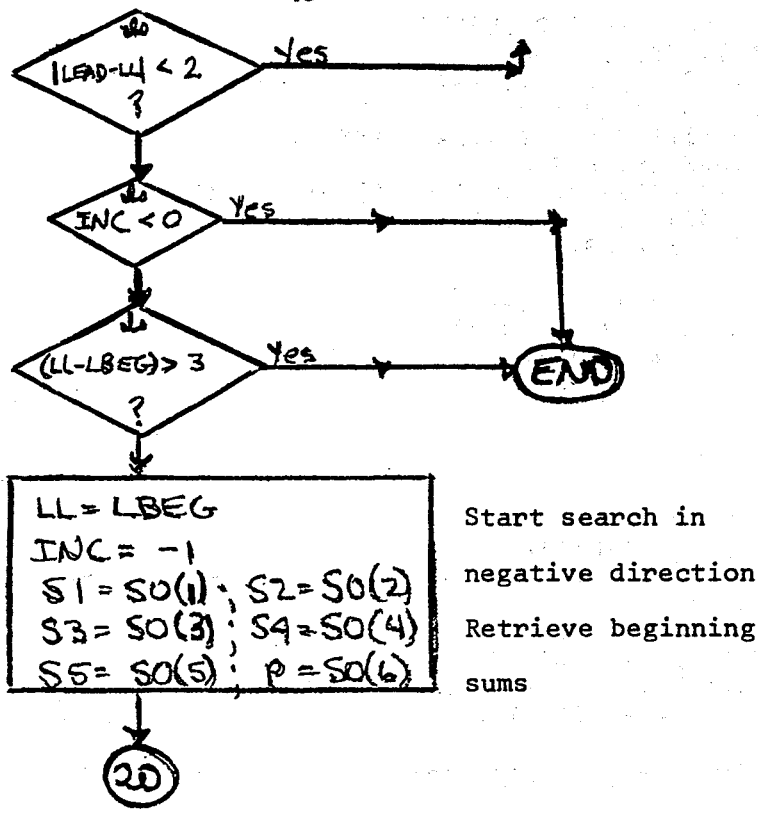

Start search in negative direction

Retrieve beginning sums

```
C   SIG11.FTN

C   Program SIG11 .................
C
C   COPYRIGHT 1975 STANFORD RESEARCH INSTITUTE
C
C   signature inspection and verification program
C      Written for the PDP-11 computer -- Vector General display
C      Version 2, December 11, 1974
C
C   Allow an operator to - - - - - - - - - - -
C      Call a program to allow the digitization of a signature using
C          Hew Crane's pen.
C      Display the time series derived from the signature
C      Create a facsimile of the static signature allowing the changing
C          of parameters used in the process
C      Compare the signature with an existing template giving the correlat
C      Update the template with new signatures
C
C   Written by
C      Dan Wolf, L2082, X3983
C      John Ostrem, K1066, X4432
C      STANFORD RESEARCH INSTITUTE
C      333 Ravenswood Ave.
C      Menlo Park, Calif., 94025
C      Phone (415) 326-6200
C---------------------------------------------------------------
C   LINK
C       DK1:SIG11<DK1:S/CC,C/CC,D/CC,I,M,DEWLIB/CC,DK:FTNLIB[1,1]/L/U/E
C---------------------------------------------------------------
        DIMENSION SAVE(18),INDBUF(4),TEXT(8),CTO(2)
        LOGICAL DEBUG,LHOLDT,CHANGE
        COMMON /DEBUG/   DEBUG,NPRINT
        COMMON /DATAHD/  NUMDAT,MAXDAT,LENDAT,NEXTDR
        COMMON /LUNS/    KB,LP,LD,LT
```

```
      COMMON /IOCOND/   INDEX1,IERR1,INDEX2,IERR2
      COMMON /PLOCS/    IHBEG(2),IVBEG,IHINC,IVINC
      COMMON /SIGNAL/   SIGNAT,AUTHOR,NDATE(5),NTIME(4),NSRATE
     +                  ,NTOTIM,NUP,IPLPEN,RECID
     +                  ,STAT(3,4),IPENUP(20),IDATA(256,3)
      COMMON /TEMPHD/   NUMTEM,MAXTEM,LENTEM
      COMMON /TMPLAT/   ITEMRN,TMPLAT,NUMSIG,MDATEM(5),MTIMEM(4),MPLPEN
     +                  ,TSTA(3,4),ITEMP(256,3)
      COMMON /TRAN/     SCALES(3),BIASES(3)

C  Parameters for facsimile plot of signature
      COMMON /SIGPAR/   XINC,XUPINC,INTMAX,INTMIN
     +                  ,APARAM,BPARAM,CPARAM C  scratch arrays
      COMMON IBUF(37)
C DATA  TRUE/4HTRUE/, BLANK/4H   /, T/4HT
      DATA  CTO/4HILL ,4HCHAR/,KONC/020003/
C----------------------------------------------------------------
    1     FORMAT (1H1,5A2,5X,4A2)
   10     FORMAT (F6.3,F6.2,F6.1,F7.2,2F6.1
     +            ,I5' TO'I3,2X,2I5,4X,L1,I4,1X,A4)
   11     FORMAT (4HSIG ,A4,2X,5HAUTH ,A4,2X,A4,7X)
   12     FORMAT (9HTEMPLATE ,A4,I4,4X,5A2,1X)
   13     FORMAT (1X,A2,1X,O6)
C----------------------------------------------------------------
C     Initialize key parameters
      CALL INIT(INDBOX)
      CALL INITFX(INDBOX,INDBUF,4)
      WGT     = 0.125
      AUTHOR  = BLANK
      SIGNAT  = BLANK
      TMPLAT  = 0.0
      IF (NEXTDR .EQ. 0) NEXTDR = 4
      NUMREC  = NEXTDR - 1
      NUMSIG  = 0
      NPLOT   = 0
      LHOLDT  = .FALSE.
      NXTSUB  = 0
C     start with a signature in core
      GO TO 2400

C----------------------------------------------------------------
C     display list of parameters
 1000     CALL SETIND(INDBUF(4))
      ENCODE (74,10,IBUF) WGT,XINC,XUPINC,APARAM,BPARAM,CPARAM
     +                  ,INTMIN,INTMAX,NPRINT,NPLOT,LHOLDT,NUMREC,RECID
      CALL INTSET(3)
      CALL MOVBM(-1840,-1856)
      CALL CHARS(IBUF,37,1)
      CALL GETIND(INDCHA)
C     get character from display keyboard
 1005     IF (LCHAR(ICH) .EQ. 0) GO TO 1005
C     print the character
      WRITE (LP,13) ICH,ICH
C     display the character
      CALL SETIND(INDCHA)
      CALL MOVBM(-1940,-1856)
      CALL CHARS(ICH,1,1)
C     Control C allows the operator to change initials of the
C     signature and author
      IF(ICH .EQ. KONC) GO TO 4100
C     space selects previous command
      IF (ICH .EQ. ' ') GO TO 1018
```

```
C     check for upper case alpha characters
      JCH = ICH - 'A' + 1
      IF (ICH.GE.'A' .AND. ICH.LE.'Z') GO TO 1020
C     check for lower case alpha characters JCH = ICH - 'a' + 1
      IF (ICH .LT. 'a') GO TO 1010
      IF (ICH .LE. 'z') GO TO 1020
C     illegal character
 1010 CONTINUE
      CALL MOVBM(-1900,-1920)
      CALL CHARS(CTO, 4, 1)
      GO TO 1005
C     make sure previous command was legal
 1018 IF (JCH.LT.1 .OR. JCH.GT.26) GO TO 1010
C     select proper option for the character
C              A 1  B 2  C 3  D 4  E 5  F 6  G 7  H 8  I 9  J10
C              K11  L12  M13  N14  O15  P16  Q17  R18  S19  T20
C              U21  V22  W23  X24  Y25  Z26
 1020 GO TO (1010,1010,1300,1400,9000,1010,1010,1800,1010,1010
     +      ,1010,2200,2300,2400,1010,2600,9000,2800,2900,3000
     +      ,3100,1010,3300,3400,1010,3600), JCH
C  - - - - - - - - - - - - - - - - - - - - - - - - - - - - - -
C     compare signature with existing template
 1300 CONTINUE
C1300 DEBUG = NPRINT.GT.10
C     IF (DEBUG) WRITE (LP,1301) TMPLAT,NUMTEM,SIGNAT,AUTHOR,RECID
C1301 FORMAT (15H0COMPARE, TEMP=,A4,I3,6H  SIG=,A4,2A5)
      IF (TMPLAT .EQ. SIGNAT) GO TO 1310
C     if no templates -- abort
      IF (NUMTEM .LE.  0) GO TO 1010
      IF (NUMTEM .GT. 100) GO TO 1010
C     get record number of correct template
      DO 1302 I=1,NUMTEM
        ITEMRN = I
        READ (LT'ITEMRN) TMPLAT,NUMSIG,MDATEM,MTIMEM
     +                  ,MPLPEN,TSTA,ITEMP
        IF (TMPLAT .EQ. SIGNAT) GO TO 1304
 1302 CONTINUE
C     no such template
      GO TO 1010
C     bring correct template into core (if none -- abort)
 1304 CONTINUE
C     IF (DEBUG) WRITE (LP,1306) TMPLAT,NUMSIG,MDATEM,MTIMEM
C1306 FORMAT (' READ TEMPLATE',A5,I3,2X,6A2,2X,4A2)
C     make sure template consists of at least one signal
 1310 IF (NUMSIG .LT. 1) GO TO 1010
      WRITE (LP,1311) TMPLAT,ITEMRN,NUMSIG,MDATEM,MTIMEM
     +               ,SIGNAT,AUTHOR,RECID,NSRATE,NUP,NTOTIM,NDATE,NTIME
 1311 FORMAT ('0compare template for'A5,2I4,3X,5A2,2X,4A2
     +       /'       with     '3A5,3I5,3X,5A2,2X,4A2)
 1320 IF(LCHAR(JJ) .EQ. 0) GO TO 1320
      CALL MOVBM(-1890,-1856)
      CALL CHARS(JJ,1,1)
      IF(JJ .EQ. 'B' .OR. JJ .EQ. 'b') GO TO 1330
      IF(JJ .EQ. 'H' .OR. JJ .EQ. 'h') GO TO 1340
      IF(JJ .EQ. 'T' .OR. JJ .EQ. 't') GO TO 1330

GO TO 1320
C     Correlation between pen ups (landmarks)
 1330 CALL LANDMK(IDATA,ITEMP,JJ,COR,STAT,SAVE)
      IF(COR .GT. -1.0) GO TO 1005
C     time justify -- P+X+Y lock, halves
```

```
 1340      CALL SEARCH(ITEMP,IDATA,  1,  128, SAVE( 1), 3,256,STAT)
           CALL SEARCH(ITEMP,IDATA,129, 128, SAVE(10), 3,256,STAT)
C          COMPUTE AND DISPLAY OVERALL CORRELATION
           CALL CADCOR(SAVE,.FALSE.,COR)
           GO TO 1005
C     - - - - - - - - - - - - - - - - - - - - - - - - - - - -
C     debugging printout switch
 1400      OLD    = NPRINT
           NPRINT = VALUE('DBUG',OLD,CHANGE)
           GO TO 1000
C     - - - - - - - - - - - - - - - - - - - - - - - - - - - -
C     Change facsimile (dynamic) plot parameters
C         X = X increment    O,P = pen up X increment
C         M = multiplier for P    A = additive constant for P
C1600      IF (ICH .EQ. ' ') GO TO 1610
C1605      IF (LCHAR(JJ) .EQ. 0) GO TO 1605
C          CALL MOVBM(-1890,-1856)
C          CALL CHARS(JJ,1,1)
C1610      IF (JJ.EQ.'A' .OR. JJ.EQ.'a')   GO TO 1640
C          IF (JJ.EQ.'B' .OR. JJ.EQ.'b')   GO TO 1670
C          IF (JJ.EQ.'O')                  GO TO 1620
C          IF (JJ.EQ.'P' .OR. JJ.EQ.'p')   GO TO 1620
C          IF (JJ.EQ.'M' .OR. JJ.EQ.'m')   GO TO 1630
C          IF (JJ.EQ.'I' .OR. JJ.EQ.'i')   GO TO 1660
C          IF (JJ.EQ.'X' .OR. JJ.EQ.'x')   GO TO 1650
C          GO TO 1605
C1620      XUPINC = VALUE('P UP',XUPINC,CHANGE)
C          GO TO 1690
C1630      APARAM = VALUE('MULT',APARAM,CHANGE)
C          GO TO 1690
C1640      BPARAM = VALUE('Xadd',BPARAM,CHANGE)
C          GO TO 1690
C1650      XINC   = VALUE('Xinc',XINC  ,CHANGE)
C          GO TO 1690
C1660      OLDMIN = INTMIN
C          INTMIN = VALUE('IMIN',OLDMIN,CHANGE)
C          INTMIN = MAX0(-16,MIN0(INTMIN,15))
C          OLDMAX = INTMAX
C          INTMAX = VALUE('IMAX',OLDMAX,CHANGE)
C          INTMAX = MAX0(-16,MIN0(INTMAX,15))
C          CHANGE = (OLDMAX.NE.INTMAX).OR.(OLDMIN.NE.INTMIN)
C          GO TO 1690
 1670      CPARAM = VALUE('Yadd',CPARAM,CHANGE)
C     re-generate facsimile plots
C1690      IF (CHANGE) GO TO 2440
C          GO TO 1000
C     - - - - - - - - - - - - - - - - - - - - - - - - - - - -
C     flag for holding plot of template fixed while changing sig plot
 1800      LHOLDT = .NOT.LHOLDT
           GO TO 1000
C     - - - - - - - - - - - - - - - - - - - - - - - - - - - -
C     List contents of data file on printer
 2200      WRITE (LP,1) NDATE,NTIME
 2201      FORMAT ('0DATA FILE'2I5/5X'SIG DEV  AUTH REC  RATE TIME P UP')
 2202      FORMAT (1X,I2,2X,A4,I3,2A5,3I5,2X,5A2,2X,4A2 )
 2203      FORMAT ('0 TEMPLATE FILE' 2I5)
 2204      FORMAT (10X,A6,2I5,5X,5A2,3X,4A2)
 2205      FORMAT (10X'SIGNAT DEVICE NUM'5X'Last Modified')
C     Contents of data file
           WRITE (LP,2201) NUMDAT,MAXDAT
           DO 2210 I=1,NUMDAT
             READ (LD'I)  SIGNAT,AUTHOR,NDATE,NTIME,NSRATE
     +           ,NTOTIM,NUP,IPLPEN,RECID
             WRITE (LP,2202)  I,SIGNAT,IPLPEN,AUTHOR,RECID,NSRATE
     +                     ,NTOTIM,NUP,NDATE,NTIME
```

```
 2210      CONTINUE
           READ (LD'NUMREC)  SIGNAT,AUTHOR,NDATE,NTIME,NSRATE
     +         ,NTOTIM,NUP,IPLPEN,RECID
C    Contents of template file
           WRITE (LP,2203)  NUMTEM,MAXTEM
           WRITE (LP,2205)
           DO 2220 I=1,NUMTEM
             READ (LT'I)  TMPLAT,NUMSIG,MDATEM,MTIMEM,MPLPEN
C            WRITE (LP,2204)  TMPLAT,MPLPEN,NUMSIG,MDATEM,MTIMEM
 2220      CONTINUE
           TMPLAT = 0.0
           NUMSIG = 0
           GO TO 1005
C   ------------------------------------------
C   exit to MAE (text editor)
 2300      NXTSUB = 1
           GO TO 9000
C   ------------------------------------------
C   read the next record from the data file and display it
 2400      IF (NUMDAT .EQ. 0) GO TO 1010
C          DEBUG = NPRINT.GT.50
           CALL INITRL(0.0,SAVE,18)
           NUMREC = NUMREC + 1
           IF (NUMREC .LT. 1    )  NUMREC = 1
           IF (NUMREC .GT. NUMDAT)  NUMREC = 1
           READ (LD'NUMREC)  SIGNAT,AUTHOR,NDATE,NTIME,NSRATE
     +                    ,NTOTIM,NUP,IPLPEN,RECID,STAT,IPENUP,IDATA
C    make sure template is plotted on the left side of screen
C          IF (DEBUG) WRITE (LP,2402)  NUMREC,SIGNAT,AUTHOR,RECID,NDATE
C2402      FORMAT ('0READ SIGNATURE'I5,5X,3A5,2X,5A2)
           IF (SIGNAT .EQ. TMPLAT)  GO TO 2430
           IF (    LHOLDT       )  GO TO 2430
C    Need new template
           IF (NUMTEM .EQ. 0)  GO TO 2430

DO 2410  I=1,NUMTEM
             ITEMRN = I
             READ (LT'ITEMRN)   TMPLAT,NUMSIG,MDATEM,MTIMEM,MPLPEN
     +                       ,TSTA,ITEMP
             IF (TMPLAT .EQ. SIGNAT)  GO TO 2420
 2410      CONTINUE
C    no such template
           NUMSIG = 0
           TMPLAT = 0.0
           GO TO 2430

C       jump here after changing template (T= OR U commands)
 2420      CALL SETIND(INDBOX)
           CALL INITFX(INDBOX,INDBUF,4)
           IF (NUMSIG .EQ. 0) GO TO 2430
           ENCODE (32,12,TEXT)  TMPLAT,NUMSIG,MDATEM
           IF (NPLOT.NE.2)  CALL TSPLOT(1,TEXT,ITEMP,TSTA)
           CALL GETIND(INDBUF(1))
C    display the signature
 2430      ENCODE (32,11,TEXT)  SIGNAT,AUTHOR,RECID
           CALL SETIND(INDBUF(1))
           IF (NPLOT.NE.2)  CALL TSPLOT(2,TEXT,IDATA,STAT)
           CALL GETIND(INDBUF(2))

C    draw facsimile plot of signature and template
CC      (also jump here when changing facsimile plot parameters)
 2440      IF (    LHOLDT      )  GO TO 2450
           CALL SETIND(INDBUF(2))
           CALL GETIND(INDBUF(3))
           IF (NUMSIG .EQ. 0)  GO TO 2450
```

```
              IF (NPLOT .EQ. 1) GO TO 2450
              CALL DYNAM (1,ITEMP,TSTA)
              CALL GETIND(INDBUF(3))
      2450    CALL SETIND(INDBUF(3))
              IF (NPLOT.NE.1) CALL DYNAM (2,IDATA,STAT)
              CALL GETIND(INDBUF(4))
              GO TO 1000
C    - - - - - - - - - - - - - - - - - - - - - - - - - - - - -
C    specify type of plot -- NPLOT=1=only TSPLOT, NPLOT=2=only DYNAM
      2600    OLD   = NPLOT
              NPLOT = VALUE(4HPLOT,OLD    ,CHANGE)
              IF (CHANGE) GO TO 2420
              GO TO 1005
C    - - - - - - - - - - - - - - - - - - - - - - - - - - - - -
C    Get data record number from operator
      2800    OLD    = NUMREC
              NUMREC = VALUE(4HNREC, OLD,CHANGE) - 1.0
              IF (CHANGE) GO TO 2400
              NUMREC = OLD
              GO TO 1005
C    - - - - - - - - - - - - - - - - - - - - - - - - - - - - -
C    sample A/D -- take signature in program SAMPLE 2900    CONTINUE
              NEXTDR = NUMDAT + 1
              IF (ICH .NE. 'S') GO TO 2930
C    Capital S allows operator to enter number of record to overwrite
      2920    OLD    = NEXTDR
              NEXTDR = VALUE('NREC',OLD,CHANGE)
              IF (NEXTDR.LT.1 .OR. NEXTDR.GT.NUMDAT+1) GO TO 2920
C    Write parameters on file for use by SAMPLE
      2930    NXTSUB = 2
              MAXREC = MAXDAT + 1
              WRITE (LD'MAXREC) NUMDAT,MAXDAT,LENDAT,NEXTDR
             +                  ,SIGNAT,AUTHOR,NPRINT
              GO TO 9000
C    - - - - - - - - - - - - - - - - - - - - - - - - - - - - -
C    allow templates to be modified ................
C        A = add signal to template (also U)
C        S = subtract signal from template
C        Z = zero template
      3000    CONTINUE
C             DEBUG = NPRINT.GT.50
C             IF (NPRINT .EQ. 99) DEBUG = .TRUE.
              IF (ICH    .NE. ' ') JJ     = 0
C    don't allow modification of template by forgeries
C             IF (DEBUG) WRITE (LP,3001) SIGNAT,AUTHOR,TMPLAT,NUMSIG
C3001         FORMAT ('0MODIFY TEMPLATE',3A5,I3)
              IF (AUTHOR .NE. TRUE) GO TO 1010
      3005    CALL MODIFY(JJ,SAVE,WGT,IERR)
              IF (IERR .GT.  0) GO TO 1010
              IF (IERR .EQ. -1) GO TO 3300
              IF (IERR .EQ. -2) GO TO 1005
              GO TO 2420
C    - - - - - - - - - - - - - - - - - - - - - - - - - - - - -
C    Update the template (same as TU above)
      3100    IF (AUTHOR .NE. TRUE) GO TO 1010
              JJ     = 'U'
C             DEBUG = NPRINT .GT. 50
C             IF (NPRINT .EQ. 99) DEBUG = .TRUE.
C             IF (DEBUG) WRITE (LP,3101) SIGNAT,AUTHOR,TMPLAT,NUMSIG
C3101         FORMAT ('0UPDATE TEMPLATE',3A5,I3)
              GO TO 3005
C    - - - - - - - - - - - - - - - - - - - - - - - - - - - - -
C    weight for updating template -- must be between 0 and 1
      3300    OLD    = WGT
```

```
              WGT  =  VALUE('WGT', WGT, CHANGE)
              IF (WGT.GT.0.0 .AND. WGT.LE.1.0) GO TO 1000
              WGT  =  OLD
              GO TO 3300
C     -------------------------------------------------
C     transfer to verify program
 3400         NXTSUB  =  3
              GO TO 9000
C     -------------------------------------------------
C     Zero either the template or a specified data record
 3600         IF (LCHAR(JJ) .EQ. 0)  GO TO 3600
              CALL MOVBM(-1890,-1856)
              CALL CHARS(JJ,1,1)
              IF (JJ.EQ.'R' .OR. JJ.EQ.'r')  GO TO 3610
              IF (JJ.EQ.'T' .OR. JJ.EQ.'t')  GO TO 3620
              GO TO 1010

3610         CONTINUE
              GO TO 1000

3620         JJ  =  'Z'
              GO TO 3005
C     -------------------------------------------------
C     Control C allows the operator to change the initials
C       of the author or signature of the current record
 4100         SIGNAT  =  GETEXT ('SIGN',SIGNAT)
              AUTHOR  =  GETEXT ('AUTH',AUTHOR)
              IF (AUTHOR .EQ. SIGNAT)  AUTHOR=TRUE
              IF (AUTHOR .EQ. T     )  AUTHOR=TRUE
C     Write new initials onto disk file --
C           NOTE -- must write entire record
              WRITE (LD'NUMREC)  SIGNAT,AUTHOR,NDATE,NTIME,NSRATE
             +                  ,NTOTIM,NUP,IPLPEN,RECID,STAT,IPENUP,IDATA
C     Note also code does not update display of initials of
C     signature and author
              GO TO 1005
C     -------------------------------------------------
C     exit to monitor
 9000         CONTINUE
              ENDFILE LD
              ENDFILE LT
              CALL DPOFF
              IF (NXTSUB .EQ. 1)  CALL RUN('DK0:MAE')
              IF (NXTSUB .EQ. 2)  CALL RUN('DK1:SAMPLE')
              IF (NXTSUB .EQ. 3)  CALL RUN('DK1:SIGVER')
              STOP
C     -------------------------------------------------
              END C     COMP.FTN
              SUBROUTINE JUST  (IT,IX,NN,NC,MN,SUMS,BEST,LEAD,ML)
C           October 29, 1974
C     Time justify the signal IX with the template (master signal) IT,
C       with NN samples in each, over NC channels.  The samples are in arra
C       with a maximum of MN samples per channel.
C     The maximum correlation occurs at LEAD, and is BEST, where SUMS are
C       the 6 sums used to calculate the correlation, the maximum correlat
C       and the lead at the maximum correlation.
C     If LEAD=-100, make exhaustive computations of all leads between
C       -ML AND ML, otherwise start search at -LEAD-.
C
C     SUMS(1) = sum of template values
C     SUMS(2) = sum of squares of template values
C     SUMS(3) = sum of signal values
```

```
C     SUMS(4) = sum of squares of signal values
C     SUMS(5) = sum of cross product terms
C     SUMS(6) = number of points in sums
C     SUMS(7) = maximum correlation value
C     SUMS(8) = lead for maximum correlation value
C
      DIMENSION IT(2),IX(2),SUMS(8),SS(10),S0(10)
      EQUIVALENCE (SS(1),S1),(SS(2),S2),(SS(3),S3),(SS(4),S4)
     +           ,(SS(5),S5),(SS(6),P)
     +           ,(SS(7),I1),(SS(8),I2),(SS(9),J1),(SS(10),J2)
      COMMON /LUNS/    KB,LP,LD,LT
      COMMON /DEBUG/   DEBUG,NPRINT
      LOGICAL DEBUG
C-----------------------------------------------------------------
C  1   FORMAT ('0   ALL   NC    NN    MN    ML'/1X,5I5/
C     +        ,'0   LL  LEAD   BEST LBEG  INC   I1   I2   J1   J2'
C     +        ,'   IB   IE   JB   JE PTS   CORR')
C  2   FORMAT (1X,2I5,F7.4,10I5,F5.0,F7.4/5X,F9.0,F16.0,F9.0,2F16.0)
C  Initialize
C
      DEBUG    = (NPRINT.EQ.2) .OR. (NPRINT.EQ.99)
      LL       = MIN0(MAX0(-ML+2, LEAD), ML-2)
      LDOALL   = 0
      IF (LEAD   .EQ. -100) LDOALL = 1
      IF (LDOALL .EQ.  1  ) LL     = -ML
      LBEG     = LL
      INC      = 1
C  Calculate correlation at lead 'LL'
      CALL INITRL(0.0, SS, 6)
      IB = MAX0(LL+1 , 1) - MN
      IE = MIN0(LL+NN,NN) - MN
      JB = MAX0(-LL  , 0) - MN
      JE = JB + IE - IB + 1
      I1 = IB
      I2 = IE
      J1 = JB
      J2 = JE
C DO 10   K=1,NC
        IB = IB + MN
        IE = IE + MN
        JB = JB + MN
        J  = JB
        DO 10   I=IB,IE
          J  = J + 1
          T  = IT(I)
          X  = IX(J)
          S5 = S5 + X*T
          S1 = S1 + T
          S2 = S2 + T*T
          S3 = S3 + X
          S4 = S4 + X*X
 10   CONTINUE
      P        = (IE-IB+1)*NC
      BEST     = CORREL(SS)
      LEAD     = LL
      SUMS(7)  = BEST
      SUMS(8)  = LL
      CALL MOVERL(SS,SUMS,6)
C  Debugging printout
C     IF (DEBUG) PRINT 1, LDOALL,NC,NN,MN,ML
C     IF (DEBUG) PRINT 2, LL,LEAD,BEST,LBEG,INC,I1,I2,J1,J2
C    +                  ,IB,IE,JB,JE,P,BEST,S1,S2,S3,S4,S5
C  Save beginning sums so search can be started in other direction
      CALL MOVERL(SS, S0, 10)
```

```
C     Loop on the leads
20      LL  =  LL + INC
        IF (LL.GT.ML .OR. LL.LT.-ML)  GO TO 90
        IB  =  MAX0(LL+1 , 1) - MN
        IE  =  MIN0(LL+NN,NN) - MN
        JB  =  MAX0( -LL, 0) - MN
        JE  =  JB + IE-IB+1
C
C     Update slow changing sums
        IGO = 1
        IF (IB - I1)  33,21,31
21      IGO = 2
        IF (IE - I2)  31,22,33
22      IGO = 3
        IF (JB - J1)  37,23,35
23      IGO = 4
        IF (JE - J2)  35,40,37
C
C        subtract point from template sums
31      I  =  I1
        IF (INC .LT. 0)  I = I2
        DO 32  K=1,NC
          T   =  IT(I+K*MN)
          S1  =  S1 - T
          S2  =  S2 - T*T
32      CONTINUE
        GO TO (21,22,23,40),IGO
C
C        add point to template sums
33      I  =  IE
        IF (INC .LT. 0)  I = IB
        DO 34  K=1,NC
          T   =  IT(I+K*MN)
          S1  =  S1 + T
          S2  =  S2 + T*T
34      CONTINUE
        GO TO (21,22,23,40),IGO
C        subtract point from signal sums
35      I  =  J2
        IF (INC .LT. 0)  I = J1 + 1
        DO 36  K=1,NC
          X   =  IX(I+K*MN)
          S3  =  S3 - X
          S4  =  S4 - X*X
36      CONTINUE
        GO TO (21,22,23,40),IGO
C
C        add point to signal sums
37      I  =  JB + 1
        IF (INC .LT. 0)  I = JE
        DO 38  K=1,NC
          X   =  IX(I+K*MN)
          S3  =  S3 + X
          S4  =  S4 + X*X
38      CONTINUE
        GO TO (21,22,23,40),IGO
C
C     Form sums of cross product terms
40      CONTINUE
        I1  =  IB
        I2  =  IE
        J1  =  JB
        J2  =  J1 + IE - IB + 1
        S5  =  0.0
        P   =  (IE-IB+1)*NC
        DO 50  K=1,NC
        IB  =  IB + MN
        IE  =  IE + MN
```

```
              JB    =  JB + MN
              J     =  JB
              DO 50  I=IB,IE
                 J    =  J + 1
                 X    =  IX(J)
                 T    =  IT(I)
                 S5   =  S5 + X*T
  50          CONTINUE
C     Compute the correlation
              CORR       =  CORREL(SS)
C             IF (DEBUG)  PRINT 2
C             IF (DEBUG)  PRINT 2, LL,LEAD,BEST,LBEG,INC,I1,I2,J1,J2
C       +                         ,IB,IE,JB,JE,P,CORR,S1,S2,S3,S4,S5
C     Search for best correlation
              IF (CORR .LE. BEST)  GO TO 60
C     Save the sums, lead, and correlation for current maximum
              BEST       =  CORR
              LEAD       =  LL
              SUMS(7)    =  BEST
              SUMS(8)    =  LEAD
              CALL MOVERL(SS,SUMS,6)
C             IF (CORR .LE. 1.0)  GO TO 20
C             PRINT 51, LEAD,I1,I2,J1,J2,BEST,SUMS
C  51         FORMAT ('0CORREL>1 IN JUST, LEAD'I4,4I5' CORREL'F7.4
C       +             /' SUMS'6F9.0,F8.4,F6.1)
              GO TO 20
C     Not a maximum value
  60          CONTINUE
C     See if exhaustive computations are in progress
              IF (LDOALL .EQ. 1)  GO TO 20
C     Must make two calculations after largest to identify it as maximum
              IF (IABS(LEAD-LL) .LT. 2)  GO TO 20
C     May be searching in wrong direction
              IF (INC     .LT. 0)  GO TO 90
              IF (LL-LBEG .GT. 3)  GO TO 90
C     Try searching in other direction
              LL    =  LBEG
              INC   =  -1
              CALL MOVERL(S0, SS, 10)
              GO TO 20
C - - - - - - - - - - - - - - - - - - - - - - - - - - - - - - - - - -
  90          CONTINUE
              RETURN
C-------------------------------------------------------------------
              END
C  COMP.FTN
       SUBROUTINE NORMAL(IX,N,IY,M,K,MM)
C          AUGUST 27, 1974
C  Normalize the data contained in IX (with N samples on each of K
C    channels to IY with M samples per channel, using linear
C    interpolation where necessary.
C  This version for the PDP-11
C
       DIMENSION IX(MM,1),IY(MM,1)
C
              R    =  FLOAT(N-1) / FLOAT(M-1)
              M1   =  M - 1
C
              DO 20  J=2,M1
                 X    =  (J-1)*R + 1.0
                 L    =  X
                 LP1  =  L + 1
                 Q    =  X - L
                 DO 10  I=1,K
                    IY(J,I)  =  (IX(LP1,I)-IX(L,I))*Q + IX(L,I) + 0.5
  10             CONTINUE
  20          CONTINUE
C
              DO 30  I=1,K
```

```
              IY(1,I)  =  IX(1,I)
              IY(M,I)  =  IX(M,I)
  30    CONTINUE
C
C
        RETURN
      END

C  LIB.FTN
      FUNCTION CORREL(S)
C         AUGUST 27, 1974
C   COMPUTE THE PEARSON PRODUCT MOMENT CORRELATION COEFFICIENT,
C   GIVEN THE ARRAY OF SUMS, S
C         S(1) = SUM OF X VALUES
C         S(2) = SUM OF SQUARES OF X VALUES
C         S(3) = SUM OF Y VALUES
C         S(4) = SUM OF SQUARES OF Y VALUES
C         S(5) = SUM OF X * Y
C         S(6) = NUMBER OF POINTS
C
      DIMENSION S(6)
C
        CORREL  =  (S(5) - S(1)*S(3)/S(6))
     +                 / SQRT((S(2)-S(1)**2/S(6)) * (S(4)-S(3)**2/S(6)))
C
        RETURN
      END

C  LIB.FTN
      SUBROUTINE INITFX(I,L,N)
C         SEPTEMBER 2, 1974
C   SET THE N INTEGER ELEMENTS OF THE ARRAY L TO THE INTEGRAL VALUE I
C
      DIMENSION L(N)
C
        DO 10  J=1,N
          L(J)  =  I
  10    CONTINUE
C
        RETURN
      END

C  LIB.FTN
      SUBROUTINE INITRL(V,X,N)
C         SEPTEMBER 3, 1974
C   SET THE N ELEMENTS OF THE ARRAY X TO THE VALUE V
C
      DIMENSION X(N)
C
        DO 10  I=1,N
          X(I)  =  V
  10    CONTINUE
C
        RETURN
      END

C  LIB.FTN
      SUBROUTINE MOVERL(X,Y,N)
C         SEPTEMBER 3, 1974
C   MOVE N REAL VALUES FROM X TO Y
C
      DIMENSION X(N),Y(N)
C
        DO 10  I=1,N
          Y(I)  =  X(I)
  10    CONTINUE
C
        RETURN
      END
```

```
C     COMP.FTN
      SUBROUTINE SEARCH(JT,JX,II,NT,SAVE,NC,MN,STAT)
C           October 25, 1974
C     Calculate the amount of stretching and the lead necessary to make
C     the signal, JX, best match the template JT.
C
C     II is the starting point (time) of JX and JT
C     NT Is the number of points in JT (and JX)
C     NC is the number of channels
C     MN is the number of samples per channel
C     ML is the maximum lead (20)
C     SAVE is an array of sums, the max correl, lead, and stretch
C     STAT(I,J)  statistic J for chan I, J=1=AVE, 2=SDV, 3=MAX, 4=MIN
C----------------------------------------------------------------------
      DIMENSION JT(2),JX(2),SUMS(8),SAVE(9),STAT(3,4)
      LOGICAL DEBUG
      COMMON /DEBUG/    DEBUG,NPRINT
      COMMON /LUNS/     KB,LP,LD,LT
      COMMON /PLOCS/ IHBEG(2),IVBEG,IHINC,IVINC
C     This common is smashed by this routine
      COMMON ISX(768),DISP(5)
C
C     Stretch bounds, 0.95 to 1.05
      DATA  ISMAX,ISMIN/16,6/
C     Maximum lead -- within 6
      DATA  ML/ 6/
C----------------------------------------------------------------------
C     Initialize key variables
      CALL GETIND(IND)
      IS   = 11
C     Start search in magnify (positive stretch) direction
      INC  = 1
C     exhaustive search for best lead at zero stretch
      LEAD = -100
      CALL JUST  (JT(II),JX(II),NT,NC,MN,SUMS,BEST,LEAD,ML)
C     Zero stretch gives best value -- by default -- only calculation
      CMAX     = BEST
      SMAX     = 1.0
      SAVE(9)  = 1.0
      CALL MOVERL(SUMS,SAVE,8)
C     Plot signal over template
      JJ   = II + LEAD
      CALL TSOVER(JX(II),STAT,JJ,NC,NT)
      CALL MOVBM(IHBEG(1)+(II-1)*IHINC, IVBEG-128)
      L    = SUMS(8)
      ENCODE (16,101,DISP)  BEST,SMAX,L
      CALL CHARS(DISP, 8,1)
C     --------------------------------------------------------
C     Search for stretch that gives maximum correlation
   20 CONTINUE
C     Bump stretch indicators
      IS   = IS + INC
      IF (IS.LT.ISMIN.OR.IS.GT.ISMAX) GO TO 60
      S    = (IS+89)/100.0
C     Calculate new number of points
      NX   = NT*S + 0.499999999
      NP   = NT
C     MN is the maximum number of points (absolute array size)
      IF (NX .GT. MN)  NP = MN/S + 0.5
      IF (NX .GT. MN)  NX = MN
      CALL NORMAL (JX(II),NP,ISX,NX,NC,MN )
C     Calculate the correlations for all leads, -ML.LE.L.LE.ML
      IT   = MAX0(1, (NP-NX)/2+1) + (II-1)
      IX   = MAX0(1, (NX-NP)/2+1)
      CALL JUST(JT(IT),ISX(IX), MIN0(NX,NP), NC,MN
     +                      , SUMS, BEST,LEAD,ML)
C     See if this is new maximum correlation
      IF (BEST .LE. CMAX)  GO TO 50
      SAVE(9)  = S
```

```
              SMAX    = S
              CMAX    = BEST
              CALL MOVERL(SUMS,SAVE,8)
C             revise plot showing best match of signal over template
              CALL SETIND(IND)
              JJ   = (NT - NX)/2 + LEAD +  II
              CALL TSOVER(ISX,STAT,JJ,NC,NX)
              CALL MOVBM(IHBEG(1)+(II-1)*IHINC, IVBEG-128)
              L    = SUMS(8)
              ENCODE (16,101,DISP)  BEST,S,L
              CALL CHARS(DISP, 8,1)
              GO TO 20
C     This is not a new max, either finished or going in wrong direction
   50         IF (IS .NE. 12)  GO TO 60
              IS    = 11
              INC   = -1
              LEAD  = SAVE(8)
              GO TO 20
C - - - - - - - - - - - - - - - - - - - - - - - - - - - - - - - - - -
   60         CONTINUE
              RETURN
C------------------------------------------------------------------
  101         FORMAT (F6.3,F6.2,I4)
C------------------------------------------------------------------
        END C  COMP.FTN
        SUBROUTINE UPDATE(JT,JX,N,B,NC,M,W,IENTRY)
C           October 25, 1974
C  Update the template with the signature contained in JX consisting
C  of N data points, B contains the best lead (8) and stretch(9).
C  NC is the number of channels, M is the maximum number of data points
C  in a signal or template (dimension of JT and JX), W is the factor
C  used for updating the template (T = X*W + (1-W)*T).
C
C  IENTRY=1 to add the signal to the template
C  IENTRY=2 to subtract the signal from the template
C------------------------------------------------------------------
        DIMENSION JT(2),JX(2),B(9)
        LOGICAL DEBUG
        COMMON /DEBUG/  DEBUG,NPRINT
C  This COMMON is used for the stretched signal -- hence SMASHED here
        COMMON JS(768)
C
        DATA  KOUNT/100/
C------------------------------------------------------------------
        JENTRY = 1
        IF (IENTRY .EQ. 2)  JENTRY = 2
C------------------------------------------------------------------
C    Calculate number of points in stretched signal
   10   NX  = N*B(9) + 0.499999999
        NT  = N
        IF (NX .GT. M)  NT = M/B(9) + 0.5
        IF (NX .GT. M)  NX = M
C    Interpolate to get stretched signal
        CALL NORMAL(JX,NT,JS,NX,NC,M)
        L   = B(8)
        W1  = 1.0 - W
C    I is index for template, J is index for signal
        ID  = (NT-NX)/2
        JD  = ID - (NT-NX)
        IB  = MAX0( 1,  1-L+ID)
        IE  = MIN0(NT, NT-L+JD)
        JB  = MAX0( 1,  1+L+JD)
        JE  = MIN0(NX, NX+L+ID)
        L   = JB - IB
```

```
C
        DO 50 K=1,NC
        GO TO (20,30),JENTRY
20      DO 22  I=IB,IE
        J      = I + L
        JT(I)  = JT(I)*W1 + JX(J)*W
22      CONTINUE
        GO TO 40
30      DO 32  I=IB,IE
        J      = I + L
        JT(I)  = JT(I)*W1 - JX(J)*W
32      CONTINUE
40      IB = IB + M
        IE = IE + M
50      CONTINUE
C
        RETURN
C**********************************************************
        END
```

We claim:

1. A method of comparing a template signal train with a specimen signal train to determine substantial identicality comprising, for successive equal portions of each signal train, simulating successive incremental displacements of a portion of a specimen signal train relative to a template signal train while deriving a correlation value from said specimen and template wavetrains for each incremental displacement, determining the largest of said derived correlation value, to provide a first correlation value, simulating successive incremental velocity changes between said portions of said specimen signal train relative to said template signal train, while deriving a correlation value from said specimen and signal wavetrains for each incremental velocity change, determining the largest of said first correlation value and the correlation values derived for said incremental velocity changes to provide a maximum correlation value, combining the maximum correlation value for each portion of said signal trains to provide an average maximum correlation value, and comparing said average maximum correlation value with a reference value for providing an output indicating substantial identicality if said reference value is exceeded and non-identicality if not exceeded.

2. A method as recited in claim 1 wherein said step of simulating successive incremental displacements while deriving a correlation value from said specimen and template wavetrains for each incremental displacement includes, for a first displacement deriving a plurality of samples of the amplitudes of each said signal wavetrain from a plurality of spaced locations along both said signal wavetrains, combining said plurality of samples minus signal both signal wavetrains to produce a correlation value, for each successive incremental displacement, deriving a plurality of samples of the amplitudes of the template signal wavetrain from the same locations as were used for the first displacement, deriving a plurality of samples of the amplitudes of the specimen signal wavetrain at locations which are spaced apart the same amount as the spacing of said template samples, but are displaced from a previous location by the amount of the incremental displacement, and combining said plurality of samples from both template and specimen signal wavetrains to provide a correlation value.

3. A method as recited in claim 2 wherein the step of determining the largest of said derived correlation values to provide a maximum correlation value includes comparing the correlation value derived for one displacement with the correlation value derived for a succeeding displacement to determine which of the two is the larger, terminating further incremental displacements if the correlation value derived for said one displacement is higher than the correlation value for the succeeding displacement.

4. A method as recited in claim 1 wherein the step of simulating successive incremental velocity changes while deriving a correlation value for each incremental velocity change includes deriving a plurality of samples of the amplitudes at spaced locations along said template signal wavetrain, for each successive change in velocity, deriving a plurality of samples of the amplitudes along said specimen signal wavetrain from locations which for each incremental increase in velocity have a successively smaller spacing than the spacing between said spaced locations along said template signal wavetrain and for each incremental decrease in velocity have successively larger spacing than the spacing between said spaced locations along said template signal wavetrain, and for each successive increment velocity combining the samples derived from said template signal wavetrain with the samples derived from said specimen signal wavetrain to provide a correlation value..

5. A method as recited in claim 1 wherein said step of determining the largest of said first correlation value and correlation values derived for said incremental velocity changes to provide a maximum correlation value includes comparing the first correlation value with the correlation value derived for the first incremental increase in velocity to determine if the first correlation value is smaller or larger, if the first correlation value is smaller, for each successive incremental increase in velocity, comparing the correlation value derived for the latest incremental increase in velocity with the correlation derived for the next to the latest incremental increase in velocity to derive a second correlation value which is the greater of the two, and terminating further incremental increases in velocity increments as soon as the latest derived correlation value does not exceed the next to the latest derived correlation value, comparing the second correlation value with the correlation value derived for the first incremental decrement in velocity and if second correlation value is larger, terminating any further incremental decrements in velocity, if the second correlation value is smaller, comparing the correlation value derived for the latest incremental decrement in velocity with the correlation value derived for the next to latest incremental decrement in velocity to derive a maximum correlation value which is the greater of the two, and terminating further velocity decrements as soon as the correlation value derived for the latest decrement in velocity is smaller, if the correlation value is larger, terminating further incremental increases in velocity and deriving a correlation value for the first incremental velocity decrement, comparing said first correlation value with said correlation value derived for said first incremental velocity decrement and if larger it is the maximum correlation value, and terminating further incremental velocity decrements, if smaller successively comparing the correlation value derived for the latest incremental velocity decrement with the correlation value derived for the next to the latest incremental velocity decrement to derive a maximum correlation value which is the larger of the two, and terminating further velocity decrements as soon as the correlation value derived for the latest velocity decrement is smaller.

6. A method as recited in claim 1 including simulating said successive incremental velocity changes from the location of the displacement of said specimen and template signal trains at which said first correlation value was obtained.

7. A method as recited in claim 5 including simulating a first incremental velocity change from a first location which is the location of the displacement of said specimen and template signal train at which said first correlation value was obtained, comparing the correlation value derived for the first incremental velocity change with said first correlation value and if the first incremental velocity change is smaller than continuing with incremental velocity changes until a second correlation value is obtained, if the first correlation value is larger than simulating a first incremental velocity change from a second location which is displaced in one direction by an increment from said first location, comparing said first correlation value with the correlation value derived for the first incremental velocity change at said second location and if said first correlation value is smaller than continuing with incremental velocity changes until a second correlation value is obtained, if said first correlation value is greater than the correlation value derived at said second location, simulating a first incremental velocity change at a third location displaced an increment in an opposite direction from said one direction and deriving a correlation value, comparing the correlation derived at said third location with said first correlation value and if said first correlation value is smaller than continuing with incremental velocity changes until a second correlation value is obtained, if said first correlation value is greater than the correlation value derived at said third location than terminating further incremental velocity changes, and after terminating further incremental velocity changes for any of the previously recited conditions, simulating a first decremental velocity at said first location, comparing the correlation value derived for said first decremental velocity with the one of the first and second correlation value remaining after simulating velocity increments and if said one of said first and second correlation values is smaller than continuing with decremental velocity changes until a maximum correlation value is obtained, if said remaining one of said first and second correlation values is larger, then simulating a first decremental velocity from said second location and comparing the correlation value derived at said second location with said remaining one of said first and second correlation values is smaller than continuing with decremental velocity changes until a maximum correlation value is obtained, if said correlation value derived at said second location is smaller than said remaining one of said first and second correlation values than simulating a first decremental velocity from said third location and comparing the correlation value derived at said third location with said remaining one of said first and second correlation values, if said remaining one of said first and second correlation values is smaller than said correlation value derived at said third location then continuing with successive decremental velocity changes until a maximum correlation value is obtained, and if said remaining one of said first and second correlation values is larger than said correlation value derived at said third location, then said remaining one of said first and second correlation value is a maximum correlation value and further decrementing of velocity is discontinued.

8. A method as recited in claim 1 wherein said template signal train is recorded on a first magnetic tape and said specimen signal train is recorded on a second magnetic tape, a reference tape reading location is provided for both tapes and said step of simulating successive displacements of said specimen signal train relative to said template signal train includes running both tapes successively at the same speed while reading from said first magnetic tape from said reference tape reading location, and reading from said second magnetic tape from loactions which are successively incrementally displaced from its reference tape reading location;

said step of simulating successive incremental velocity changes comprises running said first tape successively at the same speed while reading from its reference reading location, and running said second tape successively at speed which are incrementally different while reading from its reference location.

9. A method as recited in claim 1 wherein the step of simulating successive incremental displacements of a portion of a specimen signal train relative to a template signal train while deriving a correlation value from said specimen and signal wavetrains for each displacement includes deriving a plurality of digital samples of the amplitudes of each said signal wavetrain from a plurality of the same spaced locations along each of said signal wavetrains, storing said plurality of digital samples in memory, for each successive incremental displacement in one direction of said specimen wavetrain relative to said template, successively reading from memory in order of derivation the digital samples of said template signal wavetrain successively reading from memory the digital samples of said speciment wavetrain derived from locations which are successively displaced from the initial location for each incremental displacement, and combining said template and specimen wavetrain digital samples read from memory for each increment to provide a correlation value, for each successive incremental displacement in an opposite direction of said specimen wavetrain relative to said template wavetrain, successively reading from memory in order of derivation the digital samples of said specimen wavetrain while successively reading from memory the digital samples of said template wavetrain commencing with digital samples from locations which are successively displaced from the initial location for each incremental displacement, and combining said template and specimen wavetrain digital samples read from memory for each increment to provide a correlation value.

10. A method as recited in claim 1 wherein the step of simulating successive incremental velocity changes between said positions of said specimen signal train relative to said template signal train while deriving a correlation value for each incremental velocity change comprises deriving a plurality of digital samples of the amplitude of said template signal wavetrain from a plurality of spaced locations along said template signal wavetrain, storing said plurality of digital samples of said template signal in memory, deriving a plurality of digital samples of the amplitudes of said specimen signal wavetrain from locations spaced the same distance apart as the locations along said template wavetrain from which digital samples were derived, as well as deriving a plurality of digital samples from smaller spaced locations between each of said spaced locations, storing in memory all of the digital samples derived from said speciman signal wavetrain, for each successive incremental increase in relative velocity between said template and digital signal wavetrains, successively reading from memory digital samples of said template wavetrain derived from locations which are successively displaced from the initial location for each incremental displacement, while successively reading from memory digital samples of said specimen wavefrom derived from said smaller spaced locations, wherein for each successive increment in relative velocity reading the digital samples are derived from smaller spaced locations which are successively closer together, and combining said digital samples derived from memory for each incremental increase in velocity to produce a correlation value, for each successive decrement in relative velocity between said template and digital signal wavetrains, successively reading from memory digital samples of said template wavetrain derived from locations which are successively displaced from the initial location for each incremental displacement, while successively reading from memory digital samples of said specimen waveform derived from locations the distance between which is initially a least spaced location plus a smaller spaced location and increases by at least a smaller spaced location for each decrement in relative velocity, and combining the digital samples derived for each decrement in velocity to produce a correlation value.

11. Apparatus for comparing a template signal train with a specimen signal train to determine substantial identicality comprising, for successive equal portions for each signal train, means for simulating successive incremental displacements of a portion of a specimen signal train relative to a template signal train while deriving a correlation value from said specimen and template wavetrains for each incremental displacement, means for determining the largest of said derived correlation values, to provide a first correlation value, means for simulating successive incremental velocity changes between said portions of said specimen signal train relative to said template signal train, while deriving a correlation value from said specimen and signal wavetrains for each incremental velocity change, means for determining the largest of said first correlation value and the correlation values derived for said incremental velocity changes to provide a maximum correlation value, means for combining the maximum correlation value for each portion of said signal trains to provide an average maximum correlation value, and means for comparing said average maximum correlation value with a reference value for providing an output indicating substantial identicality if said reference value is exceeded and non-identicality if not exceeded.

12. Apparatus as recited in claim 11 wherein said means for simulating successive incremental displacements while deriving a correlation value from said specimen and template wavetrains for each incremental displacement includes, for a first displacement, means for deriving a plurality of samples of the amplitudes of each said signal wavetrain from a plurality of spaced locations long both said signal wavetrains, means for combining said plurality of samples from both signal wavetrains to produce a correlation value, for each successive incremental displacement, means for deriving a plurality of samples of the amplitudes of the template signal wavetrain from the same locations as were used for the first displacement, means for deriving a plurality of samples of the amplitudes of the specimen signal wavetrain at locations which are spaced apart the same amount as the spacing of said template samples, but are displaced from a previous location by the amount of the incremental displacement, and means for combining said plurality of samples from both template and specimen signal wavetrains to provide a correlation value.

13. Apparatus as recited in claim 12 wherein said means for determining the largest of said derived correlation values to provide a maximum correlation value includes means for comparing the correlation value derived for one displacement with the correlation value derived for a succeeding displacement to determine which of the two is the larger, means for terminating further incremental displacements if the correlation value derived for said one displacement is higher than the correlation value for the succeeding displacement.

14. Apparatus as recited in claim 11 wherein said means for simulating successive incremental velocity changes while deriving a correlation value for each incremental velocity change includes means for deriving a plurality of samples of the amplitudes at spaced locations along said template signal wavetrain, for each successive change in velocity, means for deriving a plurality of samples of the amplitudes along said specimen signal wavetrain from locations which for each incremental increase in velocity have a successively smaller spacing than the spacing between said spaced locations along said template signal wavetrain and for each incremental decrease in velocity have succesively larger spacing than the spacing between said spaced locations along said template signal wavetrain, and means for combining the samples derived from said template signal wavetrain with the samples derived from said specimen signal wavetrain to provide a correlation value.

15. Apparatus as recited in claim 11 wherein said means for determining the largest of said first correlation value and correlation values derived for said incremental velocity changes to provide a maximum correlation value includes means for comparing the first correlation value with the correlation value derived for the first incremental increase in velocity to provide a first signal if the first correlation value is smaller and a second signal if larger, means responsive to a first signal for simulating a next incremental increase in velocity, for each successive incremental increase in velocity, means for comparing the correlation value derived for the latest incremental increase in velocity with the correlation value derived for the next to the latest incremental increase in velocity to derive a second correlation value which is the greater of the two, and means responsive to the latest derived correlation value not exceeding the next to the latest derived correlation value, for terminating further incremental increases in velocity increments, means for comparing the second correlation value with the correlation value derived for a first incremental decrement in velocity to determine which is the larger, means responsive to the second correlation value being larger to terminate any further incremental decrements in velocity, and means responsive to the second correlation value being smaller for comparing the correlation value derived for the latest incremental decrement in velocity with the correlation value derived for the next to latest incremental decrement in velocity to derive a third correlation value which is the greater of the two, and means responsive to the correlation value derived for the latest decrement in velocity being smaller than the preceding derived correlation value for terminating further velocity decrements, means responsive to a second signal for terminating further incremental increases in velocity and for initiating a means for deriving a correlation value for said first incremental velocity decrement, means for comparing said first correlation value with said correlation value derived for said first incremental velocity decrement and if said first correlation value is smaller producing a third signal and if larger it is the maximum correlation value, means responsive to said maximum correlation value for terminating further incremental velocity decrements, means responsive to said third signal for successively comparing the correlation value derived for the latest incremental velocity decrement with the correlation value derived for the next to the latest incremental velocity decrement whereby the larger of the two is a maximum correlation value, and means for terminating further velocity decrements as soon as the correlation value derived for the latest velocity decrement is smaller than a correlation value derived for a preceding velocity decrement.

16. Apparatus as recited in claim 11 including means for simulating said successive incremental velocity changes from the location of the displacement of said specimen and template signal trains at which said first correlation value was obtained.

17. Apparatus as recited in claim 11 including means for simulating a first incremental velocity change from a first location which is the location of the displacement of said specimen and template signal train at which said largest correlation value was obtained, means for comparing the correlation value derived for the first incremental velocity change with said largest correlation value to produce a first signal if larger and a second signal if smaller, means responsive to said second signal then continuing with said incremental increasing velocity changes until a second largest correlation value is obtained, means responsive to said first signal for simulating a first incremental increasing velocity change from a second location which is displaced in one direction by an increment from said first location, means for comparing said largest correlation value with the correlation value derived for the first incremental velocity change at said second location and producing a third signal if said first correlation value is smaller and a fourth signal if larger, means responsive to said third signal for continuing with incremental increasing velocity changes until a second correlation value is obtained, means responsive to said fourth signal for simulating a first incremental increasing velocity change at a third location displaced an increment in an opposite direction from said one direction and deriving a correlation value, means for comparing the correlation derived at said third location with said largest correlation value and if said largest correlation value is smaller producing a fifth signal and if larger a sixth signal, means responsive to said fifth signal for continuing with said incremental increasing velocity changes until a second largest correlation value is obtained, means responsive to said sixth signal for terminating further incremental velocity changes, means responsive to the termination of further incremental velocity changes for simulating a first decremental velocity at said first location, means for comparing the correlation value derived for said first decremental velocity with the one of largest or second largest correlation value remaining after simulating velocity increasing increments and if said one of said largest and second largest correlation values is smaller producing a seventh signal and if larger an eighth signal, means responsive to a seventh signal for continuing with decremental velocity changes until a maximum correlation value is obtained, means responsive to an eighth signal for simulating a first decremental velocity from said second location, means for comparing the correlation value derived at said second location with said remaining one of said largest and second largest values and if smaller then producing a ninth signal and if larger producing a tenth signal, means responsive to said ninth signal for continuing with decremental velocity changes until a maximum correlation value is obtained, means responsive to said tenth signal for simulating a first decremental velocity from said third location, means for comparing the correlation value derived at said third location with said remaining one of said largest and second largest correlation values, and producing an eleventh signal if said one of said largest and second largest correlation value is smaller and a twelfth signal if larger, means responsive to said eleventh signal for continuing with successive decremental velocity changes until a maximum correlation value is obtained, and means responsive to a twelfth signal for terminating further velocity decrements whereby said one of said largest and second largest correlation values is a maximum.

18. Apparatus as recited in claim 11 wherein said template signal train is recorded on a first magnetic tape and said specimen signal train is recorded on a second magnetic tape, a reference tape reading location is provided for both tapes and said means for simulating successive displacements of said specimen signal train relative to said template signal train includes means for running both tapes successively at the same speed while reading from said first magnetic tape from said reference tape reading location, and means for reading from said second magnetic tape from locations which are successively incrementally displaced from its reference tape reading location, said means for simulating successive incremental velocity changes comprises means for running said first tape successively at the same speed while reading from its reference reading location, and means for running said second tape successively at speed which are incrementally different while reading from its reference location.

19. Apparatus as recited in claim 11 wherein said apparatus for simulating successive incremental displacements of a portion of a specimen signal train relative to a template signal train while deriving a correlation value from said specimen and signal wavetrains for each displacement includes means for deriving a plurality of digital samples of the amplitudes of each said signal wavetrain from a plurality of the same spaced locations long each of said signal wavetrains, means for storing said plurality of digital samples in memory, for each successive incremental displacement in one direction of said specimen wavetrain relation to said template, means for successively reading from memory in order of derivation the digital samples of said template signal wavetrain successively reading from memory the digital samples of said specimen wavetrain derived from locations which are successively displaced from the initial location for each incremental displacement, and means for combining said template and specimen wavetrain digital samples read from memory for each increment to provide a correlation value, for each successive incremental displacement in an opposite direction of said specimen wavetrain relative to said template wavetrain, means for successively reading from memory in order of derivation the digital samples of said specimen wavetrain while successively reading from memory the digital samples of said template wavetrain commencing with digital samples from locations which are successively displaced from the initial location for each incremental displacement, and means for combining said template and specimen wavetrain digital samples read from memory for each increment to provide a correlation value.

20. Apparatus as recited in claim 11 wherein means for simulating successive incremental velocity changes between said positions of said specimen signal train relative to said template signal train while deriving a correlation value for each incremental velocity change comprises means for deriving a plurality of digital samples of the amplitude of said template signal wavetrain from a plurality of spaced locations along said template signal wavetrain, means for storing said plurality of digital samples of said template signal in memory, means for deriving a plurality of digital samples of the amplitudes of said specimen signal wavetrain from locations spaced the same distance apart as the locations along said template wavetrain from which digital samples were derived, as well as digital samples from smaller spaced locations between each of said spaced locations, means for storing in memory all of the digital samples derived from said specimen signal wavetrain, for each successive incremental increase in relative velocity between said template and digital signal wavetrains, means for successively reading from memory digital samples of said template wavetrain derived from locations which are successively displaced from the initial location for each incremental displacement, while successively reading from memory digital samples of said specimen waveform derived from said smaller spaced locations, wherein for each successive increment in relative velocity reading the digital samples are derived from smaller spaced locations which are successively closer together, and means for combining said digital samples derived from memory for each incremental increase in velocity to produce a correlation value, for each successive decrement in relative velocity between said template and digital signal wavetrains, means for successively reading from memory digital samples of said template wavetrain derived from locations which are successively displaced from the initial location for each incremental displacement, while successively reading from memory digital samples of said specimen waveform derived from locations the distance between which is initially a least spaced location plus a smaller spaced location and increases by at least a smaller spaced location for each decrement in relative velocity, and means for combining the digital samples derived for each decrement in velocity to produce a correlation value.

21. A system of comparing a template signature with a specimen signature to determine its validity comprising, for successive equal portions of both signatures, means for displacing a portion of one signature, relative to a portion of said other signature successively in increments, means for generating a correlation value for each successive displacement, means for determining the maximum of said correlation values and which displacement provides said maximum correlation value, means responsive to obtaining said maximum correlation value for simulating a successive incremental lengthening of said portion of one of said signatures relative to said portion of the other, means for generating a lengthening correlation value for each successive incremental lengthening, means for comparing said maximum correlation value with a first of said lengthening correlation values and if said lengthening correlation value is larger generating a first plus signal and if smaller generating a first minus signal, means responsive to said first plus signal to continue the operation of both said means for simulating successive incremental lengthening and said means for generating a lengthening correlation value, means for determining the maximum one of said lengthening correlation values, means responsive to said first minus signal or the obtaining of said maximum one of said lengthening correlation signals to simulate successive incremental shortening of said portion of one signature relative to said portion of the other, means for generating a shortening correlation value for each successive incremental shortening, means for comparing either said maximum correlation value or a maximum lengthening correlation value with the first generated shortening correlation value and providing a second plus signal if said shortening correlation value is greater and a second minus signal if smaller, means responsive to said second plus signal to continue the operation of both said means to simulate successive incremental shortening and means to generate a shortening correlation value, means for determining a maximum one of said shortening correlation values, means responsive to said second minus signal for aborting further operation of said means to simulate successive incremental shortening and means to generate a correlation value, means for combining the maximum ones of the correlation values obtained from each of the signature portions to provide a single maximum correlation value, a reference correlation value, and means for comparing said single maximum correlation value with said reference correlation value and providing a valid indication if it is larger and an invalid indication if it is not.

* * * * *